United States Patent
Kato et al.

(10) Patent No.: US 8,274,459 B2
(45) Date of Patent: Sep. 25, 2012

(54) VEHICLE DISPLAY APPARATUS

(75) Inventors: Miki Kato, Kariya (JP); Yukihide Shibata, Kariya (JP); Tomoyuki Miyagaki, Handa (JP)

(73) Assignee: Denso Corporation, Kariya (JP)

( * ) Notice: Subject to any disclaimer, the term of this patent is extended or adjusted under 35 U.S.C. 154(b) by 1183 days.

(21) Appl. No.: 12/100,579

(22) Filed: Apr. 10, 2008

(65) Prior Publication Data

US 2008/0252579 A1    Oct. 16, 2008

(30) Foreign Application Priority Data

Apr. 10, 2007 (JP) ................................. 2007-103130
Oct. 26, 2007 (JP) ................................. 2007-279361

(51) Int. Cl.
*G09G 3/36* (2006.01)
(52) U.S. Cl. .............. 345/87; 345/88; 345/89; 345/102; 345/690
(58) Field of Classification Search .............. 345/87–89, 345/102, 204, 690; 340/461
See application file for complete search history.

(56) References Cited

U.S. PATENT DOCUMENTS

| | | | | |
|---|---|---|---|---|
| 5,815,072 | A * | 9/1998 | Yamanaka et al. ............. | 340/461 |
| 6,583,569 | B1 * | 6/2003 | Wang ............................... | 315/79 |
| 6,597,338 | B2 * | 7/2003 | Onodera ........................ | 345/102 |
| 6,847,870 | B2 * | 1/2005 | Amagasa ...................... | 701/29.1 |
| 6,879,326 | B1 | 4/2005 | Herman | |
| 7,126,567 | B2 | 10/2006 | Nishikawa | |
| 7,151,517 | B2 | 12/2006 | Lee | |
| 7,321,294 | B2 * | 1/2008 | Mizumaki ..................... | 340/438 |
| 2002/0118182 | A1 * | 8/2002 | Luther Weindorf .......... | 345/204 |
| 2004/0012556 | A1 * | 1/2004 | Yong et al. .................... | 345/102 |
| 2004/0027041 | A1 * | 2/2004 | Nishikawa .................... | 313/110 |
| 2005/0237171 | A1 | 10/2005 | Mizumaki | |
| 2006/0119472 | A1 * | 6/2006 | Tsuboi .......................... | 340/435 |
| 2007/0013645 | A1 | 1/2007 | Baba | |
| 2007/0105069 | A1 | 5/2007 | Yamagishi | |
| 2007/0159410 | A1 | 7/2007 | Yamamoto et al. | |

FOREIGN PATENT DOCUMENTS

EP    0 494 606 A1    7/1992
(Continued)

OTHER PUBLICATIONS

Japanese Office Action dated Sep. 14, 2010 issued in corresponding Japanese Application No. 2009-053973, with English translation.

(Continued)

*Primary Examiner* — Amare Mengistu
*Assistant Examiner* — Hong Zhou
(74) *Attorney, Agent, or Firm* — Nixon & Vanderhye P.C.

(57) ABSTRACT

A display apparatus for use in a vehicle has a liquid crystal display panel, and the panel includes a first pixel area for displaying a meter image that represents vehicle condition values, and a second pixel area for displaying an outside image that calls attention of occupants as a warning image. Further, an input unit of the apparatus receives inputs of adjustment value from occupants of the vehicle for adjusting brightness of the meter image and the outside image. A main control unit and a drawing unit of the apparatus cooperatively serve as a controller of the apparatus by changing gradation ratio of the first and second pixel areas so that the gradation ratio of the second pixel area becomes greater than the gradation ratio of the first pixel area according to the input of the adjustment value.

19 Claims, 34 Drawing Sheets

FOREIGN PATENT DOCUMENTS

| | | |
|---|---|---|
| JP | 3-198026 | 8/1991 |
| JP | 4-44626 | 4/1992 |
| JP | 4-250489 | 9/1992 |
| JP | 5-18767 | 1/1993 |
| JP | 06-048247 | 2/1994 |
| JP | 10-206789 | 8/1998 |
| JP | 2000-10543 | 1/2000 |
| JP | 2000-74699 | 3/2000 |
| JP | 2004-085682 | 3/2004 |
| JP | 2004-284508 | 10/2004 |
| JP | 2004-314860 | 11/2004 |
| JP | 2005-41355 | 2/2005 |
| JP | 2006-235464 | 9/2006 |
| WO | PCT/JP2007/072568 | 11/2007 |
| WO | WO 2008/065948 | 6/2008 |

OTHER PUBLICATIONS

U.S. Appl. No. 11/902,068, filed Sep. 18, 2007.

Japanese Office Action dated Feb. 2, 2010 issued in corresponding Japanese Application No. 2007-279361, with English translation.

Japanese Office Action dated Jan. 6, 2009 issued in corresponding Japanese Application No. 2007-279361, with English translation.

Japanese Office Action dated Mar. 29, 2011, issued in corresponding Japanese Application No. 2007-279361, with English translation.

Office Action (6 pgs.) dated Apr. 3, 2012 issued in corresponding Korean Application No. 10-2011-7031154 with an at least partial English-language translation thereof (6 pgs.).

Advisory Action (3 pgs.) dated Apr. 12, 2012 issued in related U.S. Appl. No. 12/516,478.

Office Action (3 pgs.) dated May 29, 2012 issued in corresponding Korean Application No. 10-2009-7010710 with an at least partial English-language translation thereof (3 pgs.).

Office Action (2 pgs.) dated May 8, 2012 issued in corresponding Japanese Application No. 2007-274295 with an at least partial English-language translation thereof (3 pgs.).

\* cited by examiner

FIG. 9

| HUE | GRADATION | | | | | |
|---|---|---|---|---|---|---|
| | 100% | | | 50% | | |
| | SUB PIXEL GRAD | | | SUB PIXEL GRAD | | |
| | R | G | B | R | G | B |
| RED | 63 | 0 | 0 | 31 | 0 | 0 |
| GREEN | 0 | 63 | 0 | 0 | 31 | 0 |
| BLUE | 0 | 0 | 63 | 0 | 0 | 31 |
| YELLOW | 63 | 31 | 0 | 31 | 15 | 0 |
| WHITE | 63 | 63 | 63 | 31 | 31 | 31 |

| HUE | SUB PIXEL GRAD | | | SUB PIXEL GRAD | | |
|---|---|---|---|---|---|---|
| | R | G | B | R | G | B |
| RED | 63 | 0 | 0 | 31 | 0 | 0 |
| GREEN | 0 | 63 | 0 | 0 | 31 | 0 |
| BLUE | 0 | 0 | 63 | 0 | 0 | 31 |
| YELLOW | 63 | 31 | 0 | 31 | 15 | 0 |
| WHITE | 63 | 63 | 63 | 31 | 31 | 31 |

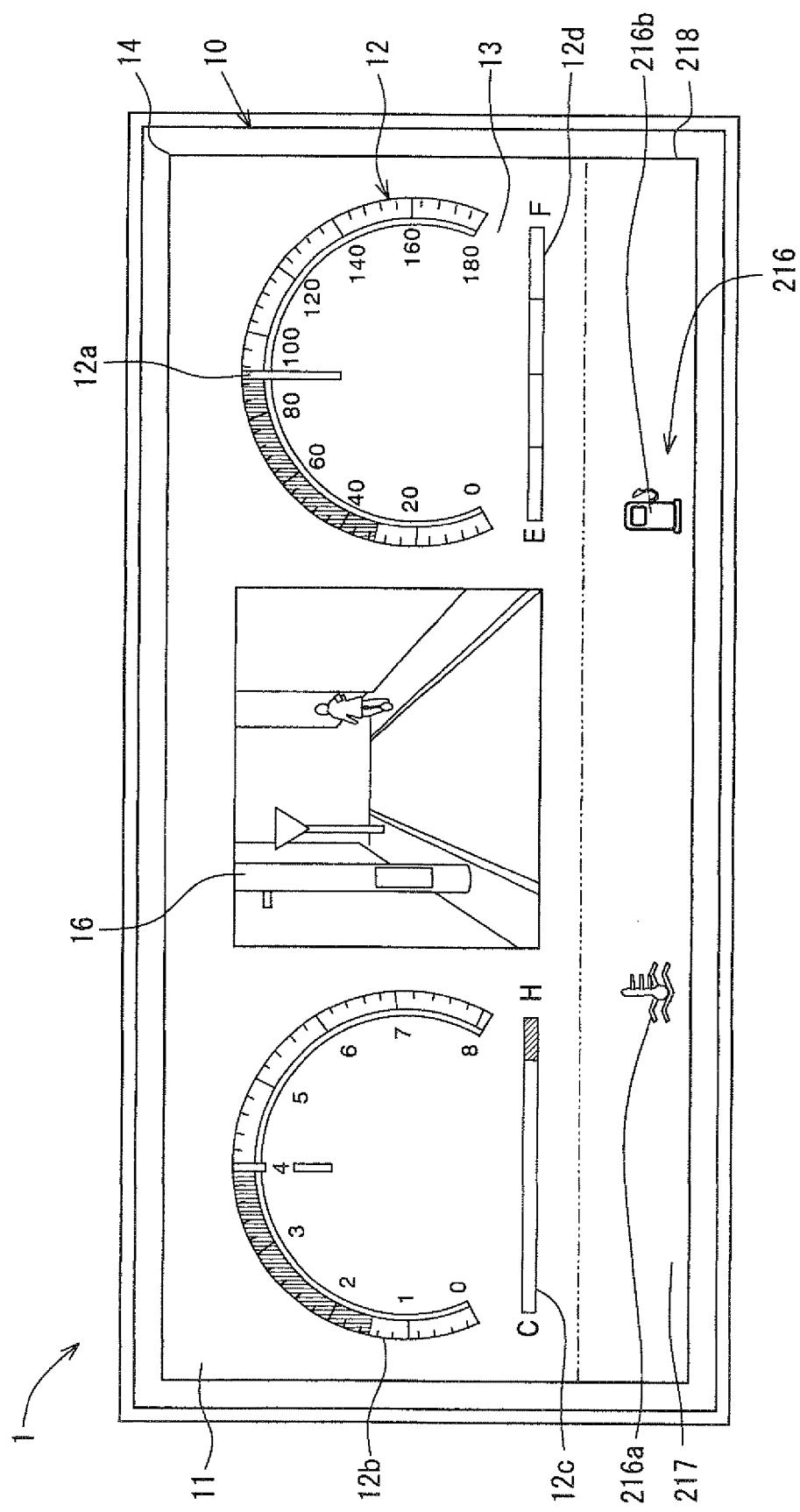

VEHICLE DISPLAY APPARATUS

CROSS REFERENCE TO RELATED APPLICATION

The present application is based on and claims the benefit of priority of Japanese Patent Applications No. 2007-103130 filed on Apr. 10, 2007, and No. 2007-279361 filed on Oct. 26, 2007, the disclosures of which are incorporated herein by reference.

FIELD OF THE INVENTION

The present disclosure generally relates to a liquid crystal display apparatus for use in a vehicle.

BACKGROUND INFORMATION

Conventionally, a liquid crystal display panel illuminated by a lighting device is used for displaying images in a vehicle. The liquid crystal display of the conventional apparatus has a control function for controlling a gradation value of pixel in the liquid crystal display panel, or for controlling light emission brightness of the lighting device as disclosed, for example, in Japanese patent documents JP-A-2004-284508, JP-A-2006-258783 or the like. The liquid crystal display panel in the conventional apparatus decreases the gradation value of the pixel or the light emission brightness of the lighting device for suppressing brightness of the image displayed on the display panel for the ease of viewing the image during the night or the like when external light brightness is low.

When the above control, that is, the decrease of the gradation value of the pixel or the light emission brightness of the lighting device is performed, the brightness of the image of the liquid crystal display is suppressed as a whole. In this case, the ease of viewing of meter images (images of instruments) for displaying vehicle condition values is improved by suppressing the brightness. However, an outside image that is generated by capturing outside world for calling attention for the situation outside of the vehicle as well as a warning image that warns abnormality of the vehicle or the images having similar purposes, that is, the images that require certain brightness, are not likely to achieve their original purposes.

SUMMARY OF THE INVENTION

In view of the above and other problems, the present disclosure provides a vehicle display apparatus that appropriately displays each of plural images of respectively different display purposes.

The display apparatus of the present invention for use in a vehicle includes: a liquid crystal panel capable of displaying an image in a vehicle, wherein the liquid crystal panel includes a meter display pixel that displays a meter image to represent a vehicle condition value and a warning display pixel that displays a warning image to warn the of the vehicle; an illumination unit capable of lighting the liquid crystal panel by emitting light; an input unit capable of accepting an input from an occupant of the vehicle, wherein the input unit receives the input of an adjustment value for controlling brightness of the image including the meter image and the warning image; and a control unit capable of controlling the liquid crystal panel and the illumination unit, wherein the control unit changes both of a meter display gradation ratio and a warning display gradation ratio according to the adjustment value so that the warning display gradation value is greater than the meter display gradation value when the meter display gradation ratio is defined as a ratio of the gradation value of the meter display pixel to a predetermined gradation value and the warning display gradation ratio is defined as a ratio of the gradation value of the warning display pixel to a predetermined gradation value.

The display apparatus of the present invention controls the meter display gradation ratio and the warning display gradation ratio respectively controlling meter display pixels and warning display pixels according to the input adjustment value that comes from occupants of the vehicle. The brightness of the meter image and the warning image is adjusted so that the brightness of the warning image stands out from the brightness of the meter image by adjusting the warning display gradation ratio to be greater than the meter display gradation ratio. Thus, the ease of viewing of the meter image is improved by sufficiently suppressing the brightness according to the input adjustment value, and, at the same time, the warning image is displayed with sufficient brightness maintained for achieving the display purpose of the image, that is, for calling the occupant's attention at the suppressed brightness. As a result, each of the meter image and the warning image respectively having different display purposes is appropriately displayed.

In addition, a setting gradation value that is used as a standard gradation ratio in the display of both of the meter display pixel and the warning display pixel may be respectively different from each other, or may be same.

Further, when the meter image pixels and the warning image pixels are respectively lit by a meter light and a warning light, light emission brightness of the meter light and the warning light is respectively controlled according to the adjustment value so that the warning light has greater light emission brightness than the meter light.

By the control described above, the meter image and the warning image are appropriately displayed at the suppressed brightness for the ease of viewing, without compromising the attention calling purpose of the warning image.

BRIEF DESCRIPTION OF THE DRAWINGS

Other objects, features and advantages of the present invention will become more apparent from the following detailed description made with reference to the accompanying drawings, in which:

FIG. 9 shows a diagram of a pixel gradation ratio in the first embodiment of the present invention;

FIG. 41 shows a front view of the vehicle display unit in a ninth embodiment of the present invention.

DETAILED DESCRIPTION

Figure 1:
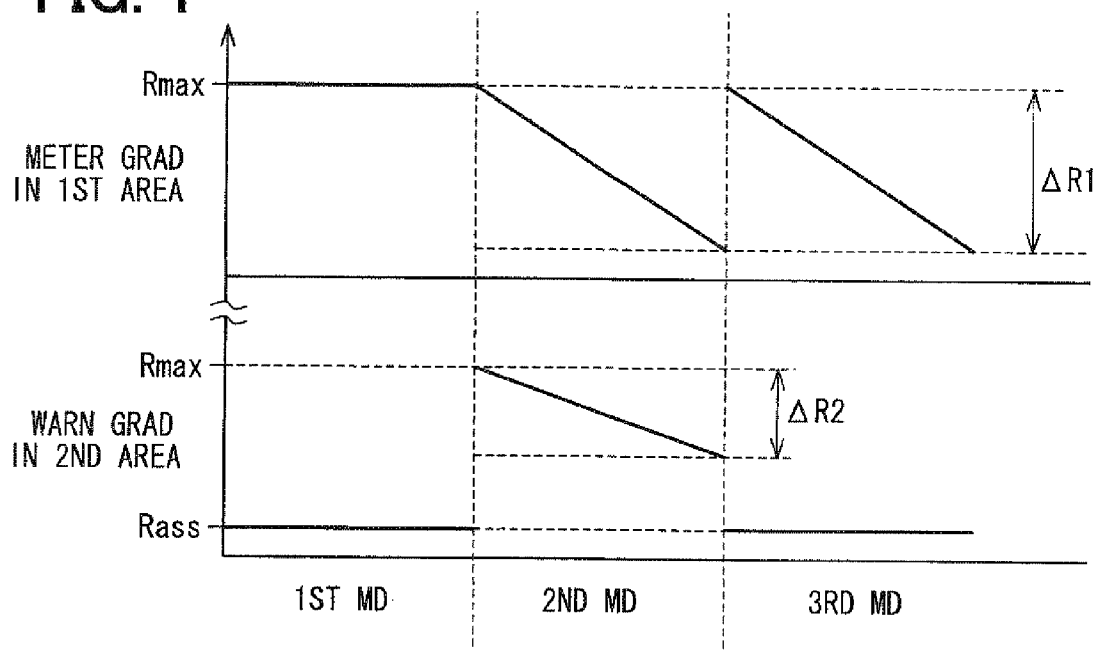
FIG. 1 shows a diagram of a gradation ratio of a first and second pixel area in a first embodiment of the present invention.

Plural embodiments of the present invention are explained based on the drawing as follows.

First Embodiment

Figure 2:
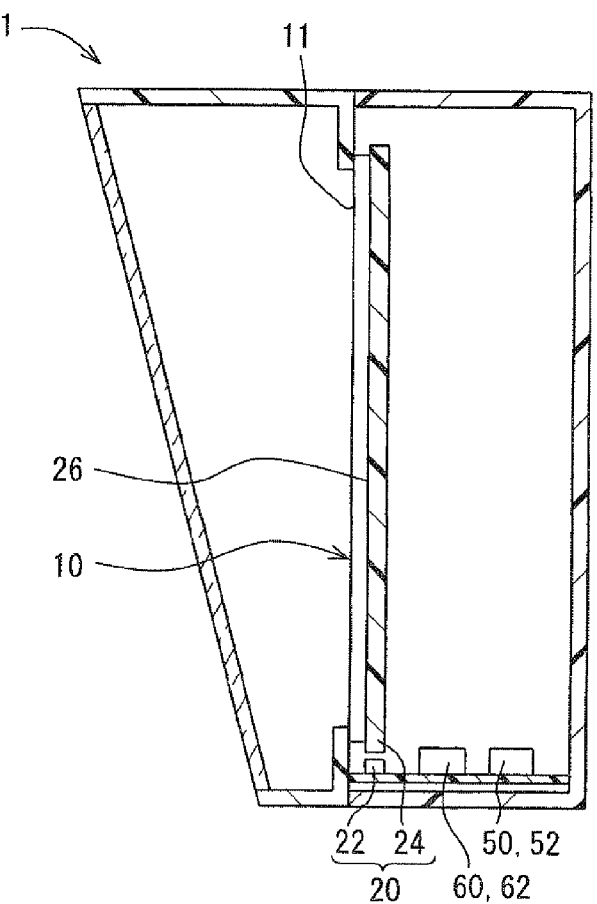
FIG. 2 shows a cross sectional view of a vehicle display unit along a II-II line in FIG. 3 in the first embodiment of the present invention.
Figure 3:
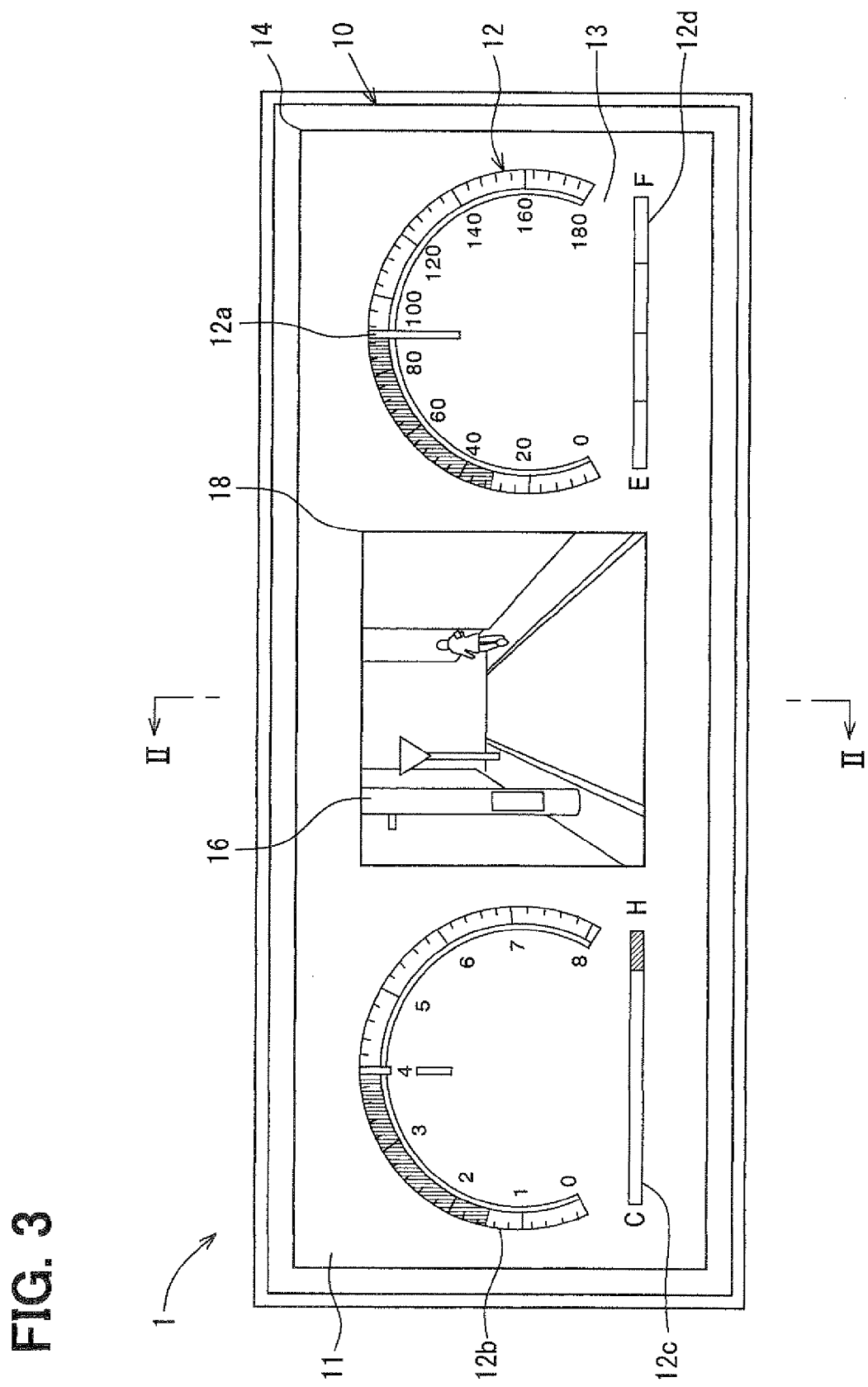
FIG. 3 shows a front view of the vehicle display unit in the first embodiment of the present invention.
Figure 4:
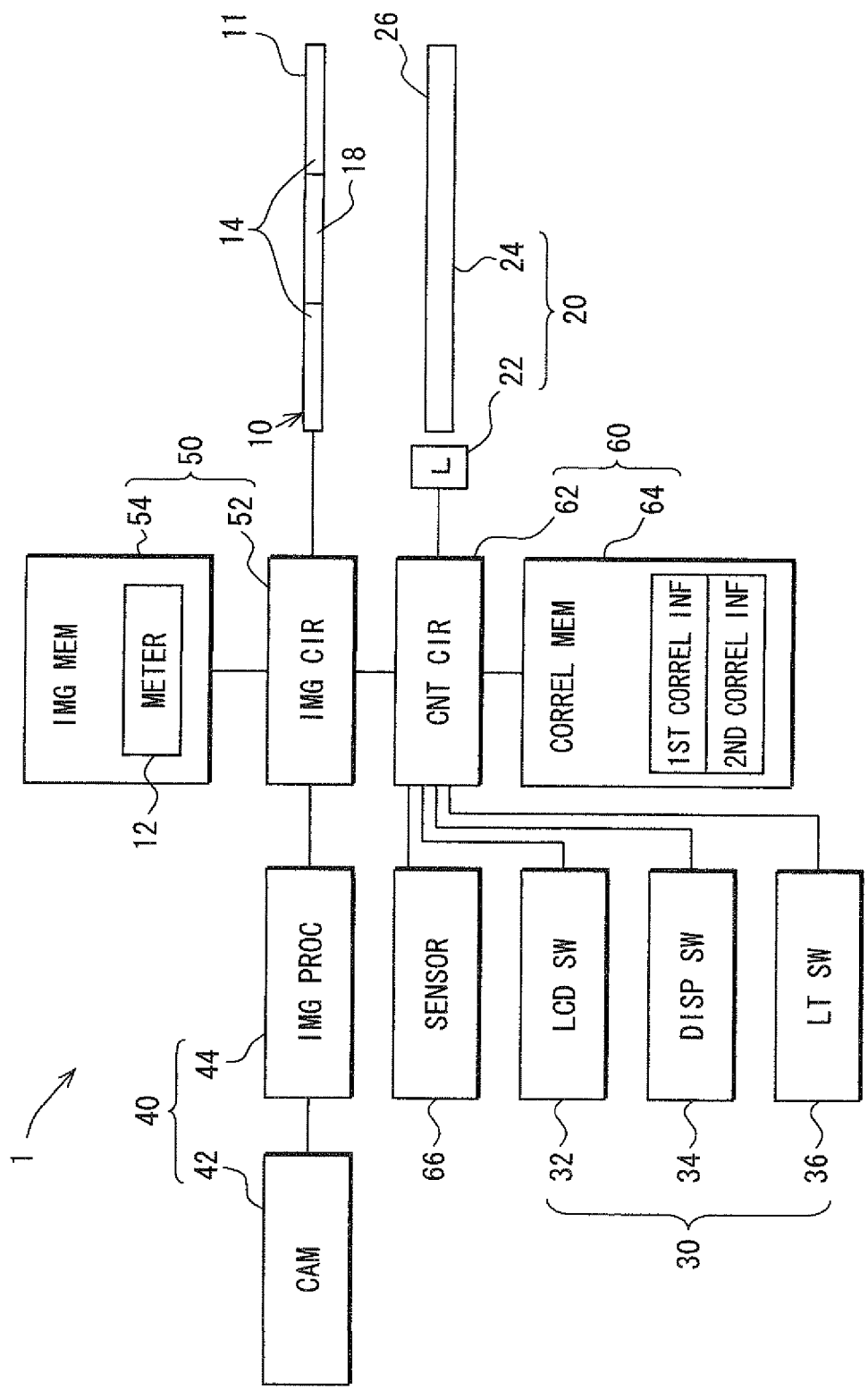
FIG. 4 shows a block diagram of electric circuit configuration of the vehicle display unit in the first embodiment of the present invention.

FIGS. 2, 3 show a cross-sectional view and a front view of a vehicle display unit 1 in the first embodiment of the present invention, and FIG. 4 shows electric circuit configuration of the unit 1.

The vehicle display unit 1 serves as a combination meter as shown in FIGS. 2 to 4, and includes a liquid crystal panel 10, a backlight 20, an input unit 30, an imaging unit 40, a drawing unit 50 and a main control unit 60.

The liquid crystal panel 10 is a TFT transparent liquid crystal panel, and the panel 10 is installed in front of the driver's seat with a screen 11 facing to the driver's seat side of the vehicle. The liquid crystal panel 10 is a dot matrix type panel having plural pixels arranged in the shape of a matrix, and realizes a full color image display on the screen 11 by driving each of the pixels. As for the pixel of the liquid crystal panel 10, three subpixels of R, G, B respectively equipped with a red/green/blue filter are disposed. The drawing unit 50 that drives the panel 10 receives a display instruction signal choosing the gradation value of each of the subpixels.

More practically, a certain hue of a pixel is represented by employing required subpixels among the subpixels that constitute the pixel. The ratios of gradation value of the required subpixels are set so that a desired hue is represented as a mixture of the hues of respective subpixels. The ratios of the gradation value of the subpixels are respectively determined to take a range of value that is greater than zero and is equal to or smaller than a setting gradation value. The ratio of the gradation value is designated as "gradation ratio" hereinafter. In addition, it becomes important that a hue does not change by having the same gradation values for each of the subpixels when plural subpixels are involved in a hue expression. By having the same gradation values, a display of instruments or other representations is easy to read by the occupant of the vehicle, thereby being prevented from false reading.

In the present embodiment, a display instruction signal is given to the drawing unit 50 so that the gradation value that sets establishment of the gradation ratio of the required subpixel determined in the above-described manner for a hue expression is chosen together with the gradation value of other subpixels being set to zero. To intelligibly simplifying the explanation in the following description, the gradation ratio of a subpixel that constitutes a pixel to be required for a hue expression is designated as "pixel gradation ratio."

The gradation value of the subpixel is set according to a gradation value table illustrated as, for example, a diagram in FIG. 9. The gradation value of the subpixel is standardized in terms of gradation value of 64 steps, that is, the value varies in a range between 0 and 63. The gradation value table is stored in the image memory 54 of the drawing unit 50. The gradation value is arbitrarily set to one of the 64 values. In the example as shown in FIG. 9, the setting gradation value of the subpixel R which is required for an expression of red is 63, and the setting gradation values of subpixels R and G that are required for an expression of yellow are respectively 63 and 31, and the setting gradation values of the subpixels R, G, B that are required for an expression of white are respectively 63, 63, 63. The setting gradation values are maximum values of the gradation values that can be chosen, thus the gradation ratio of the setting gradation value becomes 100% as a maximum ratio. In the present embodiment in particular, the gradation ratio becomes maximum when the brightness of the image becomes highest by the setting gradation value in the first mode (described later) where the backlight 20 is not reduced.

In addition, the setting gradation value may take a value that is different from either of 0 or 63 that are stored in the image memory 54. That is, among 64 steps of the gradation value, any value can be used. More practically, in an example of an expression of yellow as shown FIG. 9, the gradation value of 15 may be used for changing the gradation ratio of the subpixel G to 50%, because the setting gradation value of the subpixel G at the ratio 100% (the maximum ratio) is set to 31. Further, for an expression of red, the setting gradation value of the required subpixel R is set to 31 for the gradation ratio of 100%, and the setting gradation value of the subpixel R may be changed to 15 so that the maximum gradation ratio of the subpixel is changed from 100% to 50%.

The liquid crystal panel 10 of the present embodiment is formed by plural pixels, and the panel 10 has a first pixel area 14 having plural pixels to display a meter image 12 and a background image 13 as well as a second pixel area 18 having plural pixels to display an outside image 16 as shown in FIG. 3.

More practically, the meter image 12 is an image to indicate vehicle condition values for the occupant of the vehicle, which includes, in the present embodiment, a vehicle speed display image 12a showing vehicle speed, a tachometer image 12b showing engine rotation number a water temperature display image 12c showing the temperature of the engine coolant, a fuel meter image 12d showing a fuel residual quantity. The background image 13 is displayed as a background to let the meter image 12 stand out therefrom. The first pixel area 14 is defined in a rectangular outer peripheral portion substantially with an exception of the central part in the screen 11, and displays the meter image 12 and the background image 13 by driving each of the pixels constituting the area 14.

The outside image 16 is a warning image that captures a part of the outside of the vehicle by the imaging unit 40 to call an attention for the outside world situation of the vehicle. In the present embodiment, the outside image 16 is an image of the vehicle front area where the visible light from the headlight of the vehicle does not reach at night or at a time of passing a dark place, that is, a so-called night-view image. The second pixel area 18 is defined substantially as the central part of the screen 11 surrounded by the first pixel area 14, and the second pixel area 18 displays the outside image 16 by driving each of the pixels constituting the area 18.

The backlight 20 has a light emitting diode 22 and a diffusion board 24 as shown in FIGS. 2, 4. The light emitting diode 22 is a chip type diode, and is installed in the diagonal rear of the liquid crystal panel 10 in the vehicle. The light emitting diode 22 is driven to emit light under control of a light emission driving signal given from the main control unit 60 electrically connected thereto. The diffusion board 24 is formed of optically-transparent resin in the shape of a flat board, and the board 24 is disposed behind the liquid crystal panel 10 in parallel with the panel 10. The diffusion board 24 diffuses injected light from the diode 22 that is disposed adjacent thereto for emitting the light from a light-emitting surface 26 on the liquid crystal panel side to provide a substantially equal light emission brightness for a whole area of the surface 26. The backlight 20 lights the whole liquid crystal panel 10 by the light from the light-emitting surface 26 transparently from behind the panel 10.

The input unit 30 has a liquid crystal adjustment switch 32 as shown in FIG. 4, as well as a display on-off switch 34 and a light switch 36.

The liquid crystal adjustment switch 32 is installed around the liquid crystal panel 10, and the switch 32 is operated by an occupant to adjust the brightness of the display image of the liquid crystal panel 10. The switch 32 has positions that are predefined according to plural steps of adjustment values of the brightness of the display image of the liquid crystal panel 10. Therefore, the occupant can input an adjustment value by operating the switch 32 to a corresponding position.

The display on-off switch 34 is installed, for example, around the liquid crystal panel 10, and the switch is switched on/off to allow or to prohibit the display of the predetermined image. The display on-off switch 34 of the present embodiment regards the display of the outside image 16 in the second pixel area 18 of the liquid crystal panel 10 as an object of allowing or prohibiting display. Therefore, the occupant can allow or prohibit the display of the outside image 16 by operating the display on-off switch 34 to an on position or to an off position.

The light switch 36 is installed, for example, around a steering wheel in front of the driver's seat, and the switch 36 is switched on/off by an occupant of the vehicle to turn on/off the predetermined lamp of the vehicle. The light switch 36 of the present embodiment has three operation positions, that is, a side lamp on position that turns on tail lamps of the vehicle, a headlamp on position that turns on all lamps, and an all lamp off position that turns off tail lamps of the vehicle. Therefore, the occupant can input a lighting instruction corresponding to one of those positions to turn on/off the lamps by operating the switch 36.

Each of the above-mentioned switches 32, 34, 36 is electrically connected to the main control unit 60, and transmits a signal that represents an input corresponding to respective operation positions.

The imaging unit 40 has a camera 42 and an image processing circuit 44. The camera 42 captures the outside world of the vehicle by an image pickup unit such as CCD or the like. The camera 42 of the present embodiment is installed, for example, in a front bumper or in a front grill of the vehicle, and the camera 42 converts, into an image signal, a reflected light that is caused by an infrared light projected toward a vehicle front by an exclusive floodlight or by a headlight with the image pickup unit. The image processing circuit 44 is constructed by a microcomputer, and is installed in the vehicle to be connected to the camera 42 electrically. The image processing circuit 44 generates an outside world image of the vehicle front by processing a picture signal from the camera 42. The imaging unit 40 captures a part of the outside world where the visible light of the headlight does not reach at night or at a time of passing a dark place of the vehicle by the camera 42, for acquiring the outside image 16.

The drawing unit 50 has an image drawing circuit 52 and an image memory 54 as shown in FIGS. 2, 4. The drawing circuit 52 is set up behind the light emitting diode 22 in the vehicle in a form of an IC chip such as an ASIC or the like, and the circuit 52 is connected to the liquid crystal panel 10 and the main control unit 60 electrically. The image memory 54 is provided as an EEPROM, and is electrically connected to the drawing circuit 52. In the image memory 54, the meter image 12 and the background image 13 are pre-memorized as image information prior to a shipment of the unit 1 from a factory or the like. The drawing circuit 52 begins to read the predetermined meter image 12 and the background image 13 from the image memory 54 in response to a display instruction signal from the main control unit 60 as described above, and the circuit 52 lets the screen 11 display the meter image 12 and the background image 13 according to the display instruction signal by driving each of the pixels that constitute the first pixel area 14.

In addition, the drawing circuit 52 of the drawing unit 50 in the present embodiment is also electrically connected to the image processing circuit 44 of the imaging unit 40. Thus, the drawing circuit 52 reads the outside image 16 from the imaging unit 40 in response to a display instruction signal from the main control unit 60, and the circuit 52 lets the screen 11 display the outside image 16 according to the display instruction signal by driving each of the pixels that constitute the second pixel area 18.

The main control unit 60 has a control circuit 62 and a correlation information memory 64. The main control unit 60 is set up behind the light emitting diode 22 in a vehicle in a form of the microcomputer. The control circuit 62 is electrically connected to the light emitting diode 22 of the backlight 20, each of the switches 32, 34, 36 of the input unit 30, the drawing circuit 52 of the drawing unit 50 and a state value sensor 66 (not shown in the drawing). The state value sensor 66 detects vehicle speed, engine rotation number, engine cooling water temperature, fuel residual quantity, and the like that are displayed as the meter image 12 of vehicle state value in the first pixel area 14 of the liquid crystal panel 10, and the sensor 66 transmits a signal expressing the detection result to the control circuit 62.

The correlation information memory 64 is formed as an EEPROM, and is electrically connected to the control circuit 62. In the correlation information memory 64, the first correlation information and the second correlation information are pre-memorized prior to a shipment of the unit 1 from the factory or the like. More practically, the first correlation information represents a correlation between the gradation ratio when the meter image 12 is displayed on a predetermined condition and the input adjustment value from the liquid crystal adjustment switch 32 (designated as an "input adjustment value" hereinafter) among the gradation ratio of the pixels to display the meter image 12 in the first pixel area 14 (designated as a "meter gradation ratio" hereinafter). Further, the second correlation information represents a correlation between the gradation ratio of the pixels when the outside image 16 is displayed on a predetermined condition among the gradation ratio of the pixels to display the outside image 16 as "warning pixels" (designated as a "warning gradation ratio" hereinafter) in the second pixel area 18 and the input adjustment value.

Figure 5:
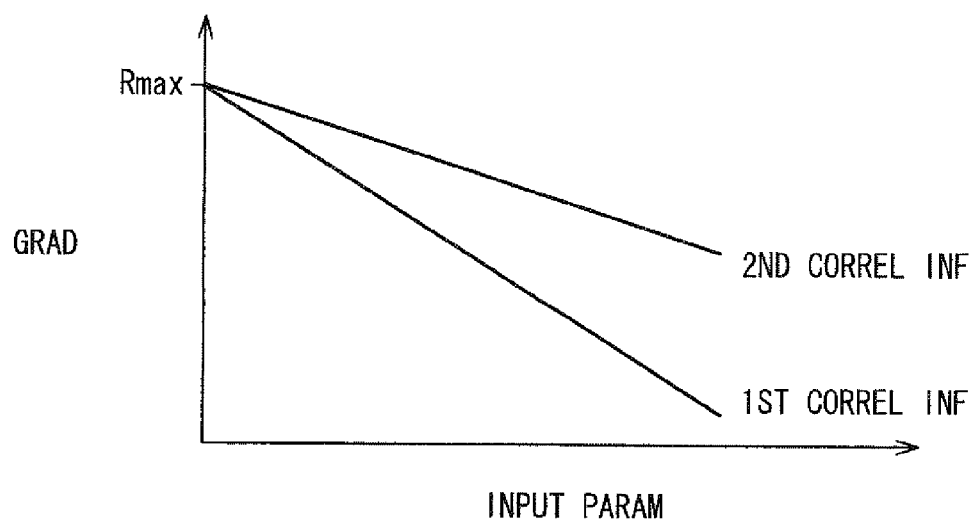
FIG. 5 shows a diagram of first and second correlation information in the first embodiment of the present invention.

In the present embodiment in particular, the first correlation information and the second correlation information are respectively defined as follows. That is, as shown in FIG. 5, in proportion to an increasing change of the input adjustment value (indicated as "INPUT PARAM (i.e., input parameters)" on the horizontal axis), the first correlation information represents a linear decrease of the meter image gradation ratio ("GRAD (i.e., gradation)" on the vertical axis) in the first pixel area 14 starting from the maximum ratio Rmax, and the second correlation value represents a linear decrease of the warning image gradation ratio in the second pixel area 18 starting from the same maximum ratio Rmax. Further, the decrease ratio is greater for the first correlation information than for the second correlation information. Thus, when the input adjustment value increases, the correlation represented by the second correlation information changes the warning image gradation ratio to be greater than the meter image gradation ratio for the same input adjustment value in a decreasing trend from the maximum ratio of Rmax.

In addition, the first and the second correlation information may be memorized as table data in the correlation information memory 64, or the correlation information may be memorized as map data, or may it be memorized as function data.

The control circuit 62 in FIG. 4 generates, based on signals from each of the switches 32, 34, 36 and from the state value sensor 66 as well as the first and the second correlation information read from the correlation information memory 64, as described above, a display instruction signal. The display instruction signal controls the drive of each pixel of the liquid crystal panel 10 by being given to the drawing circuit 52 of the drawing unit 50. Therefore, in the according to, "giving the drawing circuit 52 a display instruction signal" is described as "controlling the liquid crystal panel 10."

In addition, the control circuit 62 generates, based on signals from each of the switches 32, 34, 36 and from the state value sensor 66 as well as the first and the second correlation information, a light emission driving signal. The light emission driving signal controls the drive of the light emitting diode 22 by being given to the light emitting diode 22 of the backlight 20. Therefore, in the according to, "giving the light emitting diode 22 a light emission driving signal" is described as "controlling the backlight 20."

Figure 6:
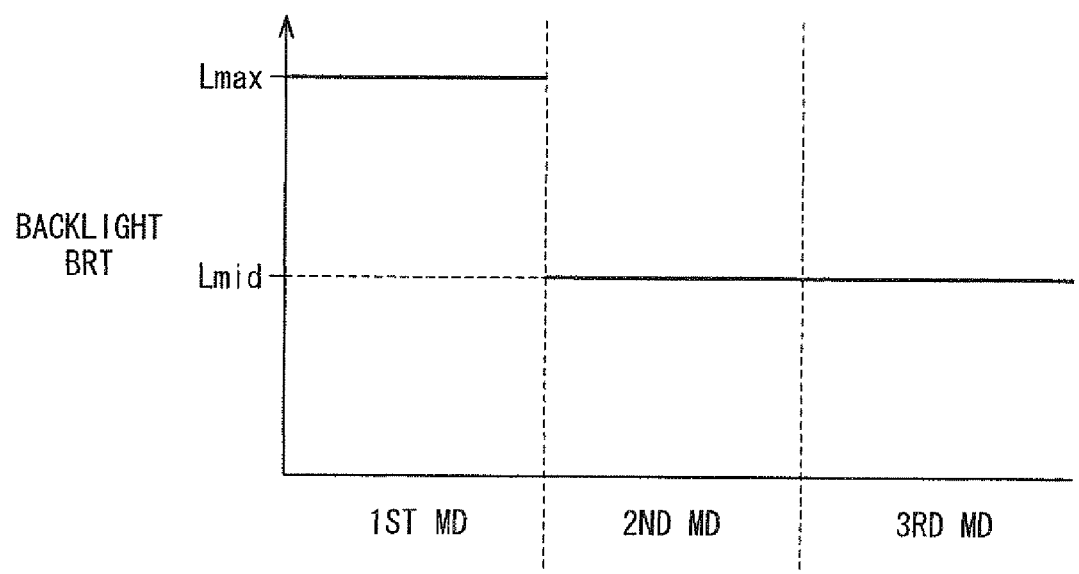
FIG. 6 shows a diagram of light emission brightness of a backlight in the first embodiment of the present invention.
Figure 7:
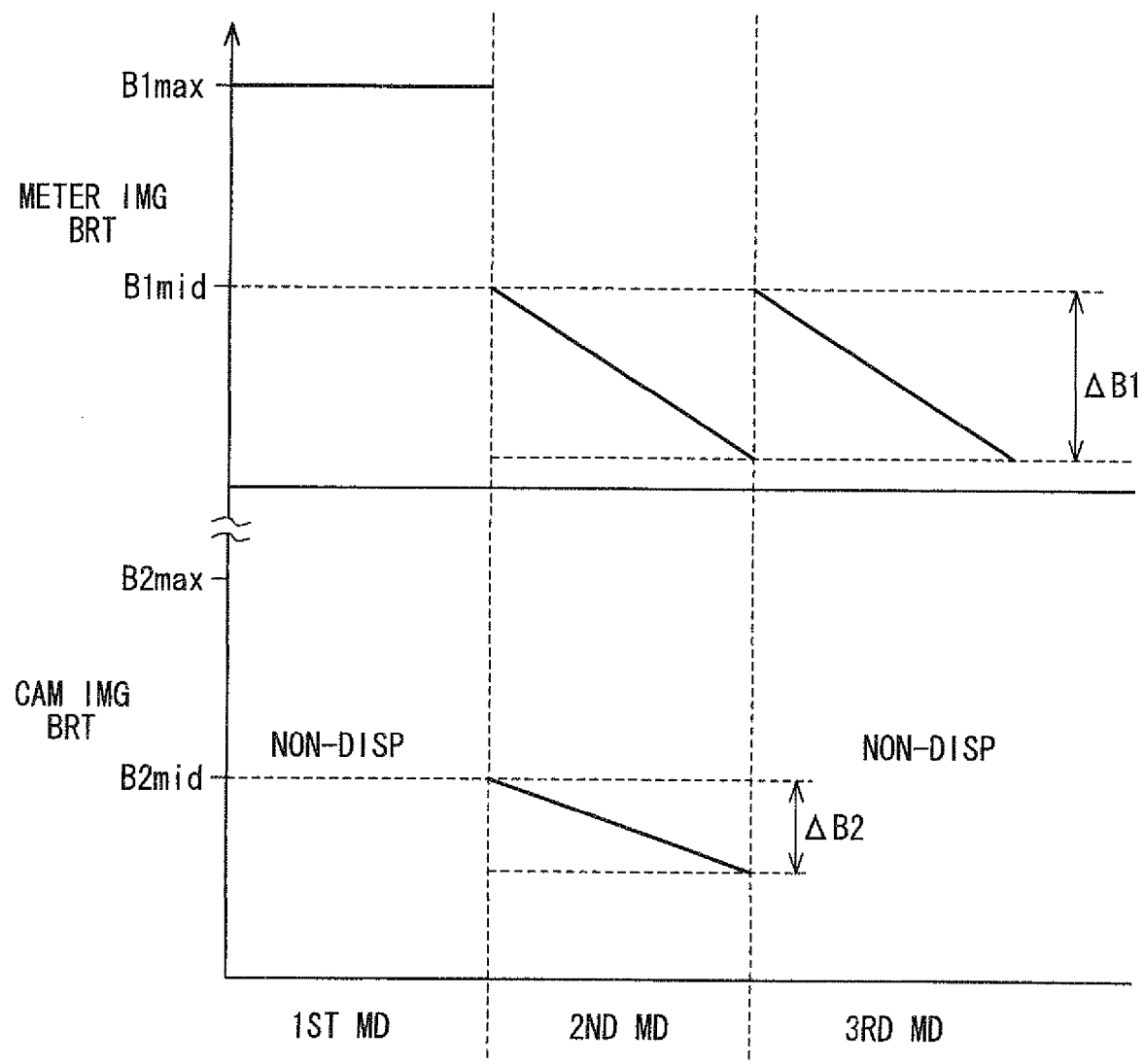
FIG. 7 shows a diagram of meter image brightness and outside image brightness in the first embodiment of the present invention.

The display operation of the vehicle display unit 1 of the first embodiment is explained next while referring to FIGS. 6, 1, 7. That is, FIG. 6 shows a diagram of the light emission brightness of emitted light from the backlight 20, FIG. 1 shows the gradation ratio of each of the pixel areas 14, 18, and FIG. 7 shows brightness of each of the images 12, 16. In addition, the gradation ratio and the hue of the pixels to display the background image 13 in the first pixel area 14 are fixed to let the meter image 12 stand out from the background in the display operation and the control flow described later.

(1) First Mode

The control circuit 62 of the main control unit 60 sets a control mode to a first mode when the circuit 62 receives a signal from the light switch 36 expressing all lights off position or a signal from the display on-off switch 34 expressing a prohibition instruction of the display of the outside image 16. In addition, the first mode set in this manner is usually realized in daytime.

More practically, the control circuit 62 maintains, by controlling the backlight 20, the light emission brightness in the light-emitting surface 26 of the diffusion board 24 at a constant maximum luminance Lmax (FIG. 6) against a change of the input adjustment value in the first mode.

In addition, the control circuit 62 maintains, by controlling the liquid crystal panel 10, the meter display gradation ratio of the first pixel area 14 at a constant maximum ratio Rmax (FIG. 1) against a change of an input adjustment value in the first mode.

By the above operation scheme, the meter image 12 will be displayed at a maximum allowable brightness B1max (FIG. 7) in the first mode.

In addition, the warning display gradation ratio and the hue of the second pixel area 18 in the first mode are adjusted to a level so that the outside image 16 is assimilated into the background image 13 (Rass of FIG. 1). However, when the term "assimilation" of the outside image 16 into the background image 13 is used, it not only indicates that the outside image 16 assimilates into the background image 13 completely, but also indicates that, even though the hues of those images are different, smallness of the gradation value difference makes it difficult to distinguish those images, thereby leading to a substantial assimilation. Therefore, in other words, the outside image 16 is not substantially displayed in appearance (FIG. 7).

(2) Second Mode

The control circuit 62 sets the control mode to the second mode when the circuit 62 receives a signal from the light switch 36 expressing a side lamp on position or a headlight on position, or receives a signal from the display on-off switch 34 expressing a permission instruction of the display of the outside image 16. In addition, the second mode set in this manner is realized when, for example, the vehicle travels at night or passes particularly dark places in terms of lighting.

More practically, the control circuit 62 maintains, in the second mode, the light emission brightness at a constant intermediate brightness Lmid (FIG. 6) against a change of the input adjustment value that is lower than the maximum luminance Lmax by controlling the backlight 20.

In addition, the control circuit 62 maintains, by controlling the liquid crystal panel 10, the meter display gradation ratio of the first pixel area 14 to the correspondence ratio of the input adjustment value according to the first correlation information of the correlation information memory 64 in the second mode. That is, the meter display gradation ratio is adjusted to the value in a range ΔR1 (FIG. 1) that is equal to or smaller than the maximum ratio Rmax according to the input adjustment value in the second mode.

Furthermore, the control circuit 62 changes, by controlling the liquid crystal panel 10, the warning display gradation ratio of the second pixel area 18 to the correspondence ratio of the input adjustment value according to the second correlation information of the correlation information memory 64 in the second mode. That is, the warning display gradation ratio in the second mode is adjusted to a value in a range ΔR2 (FIG. 1) that is equal to or smaller than the maximum ratio Rmax and greater than the gradation ratio of the meter display in the first pixel area 14 according to the input adjustment value.

In the second mode, the images 12, 16 will be respectively displayed in brightness that is preferred by the occupant respectively in ranges of ΔB1, ΔB2 that is equal to or under the intermediate brightness B1mid, B2mid (FIG. 7) against the maximum allowable brightness B1max B2max so that, for example, the outside image 16 becomes brighter than the meter image 12.

(3) Third Mode

The control circuit 62 sets the control mode to a third mode when the circuit 62 receives a signal from the light switch 36 expressing a side lamp on position or a headlight on position, or receives a signal from the display on-off switch 34 expressing the prohibition instruction of the display of the outside image 16. In addition, the second mode set in this way is realized when, for example, the vehicle travels a relatively light dark place that is lit by many lights.

More practically, the control circuit 62 maintains the light emission brightness at the same level as the second mode (FIG. 6) by controlling the backlight 20 in the third mode.

In addition, the control circuit 62 changes the meter display gradation ratio of the first pixel area 14 to the same level as the second mode (FIG. 1) by controlling the liquid crystal panel 10 in the third mode.

In contrast, the warning display gradation ratio and the hue of the second pixel area 18 in the third mode are adjusted to a level so that the outside image 16 is assimilated into the background image 13 (Rass of FIG. 1).

By the above adjustment, the meter image 12 in suppressed brightness of the occupant's preference in the range ΔB1 (FIG. 7) is displayed in the third mode. On the other hand, the outside image 16 is not displayed in appearance (FIG. 7) by the above control.

Figure 8:
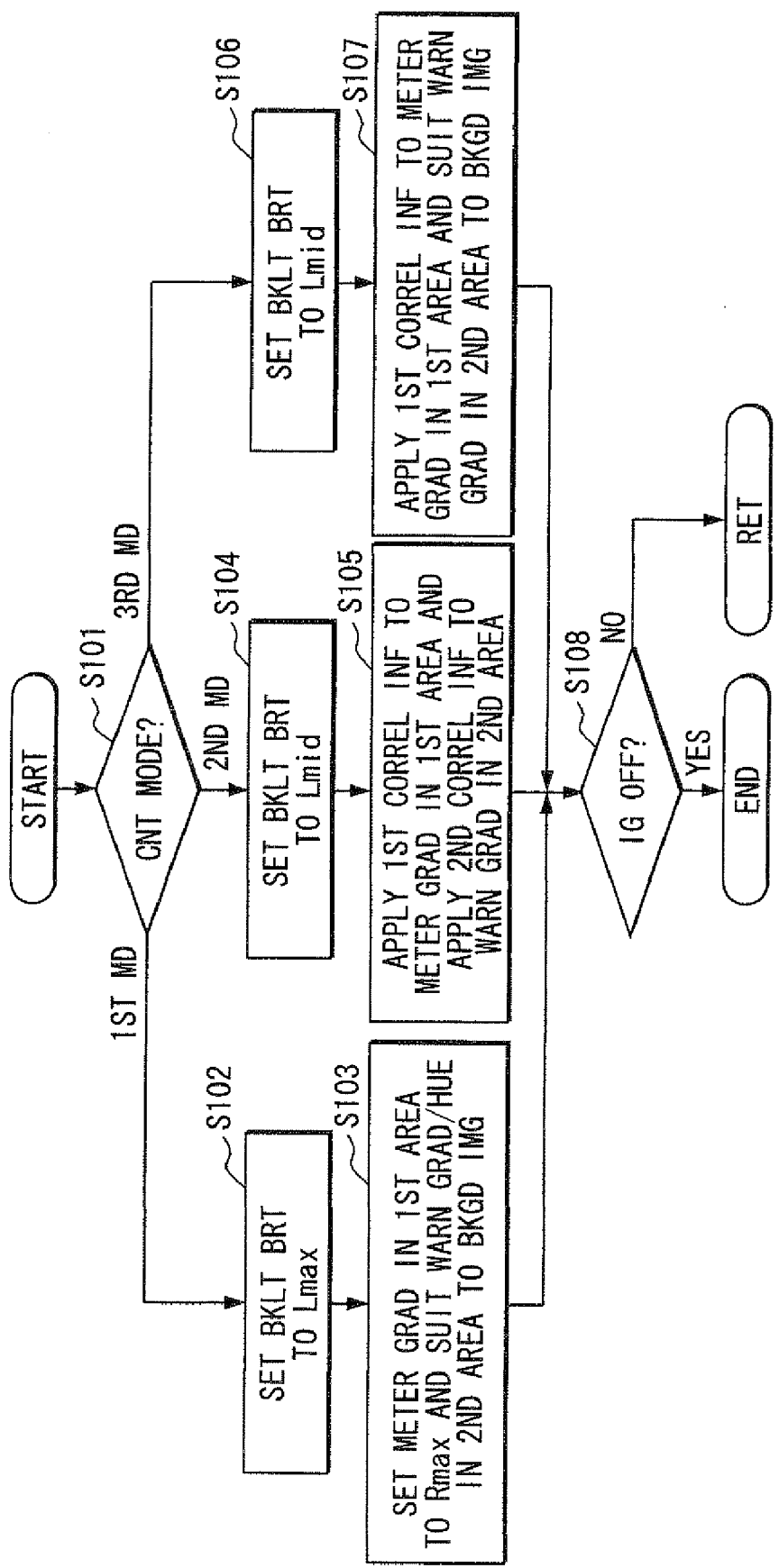
FIG. 8 shows a flow chart of a control flow in the first embodiment of the present invention.

A control flow by the control circuit 62 in the first embodiment is explained next referring to FIG. 8. When an ignition switch of the vehicle is turned on, the control flow starts.

At first, in step S101, when the control mode is set to either of the first mode, second mode or third mode, according to each of the signals from the light switch 36 and from the display on-off switch 34.

When the control mode is set to the first mode in step S101, the process of the control flow proceeds to step S102. In step S102, the light emission brightness is adjusted to the maximum luminance Lmax as the backlight 20 being regarded as an object of control. Then, in step S103, by adjusting the meter display gradation ratio in the first pixel area 14 to the maximum ratio Rmax as the liquid crystal panel 10 being regarded as an object of control, the meter image 12 is displayed at the maximum allowable brightness B1max. At the same time in step S103, the warning display gradation ratio and the hue of the second pixel area 18 are controlled so that the outside image 16 assimilates into the background image 13 as the liquid crystal panel 10 being regarded as an object of control.

On the other hand, when the second mode is set in step S101, the process proceeds to step S104. In step S104, the light emission brightness is adjusted to the intermediate luminance Lmid as the backlight 20 being regarded as an object of control. Then, in step S105, by adjusting the meter display gradation ratio in the first pixel area 14 in the range ΔR1 according to the first correlation information as the liquid crystal panel 10 being considered as an object of control, the meter image 12 is displayed at suppressed brightness in the range ΔB1. At the same time, in step S1057 by controlling the warning display gradation ratio and the hue of the second pixel area 18 in the range ΔR2 according to the second correlation information as the liquid crystal panel 10 being considered as an object of control, the outside image 16 is displayed at suppressed brightness in the range ΔB2.

When the control mode is set to the third mode in step S101, the process of the control flow proceeds to step S106. In step S106, the light emission brightness of the backlight 20 is controlled like in step S104. Then, in step S107, like in step S105, by adjusting the meter display gradation ratio of the first pixel area 14, the meter image 12 is displayed at suppressed brightness in the range ΔB1. At the same time, in step S107, with a method different from step S105, the warning display gradation ratio and the hue of the second pixel area 18 is practically adjusted so that the outside image 16 is assimilated into the background image 13 as the panel 10 being regarded as an object of control, thereby putting the outside image 16 in a non-display condition.

In addition, after step S103, S105, or S107, the process always proceeds to step S108, and whether the ignition switch is turned off is determined. As a result, when the determination is affirmative, the control flow is finished. When the determination is negative, the process returns to step S101, and this control flow is continued.

According to the first embodiment described above, the brightness of the outside image 16 is suppressed according to the input adjustment value in the second mode where the outside image 16 is displayed with the meter image 12. However, because the relative brightness of the outside image 16 against the meter image 12 is increased by characteristic gradation ratio control in each of the pixel areas 14, 18, the purpose of the display of the outside image 16 for calling the attention is prevented from deterioration. On the other hand, the visibility of the meter image 12 is raised because the brightness of the image 12 is sufficiently suppressed to the level of occupant's preference. Therefore, in the first embodiment, the images 16, 12 having different display purposes can be appropriately displayed for achieving the respective purposes.

In the above description of the first embodiment, the backlight 20 is equivalent to an "illumination unit" and "a total light source," the input unit 30 is equivalent to an "input unit," the imaging unit 40, the drawing unit 50 and the main control unit 60 are equivalent to a "control unit," and the drawing unit 50 and the main control unit 60 is equivalent to a "gradation ratio adjustment unit." In addition, in the first embodiment, the correlation information memory 64 is equivalent to "the correlation information storage unit," and the first and the second correlation information in the memory 64 are equivalent to "correlation information stored in the correlation information storage unit."

Second Embodiment

The second embodiment of the present invention is the modification of the first embodiment. In addition, in the according to description, the focus is mainly put on the explanation of the difference of the second embodiment from the first embodiment on the first embodiment.

Figure 10:
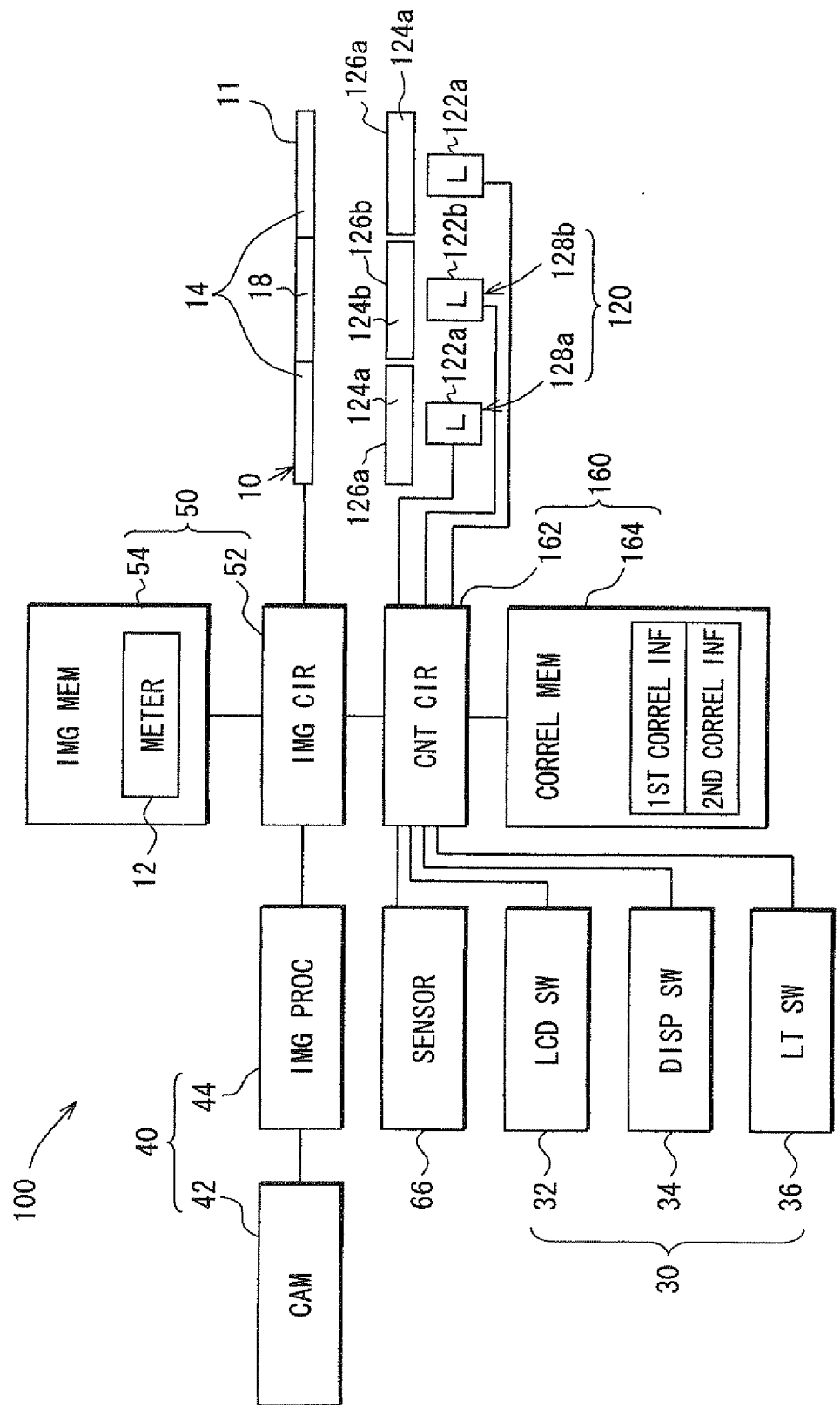
FIG. 10 shows a block diagram of the electric circuit configuration of the vehicle display unit in a second embodiment of the present invention.

A backlight 120 uses two sets of lighting, that is, a first light emitting diode 122 and a first diffusion board 124a which emit light transparently at both sides of the second pixel area 18 to light up the first pixel area 14 of the liquid crystal panel 10 as a first light source 128a in the vehicle display unit 100 of the second embodiment as shown in FIG. 10. In addition, the backlight 120 uses two sets of lighting, that is, a second light emitting diode 122b and a second diffusion board 124b which emit light transparently to light up the second pixel area 18 at the substantially central part of the liquid crystal panel 10 as a second light source 128b.

The light emitting diodes 122a, 122b are electrically connected to a control circuit 162 of a main control unit 160 in each of the light sources 128a, 128b, and emit light respectively according to a light emission drive signal provided from the main control unit 160. In addition, the light that is incident respectively from the light emitting diodes 122a, 122b on the diffusion boards 124a, 124b in each of the light sources 128a, 128b is scattered by each of the diffusion boards 124a, 124b, and the light is then emitted from the light-emitting surfaces 126a, 126b on the liquid crystal panel 10 side. Therefore, each of the pixel areas 14, 18 of the liquid crystal panel 10 will be lit up transparently by the light from each of the light-emitting surfaces 126a, 126b of the light sources 128a, 128b that emit the light with substantially uniform luminance.

In addition, the first and the second correlation information that are different from the first embodiment are memorized in the second embodiment beforehand in a correlation information memory 164 of the main control unit 160. More practically, the first correlation information represents a correlation between the light emission brightness the light emission surface 126 and the input adjustment on a predetermined condition for displaying the meter image 12 in the first pixel area 14. The light emission brightness of the light emitting surface 126a of the first light source 128a is designated hereinafter as the light emission brightness of the first light source 128a. Further, the first correlation information represents a correlation between the light emission brightness of the light emission surface 126b and the input adjustment on a predetermined condition for displaying the outside image 16 in the second pixel area 18. The light emission brightness of the light emitting surface 126b of the first light source 128b is designated hereinafter as the light emission brightness of the second light source 128b.

Figure 11:
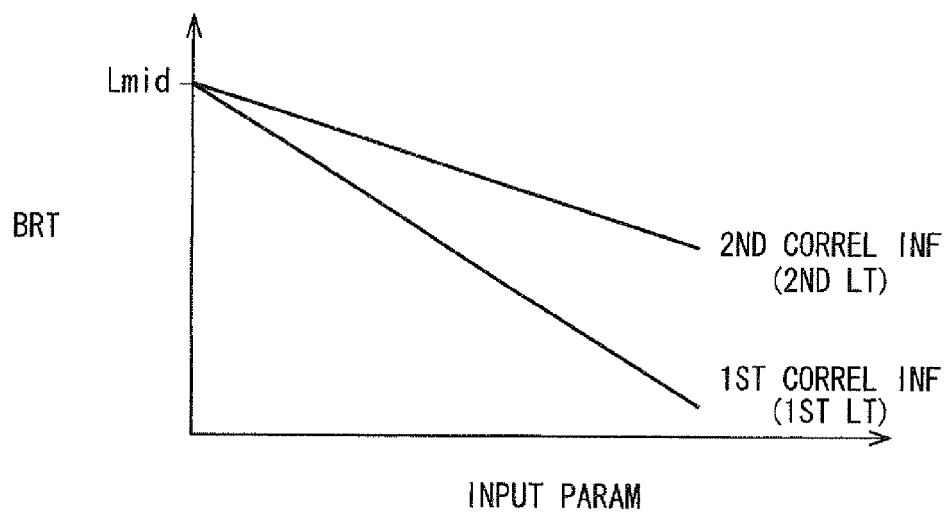
FIG. 11 shows a diagram of the first and the second correlation information in the second embodiment of the present invention.

In the present embodiment in particular, the first correlation information and the second correlation information are defined that the light emission brightness of respective light sources 128a, 128b linearly decrease in this case from an intermediate brightness Lmid as shown in FIG. 11 according to an increasing change of the input adjustment value, and linear decrease ratio of the light emission brightness of the second light source 128b is defined to be smaller than the linear decrease ratio of the first light source 128a. Thus, the correlation that the second correlation information represents is configured, relative to the correlation of the first correlation information, in a manner that the light emission brightness of the second light source 128b is greater than the brightness of the first light source 128 at the same input adjustment value in the course of decrease from the intermediate brightness Lmid when the input adjustment value increases.

In the second embodiment, the control circuit 162 of the main control unit 160 as shown in FIG. 10 generates a display instruction signal based on the first and the second correlation information read from the correlation information memory 164, and signals form each of the switches 32, 34, 36 and from the state value sensor 66. The display instruction signal controls the drive of each pixel of the liquid crystal panel 10 by being provided for, similarly as the case in the first embodiment, the drawing circuit 52 of the drawing unit 50, and the operation of "giving the drawing circuit 52 a display instruction signal" is described as "controlling the liquid crystal panel 10" in the according to.

In addition, the control circuit 162 generates a light emission driving signal based on the first and the second correlation information, and signals form each of the switches 32, 34, 36 and from the state value sensor 66. The light emission driving signal controls the drive of the light emission diodes 122a, 122b in the light sources 128a, 128b by respectively being provided for the diodes 122a, 122b. Therefore, in the according to, the operation of "giving the diodes 122a, 122b a light emission driving signal" is described as "controlling the light sources 128a, 128b" in the according to.

Figure 12:
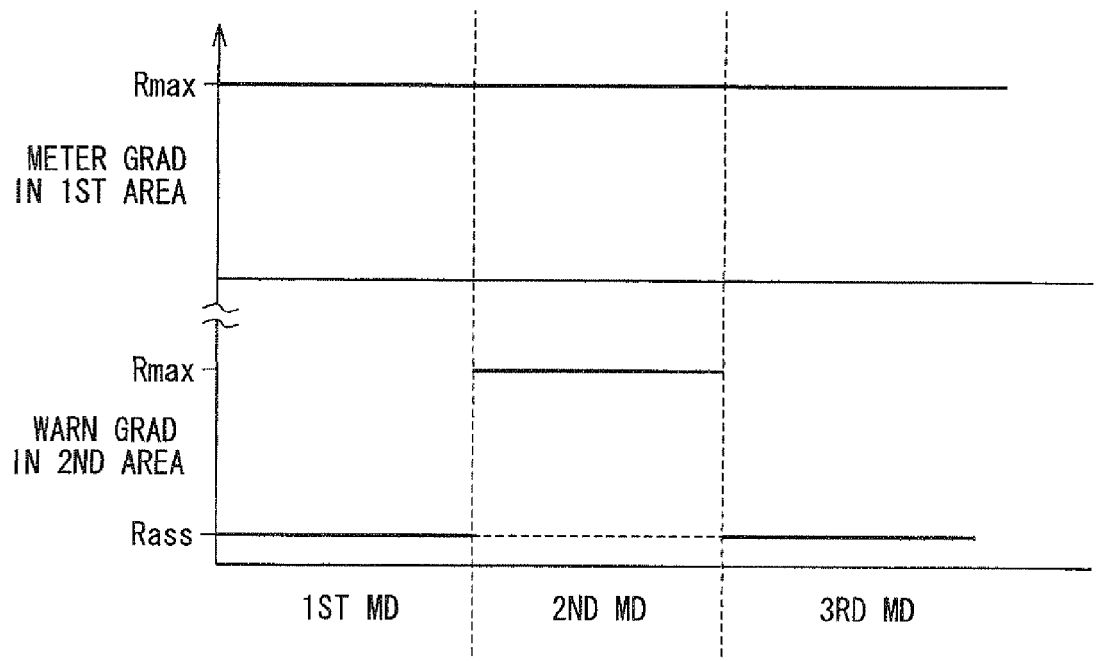
FIG. 12 shows a diagram of a gradation ratio of a first and second pixel area in the second embodiment of the present invention.
Figure 13:
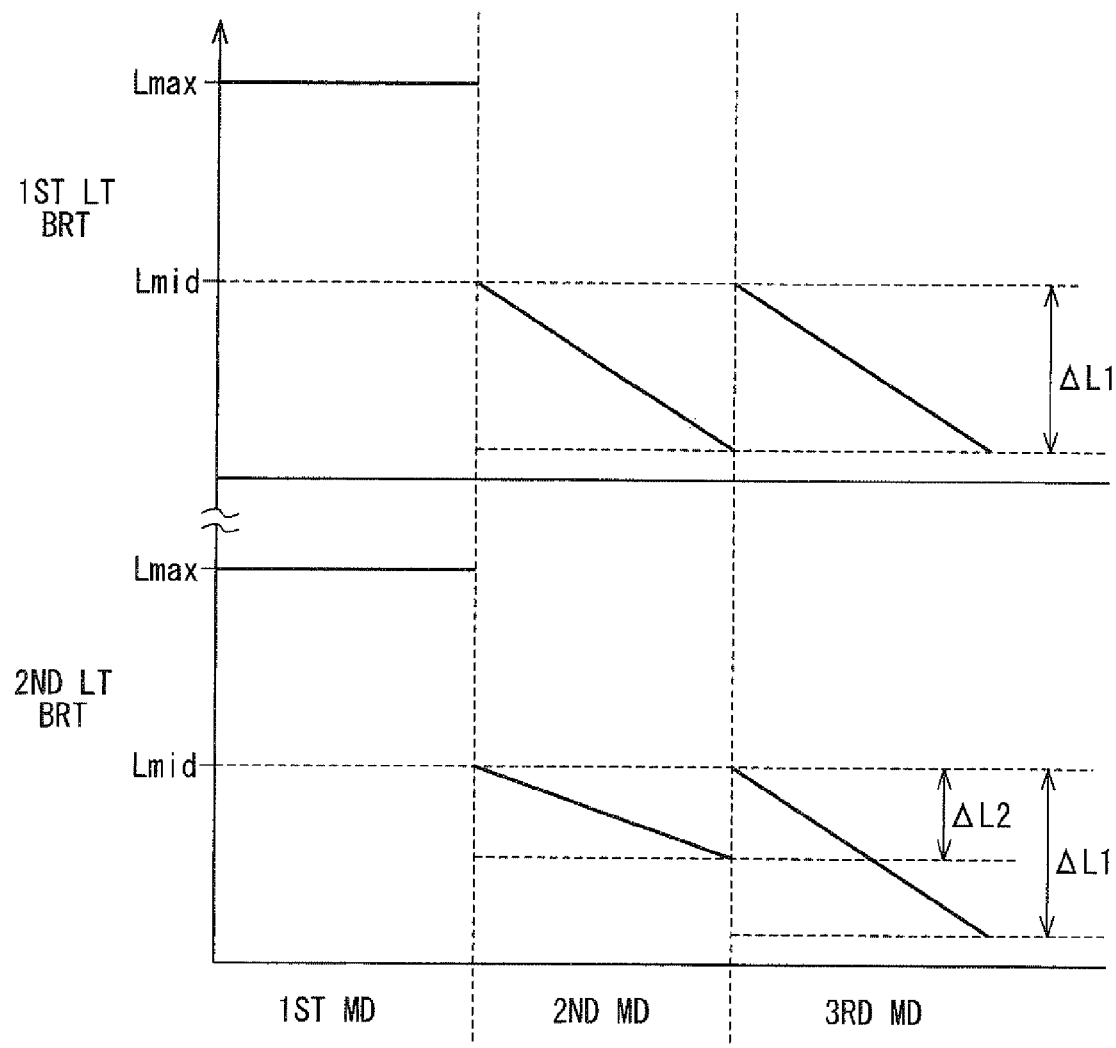
FIG. 13 shows a diagram of the light emission brightness of a first and second light source in the second embodiment of the present invention.
Figure 14:
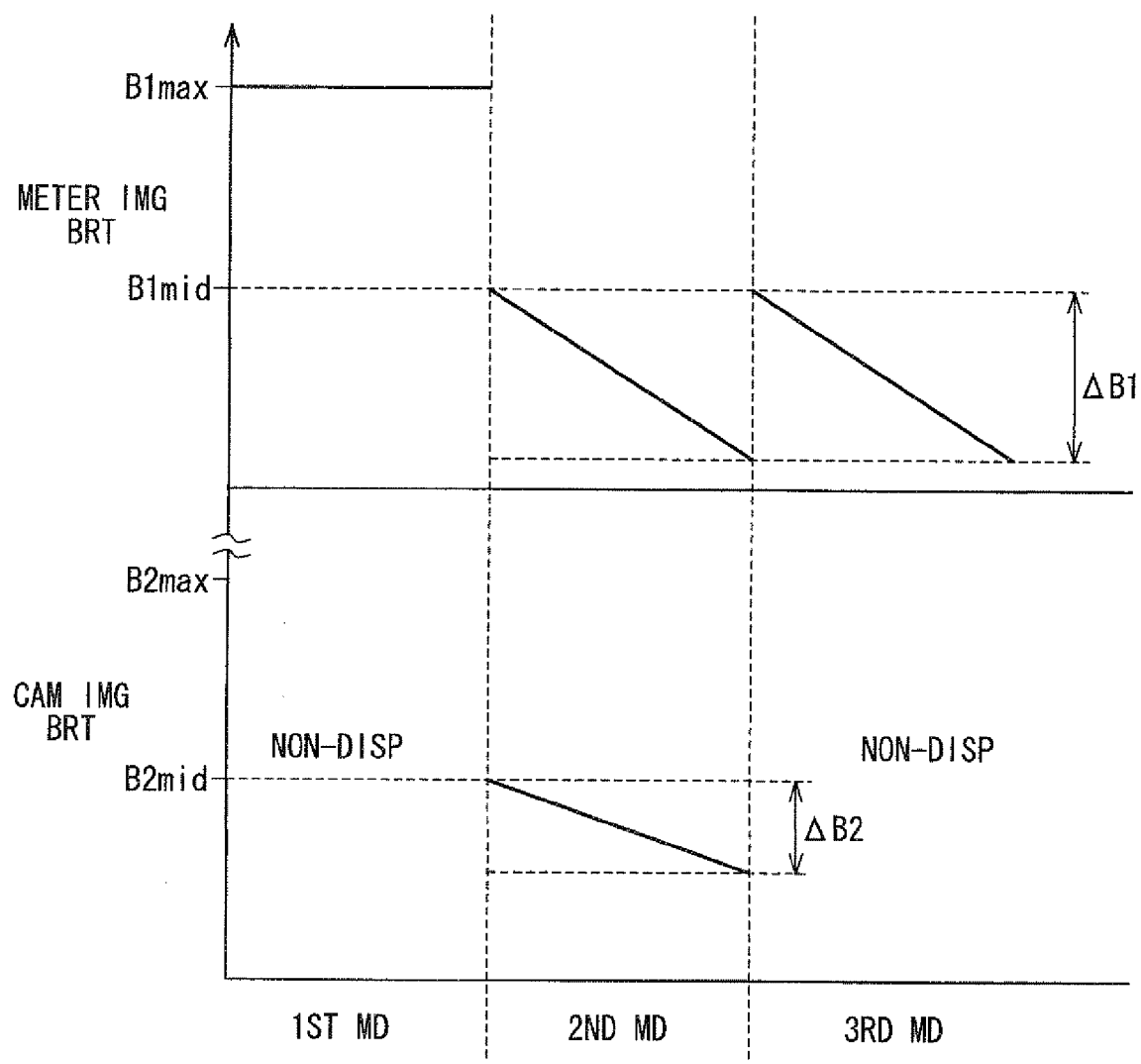
FIG. 14 shows a diagram of the meter image brightness and the outside image brightness in the second embodiment of the present invention.

The display operation of the vehicle display unit 100 by the second embodiment is explained next while referring to FIGS. 12-14. FIG. 12 shows a gradation ratio of the pixel areas 14, 18, FIG. 13 shows the light emission brightness of the light sources 128a, 128b, and FIG. 14 shows the brightness of the images 12, 16. In addition, in the control flow (described later) and the display operation of the second embodiment, the gradation ratio and the hue of the pixel that displays the background image 13 in the first pixel area 14 is fixed to let the display of the meter image 12 stand out from the background image 13.

(1) First Mode

The control circuit 162 maintains the meter display gradation ratio of the first pixel area 14 at a constant maximum ratio Rmax (FIG. 12) for an input adjustment value change in the first mode by controlling the liquid crystal panel 10.

In addition, the control circuit 162 maintains the light emission brightness at a constant maximum luminance Lmax (FIG. 13) for an input adjustment value change in the first mode by controlling the first light source 128*a*.

Thus, the meter image 12 will be displayed at an allowable maximum brightness B1 max (FIG. 14) in the first mode.

In addition, the warning display gradation ratio and the hue of the second pixel area 18 in the first mode are adjusted to a level so that the outside image 16 is assimilated into the background image 13 (Rass of FIG. 12). In addition, the brightness of the second light source 128*b* is controlled in the first mode so that the light emission brightness of the second light source 128*b* accords with light emission brightness of the first light source 128*a* (Lmax of FIG. 13). Therefore, in other words, the outside image 16 is not substantially displayed in appearance (FIG. 14).

(2) Second Mode

The control circuit 162 maintains the first meter display gradation ratio of the first pixel area 14 and the warning display gradation ratio of the second pixel area 18 to the same level (FIG. 12) as a case of the meter display gradation ratio in the first mode by controlling the liquid crystal panel 10.

In addition, the control circuit 162 changes the light emission brightness to the corresponding brightness of the input adjustment value according to the first correlation information of the correlation information memory 164 in the second mode by controlling the first light source 128*a*. That is, the light emission brightness of the first light source 128*a* is adjusted to a value that accords with the input adjustment value that is equal to or smaller than the intermediate brightness Lmid in a range ΔL1 (FIG. 13) in the second mode.

Furthermore, the control circuit 162 changes the light emission brightness to correspondence value of the input adjustment value according to the second correlation information of the correlation information memory 164 in the second mode by controlling the second light source 128*b*. That is, the light emission brightness of the second light source 128*b* is adjusted to a value that accords with the input adjustment value that is equal to or smaller than the intermediate brightness Lmid in range ΔL2 (FIG. 13) and is greater than the light emission brightness of the first light source 128*a* in the second mode.

Thus, for a purpose of displaying the meter image 12 to be brighter than the outside image 16, the images 12, 16 are, for example, respectively displayed at suppressed brightness of the occupant's preference, that is, at the intermediate brightness B1mid or smaller in a range ΔB1 and at the intermediate brightness B2mid or smaller in a range ΔB2 (FIG. 14).

(3) Third Mode

The control circuit 162 maintains the meter display gradation ratio of the first pixel area 14 to the same value (FIG. 12) as the first mode by controlling the liquid crystal panel 10 in the third mode.

In addition, the control circuit 162 changes the light emission brightness to the same value as the one in the second mode by controlling the first light source 128*a* in the third mode.

Further in the third mode, the warning display gradation ratio of the second pixel area 18 and the hue in the third mode are adjusted to the gradation ratio (Rass of FIG. 12) and the hue for letting the outside image 16 to assimilate into the background image 13. In addition, the light emission brightness of the second light source 128*b* in the third mode is controlled so that the light emission brightness accords with the light emission brightness of the light source 128*a* (brightness in a range ΔL1 of FIG. 13).

By the above control, while the meter image 12 is displayed by suppressed brightness of the occupant's preference in a range ΔB1 (FIG. 14), the outside image 16 is not displayed in appearance in the third mode.

Figure 15:
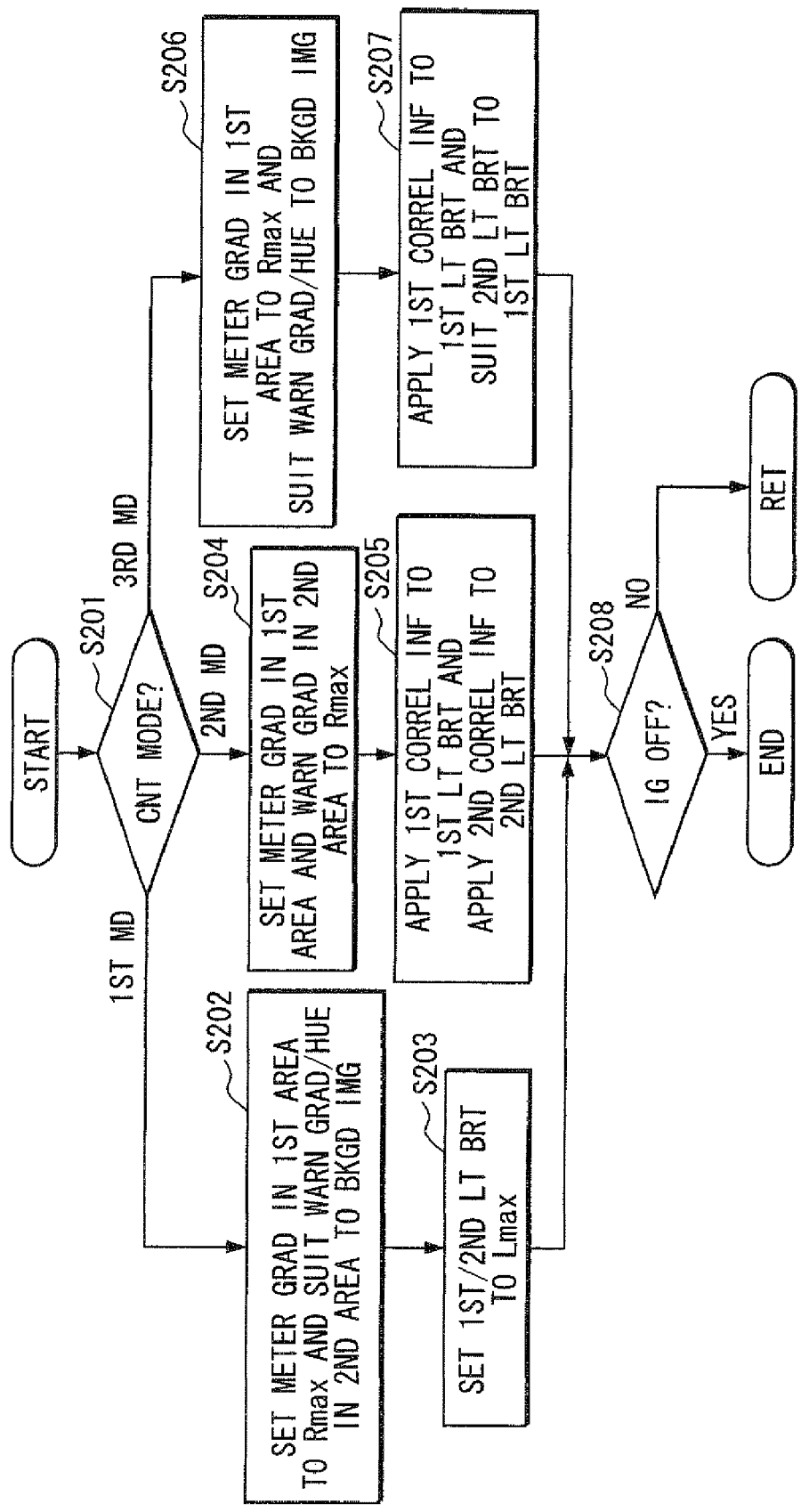
FIG. 15 shows a flowchart of the control flow in the second embodiment of the present invention.

The control flow by the control circuit 162 in the second embodiment is explained next while referring to FIG. 15. In addition, because steps S201, S208 of FIG. 15 are substantially same as steps S101, S108 of the first embodiment, the explanation is omitted, and the focus of the description is put on steps S202-S207 which are different from the first embodiment.

In step S202 which comes after the control mode was set to the first mode in step S201, the meter display gradation ratio of the first pixel area 14 is adjusted to the maximum ratio Rmax as the liquid crystal panel 10 being regarded as an object of control. At the same time, the warning display gradation ratio and the hue of the second pixel area 18 are controlled in step S202 so that the outside image 16 assimilates to the background image 13 as the liquid crystal panel 10 being regarded as an object of control. Then, in step S203, the meter image 12 is displayed at an allowable maximum brightness B1max by adjusting the light emission brightness of the first and second light sources 128*a*, 128*b* to the maximum luminance Lmax, and the outside image 16 is put in a non-display condition.

In step S204 which comes after the setting of the control mode to the second mode in step S201, the meter display gradation ratio of the first pixel area 14 and the warning display gradation ratio of the second pixel area 18 are respectively adjusted to the maximum ratio Rmax as the liquid crystal panel 10 being regarded as an object of control. Then, in step S205, the meter image 12 is displayed at suppressed brightness in a range ΔB1 by adjusting the light emission brightness of the first light source 128*a* to the brightness in a range ΔL1 according to the first correlation information as the light source 128*a* being regarded as an object of control. Further, in step S205, the outside image 16 is displayed at suppressed brightness in a range ΔB2 by adjusting the light emission brightness of the second light source 128*b* to brightness in a range ΔL2 according to the second correlation information as the second light source 128*b* being regarded as an object of control.

In addition, in step S206 which comes after the setting of the control mode to the third mode in step S201, the meter display gradation ratio of the first pixel area 14 and the warning display gradation ratio and the hue of the second pixel area 18 are adjusted as in step S202. Then, in step S207, by controlling the light emission brightness of the first light source 128 as in step S205, the meter image 12 is displayed at suppressed brightness in a range ΔB1. Further, in step S207, by a different method from the one in step S205, the light emission brightness of the second light source 128*b* is controlled to agree with the light emission brightness of the first light source 128*a* to put the outside image 16 in a non-display condition as the light source 128*b* being regarded as an object of control.

In the second embodiment described above, by the characteristic light emission brightness control of each of the light sources 128a, 128b in the second mode that displays the outside image 16 together with the meter image 12, the same effect as observed in the first embodiment is provided.

In addition, in the second embodiment described above, the backlight 120 is equivalent to "illumination unit," the first light source 128a is equivalent to "a meter display light unit," and the second light source 128b is equivalent to "a warning display light source." In addition, in the second embodiment, the imaging unit 40, the drawing unit 50 and the main control unit 160 are equivalent to "a control unit," and the main control unit 160 is equivalent to a "light source intensity control unit." Furthermore, in the second embodiment, the correlation information memory 164 is equivalent to a "correlation information storage part," and the first and the second correlation information in the correlation information memory 164 are equivalent to "correlation information in the correlation information storage unit."

Third Embodiment

The third embodiment of the present invention is the modification of the first embodiment. In addition, in the according to, the focus of the description is mainly put on the difference of the third embodiment from the first embodiment.

Figure 16:
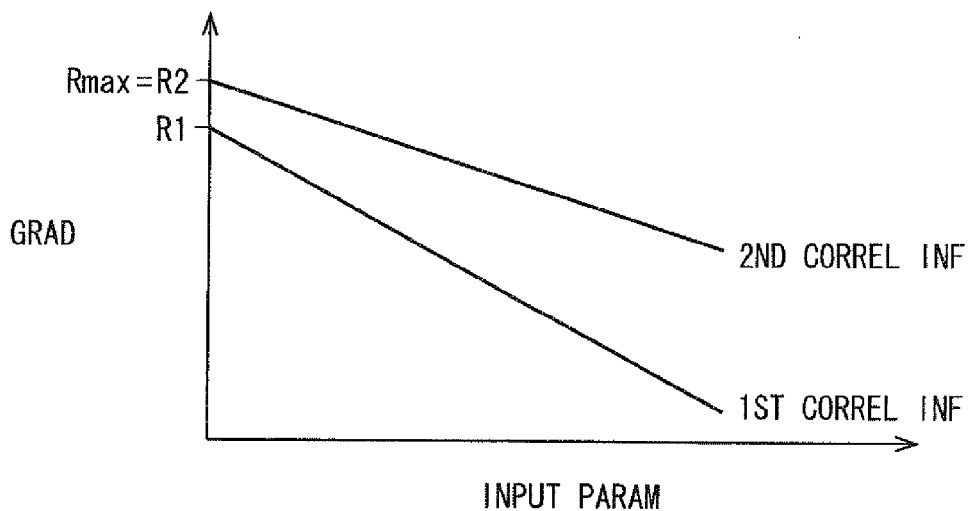
FIG. 16 shows a diagram of the first and the second correlation information in a third embodiment of the present invention.

In the third embodiment, the first correlation information and the second correlation information are defined respectively in a manner that the meter display gradation ratio of the first pixel area 14 and the warning display gradation ratio of the second pixel area 18 linearly decrease, in proportion to the increasing change of the input adjustment value, from respectively different standard ratios R1 and R2 with the linear decrease rate of the latter being smaller than the former as shown in FIG. 16. In this case, while the standard ratio R2 of the warning display gradation ratio in the second pixel area 18 is set to the maximum ratio of Rmax, the standard ratio R1 of the meter display gradation ratio in the first pixel area 14 is set to the ratio that is smaller than the standard ratio R2. Therefore, the correlation represented by the second correlation information defines the warning display gradation ratio of the second pixel area 18 in decrease from the maximum ratio Rmax to be greater than the meter display gradation ratio of the first pixel area 14 in the correlation represented by the first correlation information for the same input adjustment value when the input adjustment value has an increasing change.

Thus, while the warning display gradation ratio of the second pixel area 18 is adjusted to be equal to or smaller than the standard ratio R2 in a range ΔR2 (FIG. 17) according to the second correlation information, the meter display gradation ratio of the first pixel area 14 is adjusted to be equal to or smaller than the standard ratio R1 (the ratio R1 is smaller than the standard ratio R2) in a range δR1 (FIG. 17) according to the first correlation information in the second mode of the third embodiment. Therefore, by the setting of the warning display gradation ratio of the second pixel area 18 to be greater than the meter display gradation ratio of pixel area 14, relative brightness of the outside image 16 against the meter image 12 will be increased for producing the same advantageous effect as observed in the first embodiment.

Figure 17:
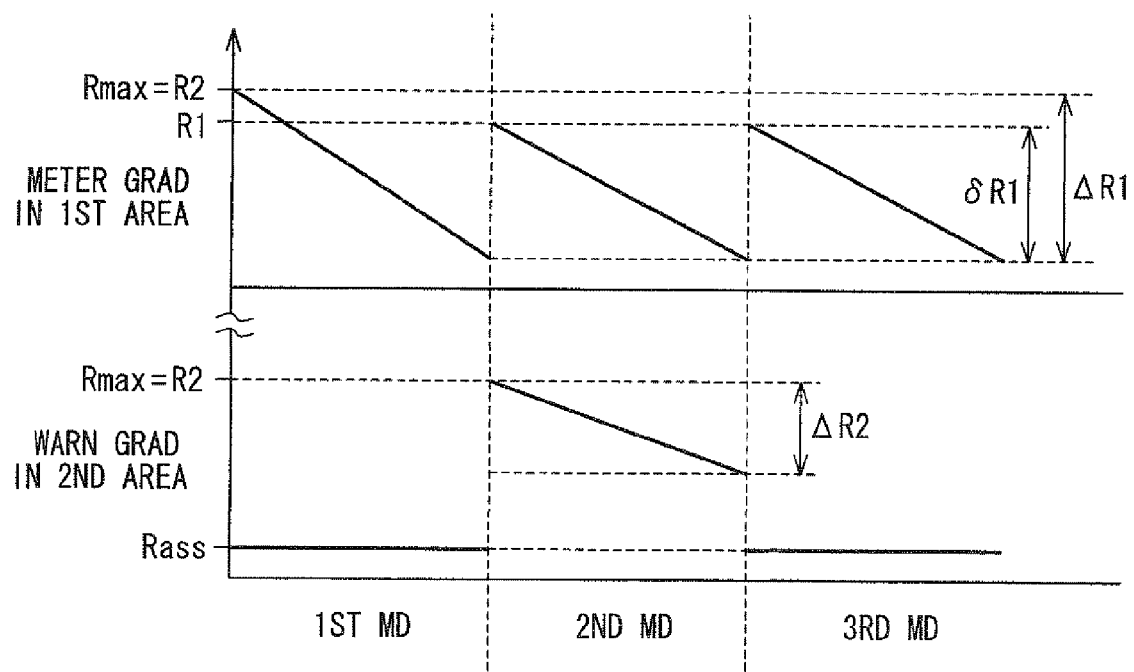
FIG. 17 shows a diagram of the gradation ratio of the first and second pixel area in the third embodiment of the present invention.

In addition, in the third mode of the third embodiment, the meter display gradation ratio of the first pixel area 14 is adjusted to the same level as the second mode (FIG. 17).

Further, in the third embodiment, the first correlation function (cf. FIG. 5) of the first embodiment is memorized as the third correlation function in the correlation information memory 64 in addition to the first correlation information and the second correlation information. Therefore, the third correlation information, the meter display gradation ratio of the first pixel area 14 will be adjusted to be equal to or smaller than the maximum ratio Rmax in range ΔR1 (FIG. 1) in the first mode of the third embodiment.

Fourth Embodiment

The fourth embodiment of the present invention is the modification of the second embodiment. In addition, in the according to, the focus of the description is mainly put on the difference of the fourth embodiment from the second embodiment.

Figure 18:
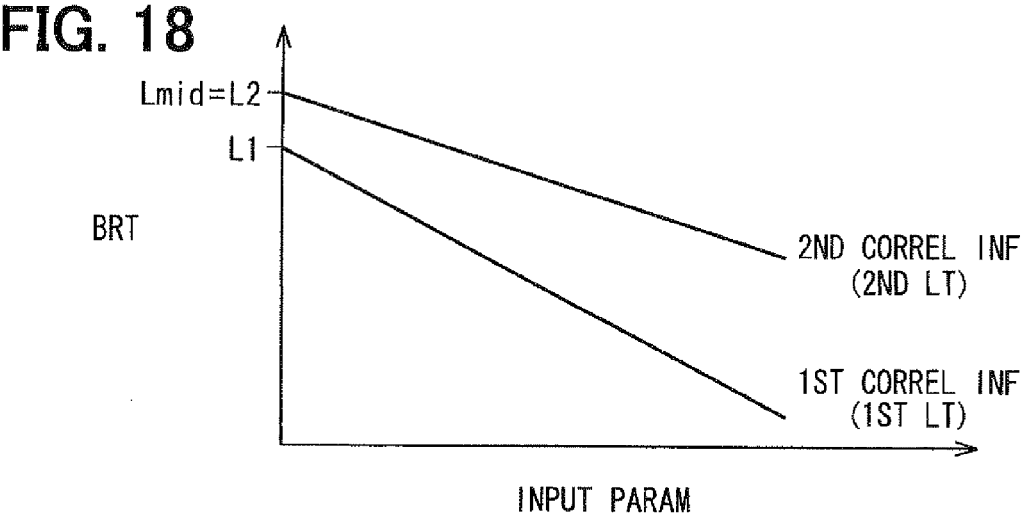
FIG. 18 shows a diagram of the first and the second correlation information in a fourth embodiment of the present invention.

In the fourth embodiment, the first correlation information and the second correlation information are defined in a manner that the light emission brightness of the first light source 128 and light emission brightness of the second light source 128b linearly decrease, in proportion to the increasing change of the input adjustment value, from respectively different standard brightness L1 and L2 with the linear decrease rate of the latter being smaller than the former as shown in FIG. 18. In the present embodiment, the standard brightness L2 of the light emission brightness of the second light source 128b is set to the intermediate brightness Lmid, and the standard brightness L1 of the light emission brightness of the first light source 128a is set to the brightness that is smaller than the standard brightness L2. Therefore, the correlation represented by the second correlation information defines the light emission brightness of the second light source 128b in decrease from the intermediate brightness Lmid to be greater than the light emission brightness of the first light source 128a in the correlation represented by the first correlation information for the same input adjustment value when the input adjustment value has an increasing change.

Figure 19:
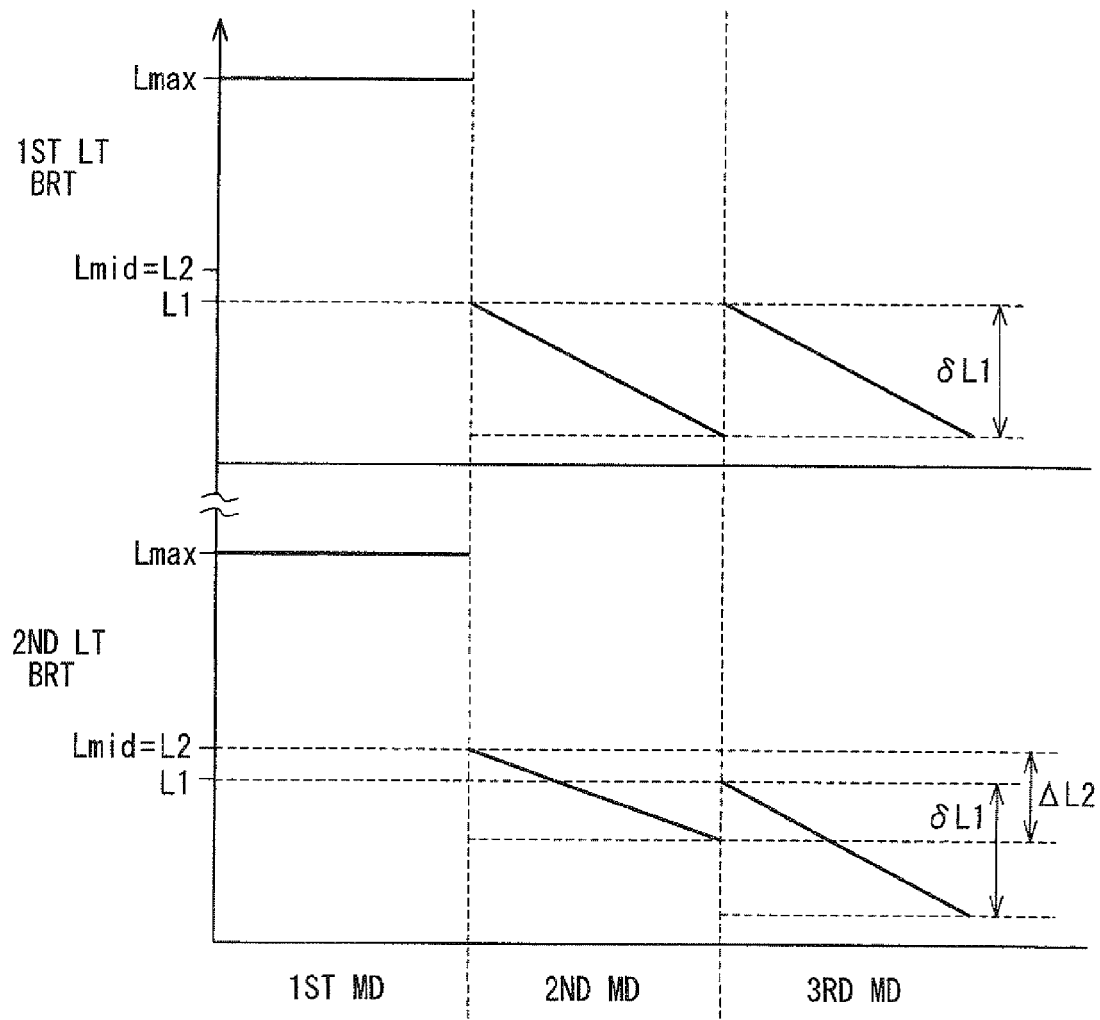
FIG. 19 shows a diagram of the gradation ratio of the first and second pixel area in the fourth embodiment of the present invention.

Thus, while the light emission brightness of the second light source 128b is adjusted to be equal to or smaller than standard brightness L2 in a range ΔL2 (FIG. 19) of according to the second correlation information, the light emission brightness of the first light source 128a is adjusted to be smaller than the standard brightness L1 in a range δL1 (FIG. 19) according to the first correlation information in the second mode of the fourth embodiment. Therefore, by the setting of the light emission brightness of the second light source 128b to be greater than the light emission brightness of first light source 128a, relative brightness of the outside image 16 against the brightness of the meter image 12 will be increased for producing the same advantageous effect as observed in the second embodiment.

In addition, in the third mode of the fourth embodiment, the second light emission brightness of the first light source 128a is adjusted to the same level (FIG. 19) as the second mode, and the light emission brightness of the second light source 128b is also adjusted to the same level as the second mode.

Fifth Embodiment

The fifth embodiment of the present invention is the modification of the first embodiment. In addition, in the according to, the focus of the description is mainly put on the difference from the first embodiment.

Figure 20:
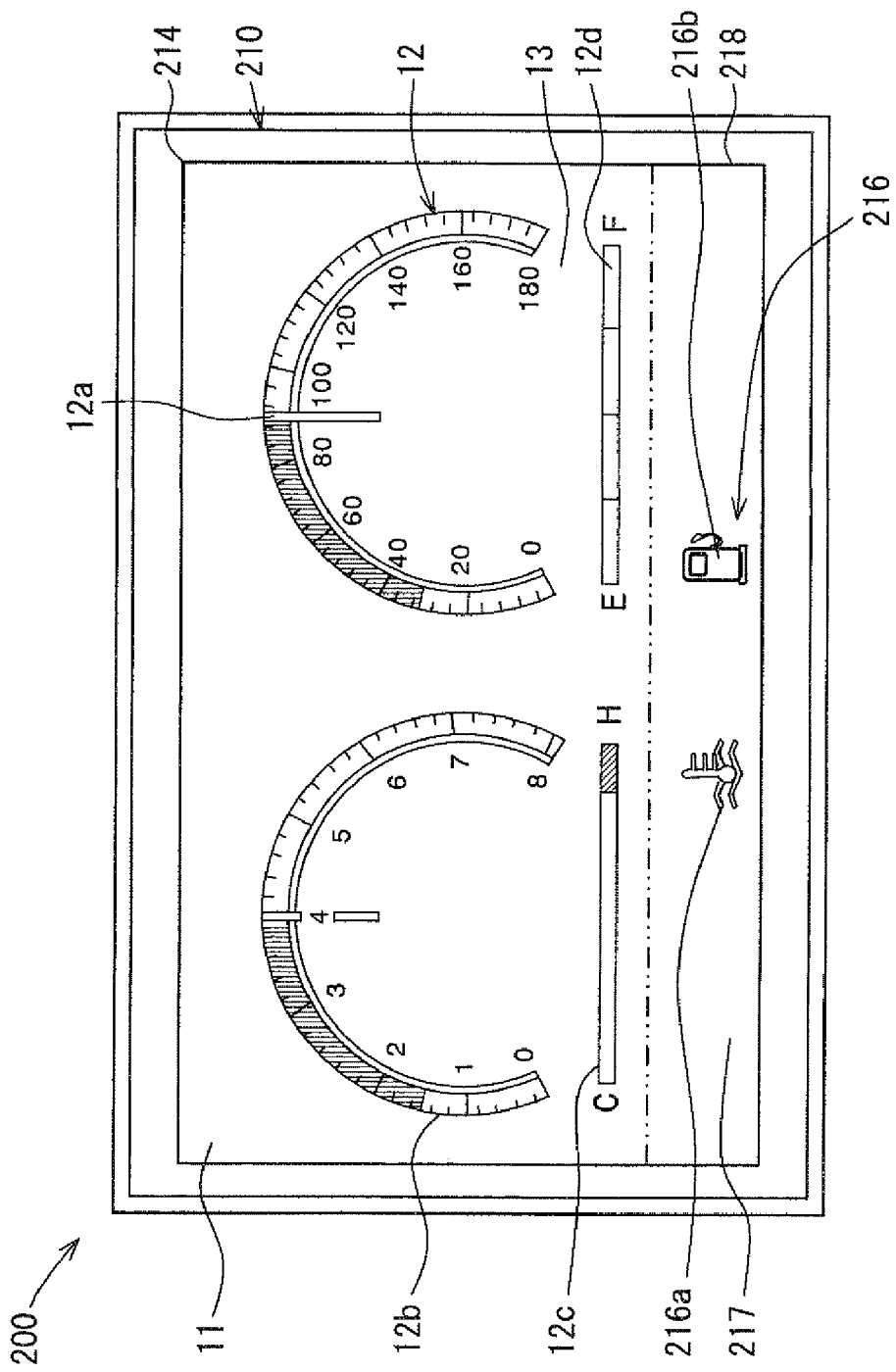
FIG. 20 shows a front view of the vehicle display unit a fifth embodiment of the present invention.
Figure 21:
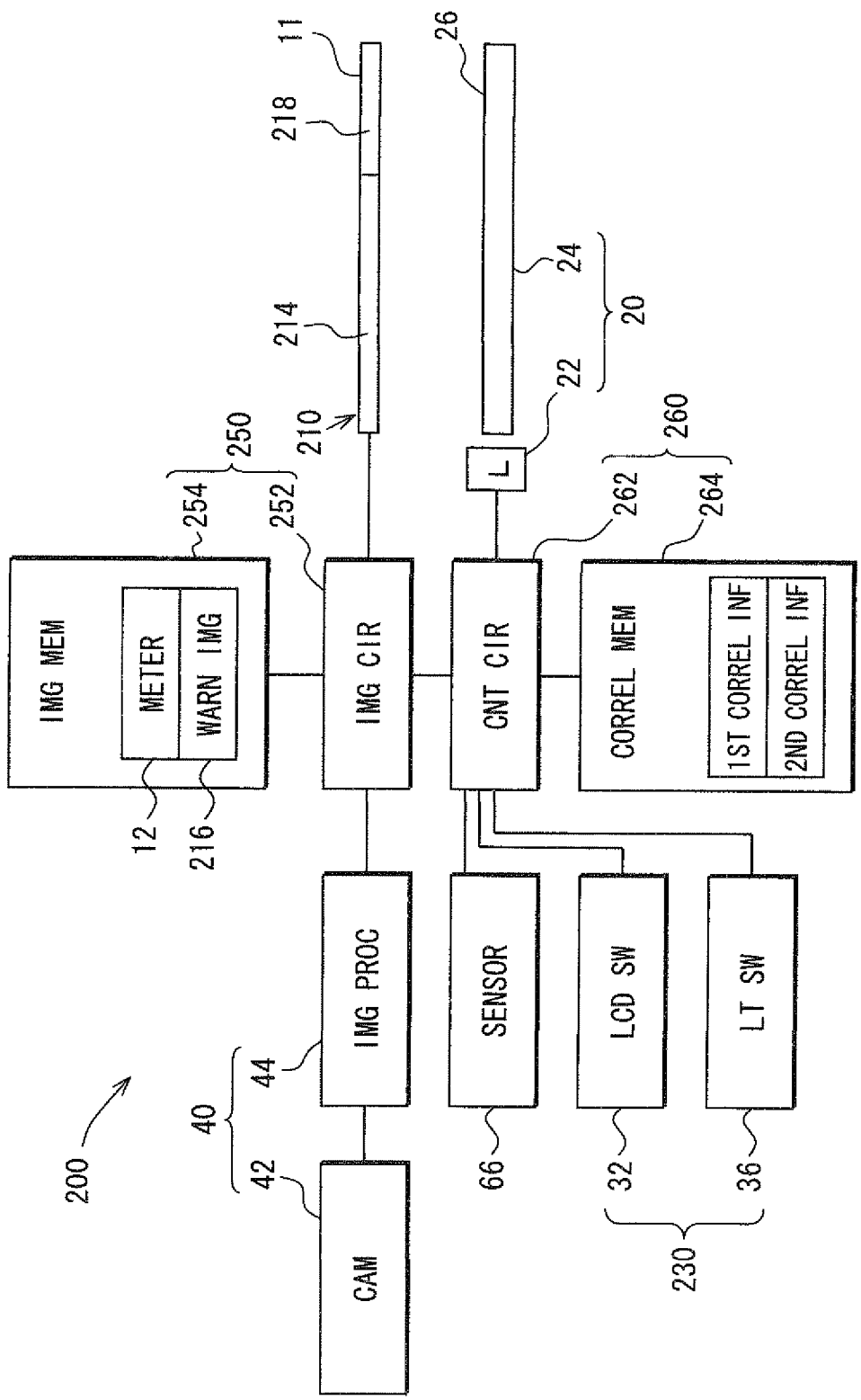
FIG. 21 shows a block diagram of the electric circuit constitution of the vehicle display unit in the fifth embodiment of the present invention.

A liquid crystal panel 210 of a display unit 200 has a second pixel area 218 displaying a warning image 216 and a background image 217 in a lower part of a first pixel area 214 displaying the meter image 12 and the background image 13 in the fifth embodiment as shown in FIGS. 20, 21. The warning image 216 is, more practically, "a warning sign-like image" to warn and call occupant's attention for the abnormality of the vehicle, and the warning image 216 includes a warning light image 216 and a warning light image 216b to respectively display engine coolant temperature abnormality and fuel residual quantity abnormality (i.e., fuel emptiness) in the present embodiment. The warning image 216 is displayed in the second pixel area 218 by the drive of each pixel in the second pixel area 218 at an abnormal time when the abnormality exists, and the warning image 216 is not displayed in appearance at a normal time when the abnormality does not exist. In contrast, the background image 217 is displayed as a background to let the warning image 216 stand out in appearance. Therefore, the background image 13 in the first pixel area 214 is designated as "a first background image 13" and the background image 217 in the second pixel area 218 is designated as "a second background image 217" for distinguishing, from each other, respective background images 13, 217 displayed in each of the pixel areas 214, 218.

In addition, the first pixel area 214 of the present embodiment is, except for a position in the liquid crystal panel 210, configured in the same manner as the first pixel area 14 in the first embodiment. In addition, the alternate two dashed line represents a virtual boundary between the first pixel area 214 and the second pixel area 218 in FIG. 20.

For implementing the above-mentioned modification, the warning image 216 and the second background image 14 are memorized together with the meter image 12 and the first background image 13 image information in an image memory 254 of a drawing unit 250 in advance as shown in FIG. 21. In addition, the first correlation information and the second correlation information of the memory in a correlation information memory 264 of a main control unit 260 respectively provide information of the meter display gradation ratio in the first pixel area 214 and the gradation ratio of the pixel to display the warning image 216 as "the warning sign-like image" in the second pixel area 218 (i.e., the warning image gradation ratio). Furthermore, the display on-off switch 34 is not provided in an input unit 230.

The control circuit 262 of the main control unit 260 detects the temperature rise abnormality of the engine coolant and the empty abnormality of the fuel residual quantity based on a signal from the state value sensor 66 in the fifth embodiment. As a result, the control circuit 262 determines "abnormality" when the temperature rise abnormality of the engine coolant or the empty abnormality of the fuel residual quantity is detected, and determines a "normal time" when no abnormality is detected.

In addition, the control circuit 262 generates a display instruction signal based on signals from each of the switches 32, 36 and the state value sensor 66 as well as the first and the second correlation information being read from the correlation information memory 264. The display instruction signal controls the drive of each pixel of the liquid crystal panel 210 by being provided to an image drawing circuit 252 of the drawing unit 250, and "providing for the drawing circuit 252 a display instruction signal" is described as "controlling the liquid crystal panel 210" in the according to.

Further, the control circuit 262 generates a light emission driving signal based on signals from each of the switches 32, 36 and the state value sensor 66 as well as the first and the second correlation information. The light emission driving signal controls the drive of the light emitting diode 22 by being provided for the light emitting diode 22 of the backlight 20 in the same manner as the first embodiment, and "providing for the light emitting diode 22 the light emission driving signal" is described as "controlling the backlight 20" in the according to.

Figure 22:
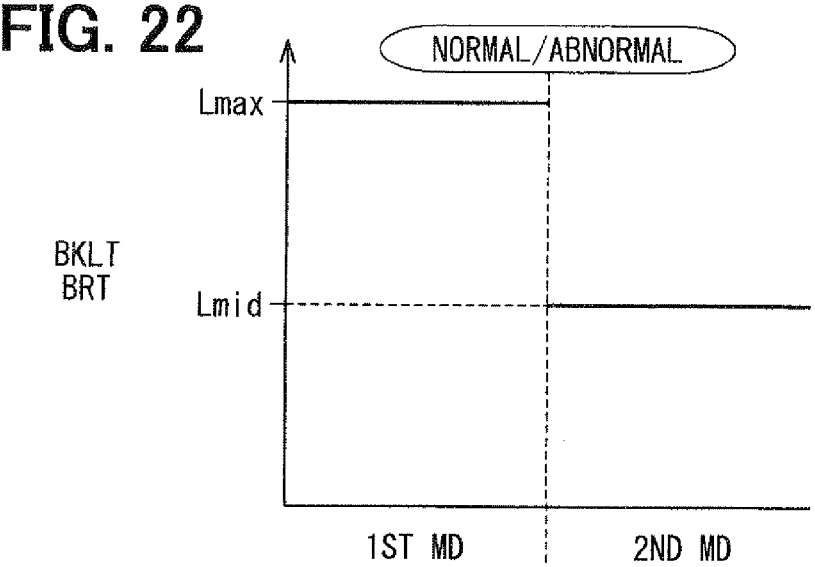
FIG. 22 shows a diagram of the light emission brightness of the backlight in the fifth embodiment of the present invention.
Figure 23:
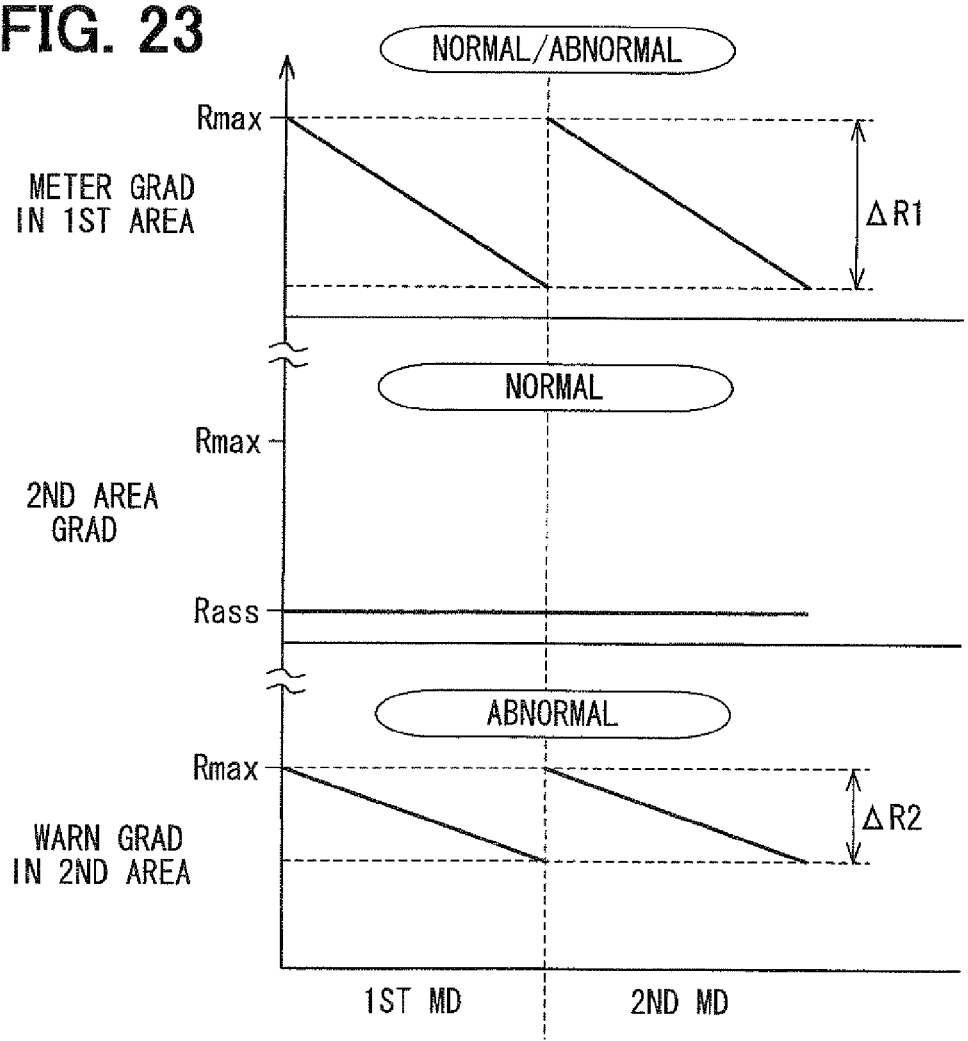
FIG. 23 shows a diagram of the gradation ratio of the first and second pixel area in the fifth embodiment of the present invention.
Figure 24:
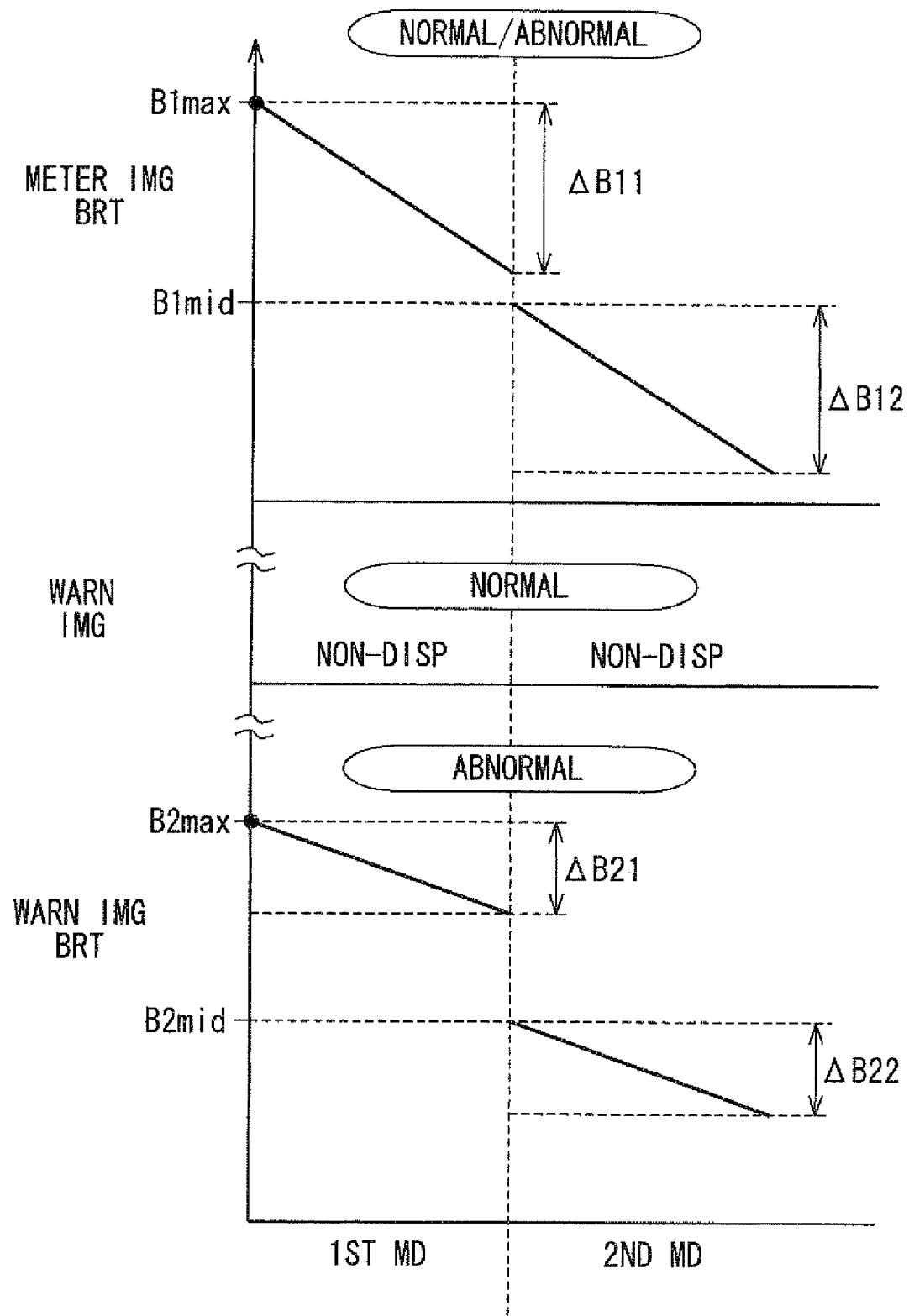
FIG. 24 shows a diagram of the meter image brightness and warning image brightness in the fifth embodiment of the present invention.

The display operation of the display unit 200 in the fifth embodiment is explained next while referring to FIGS. 22 to 24. FIG. 22 shows a diagram of the light emission brightness, FIG. 23 shows a diagram of the gradation ratio of each of the pixel areas 214, 218, and FIG. 24 shows brightness of each of the images 12, 216. In addition, the gradation ratio and the hue of the pixels to display the background image 13 in the first pixel area 214 are fixed to let the meter image 12 stand out from the background in the display operation and the control flow that is described later.

(1) First Mode

The control circuit 262 of the main control unit 260 sets the control mode to the first mode when the circuit 262 receives a signal from the light switch 36 expressing all lights off position. In addition, the first mode set in this manner is usually realized in daytime.

More practically, the control circuit 262 maintains, by controlling the backlight 20, the light emission brightness at the constant maximum luminance Lmax (FIG. 22) against a change of the input adjustment value for both of the normal time and abnormal time in the first mode.

In addition, the control circuit 262 changes, by controlling the liquid crystal panel 210, the meter display gradation ratio of the first pixel area 214 to a value corresponding to the input adjustment value based on the first correlation information in the correlation memory 264 for both of the normal time and abnormal time in the first mode. That is, the meter display gradation ratio of the first pixel area 214 is adjusted to the ratio that is equal to or smaller than the maximum ratio Rmax in a range ΔR1 (FIG. 23) according to the input adjustment value. Therefore, in both of the normal time and abnormal time of the first mode, the meter image 12 is displayed at the maximum allowable brightness B1max (FIG. 24) or at suppressed brightness of occupant's preference in a range ΔB11 (FIG. 24).

Further, regarding the gradation ratio (including the warning display gradation ratio) and the hue of the whole the second pixel area 218, the control circuit 262 adjusts the gradation ratio and the hue to Pass of FIG. 23 so that the warning image 216 and the second background image 217 is assimilated into the first background image 13 only in the normal time of the first mode. Therefore, the warning image 216 is not displayed in appearance in the normal time of the first mode (FIG. 24).

In contrast, the control circuit 262 changes, by controlling the liquid crystal panel 210, the warning display gradation ratio of the second pixel area 218 to a ratio corresponding to the input adjustment value based on the second correlation information in the correlation information memory 264 in the abnormal time of the first mode. That is, the warning display gradation ratio is adjusted to be equal to or smaller than the ratio Rmax in a range ΔR2 (FIG. 23) and to be greater than the meter display gradation ratio in the first pixel area 214 according to the input adjustment value. Therefore, in the abnormal time of the first mode, the warning image 216 is displayed at the maximum allowable brightness B2max (FIG. 24) or at suppressed brightness of occupant's preference in a range ΔB21 (FIG. 24).

In addition, in the second pixel area 218 in the abnormal time of the first mode, the gradation ratio and the hue of the pixel to display the second background image 217 is adjusted to the gradation ratio Rass so that the image 217 is assimilated into the first background image 13, thereby enabling the display of the warning image 216 to be outstanding from the surrounding second background image 217.

(2) Second Mode

When a signal expressing a side lamp on position or a headlight on position from the light switch 36 is received, the control circuit 262 of the fifth embodiment sets the control mode to the second mode. In addition, the second mode set in this manner is usually realized when the vehicle travels at night or through a dark place.

The control circuit 262 maintains the light emission brightness at a constant intermediate brightness Lmid (FIG. 22) for an input adjustment value change in the normal time and the abnormal time of the second mode to be concrete by controlling the backlight 20.

In addition, the control circuit 262 changes, by controlling the liquid crystal panel 210, the meter display gradation ratio of the first pixel area 214 to the same level as the first mode (FIG. 23) in both of the normal time and the abnormal time of the second mode. Therefore, in both of the normal time and the abnormal time of the second mode, the meter image 12 is displayed at suppressed brightness of occupant's preference that is equal to or smaller than the intermediate brightness B1mid in a range ΔB12 (FIG. 24).

Further the control circuit 262 realizes the same gradation ratio (Rass of FIG. 23) and the hue in the second pixel area 218 as the first mode only in the normal time of the second mode by controlling the liquid crystal panel 210. Therefore, in the normal time of the second mode, the warning image 216 is not displayed in appearance (FIG. 24).

In contrast, the control circuit 262 changes the warning display gradation ratio of the second pixel area 218 to the same level as the first mode (FIG. 23) in the abnormal time of the second mode by controlling the liquid crystal panel 210. Therefore, the warning image 216 is displayed at suppressed brightness of occupant's preference that is equal to or smaller than the intermediate brightness B2mid in a range ΔB22 (FIG. 24) in the abnormal time of the second mode.

In addition, regarding the gradation ratio and the hue in the pixel to display the second background image 217 in the second pixel area 218 in the abnormal time of the second mode, the gradation ratio and the hue is adjusted to the same level as the first mode. Thus, the warning image 216 is displayed in an outstanding manner against the surrounding second background image 217.

Figure 25:
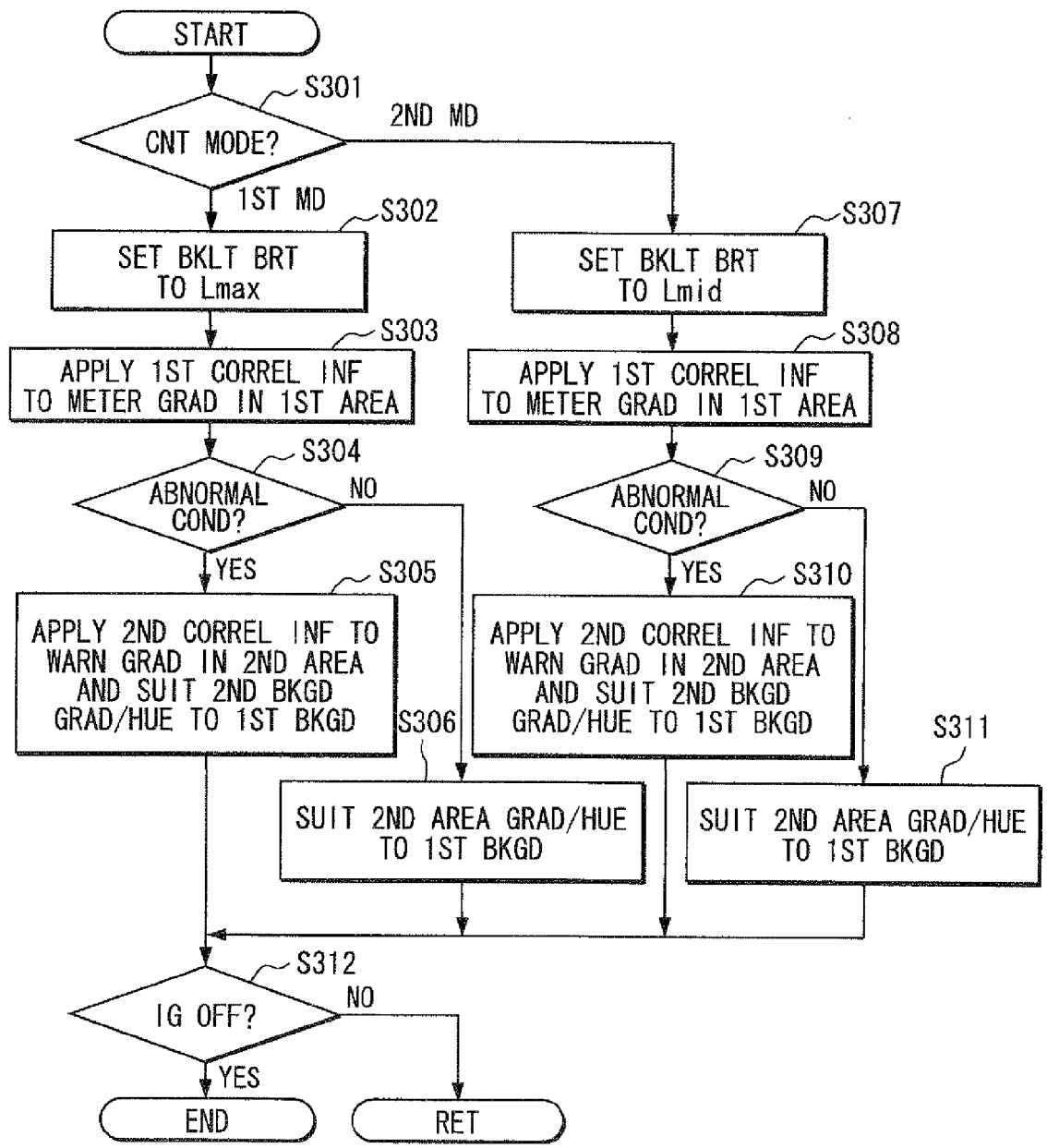
FIG. 25 shows a flowchart of the control flow in the fifth embodiment of the present invention.

The control flow in the control circuit 262 of the fifth embodiment is explained next while referring to FIG. 25. In addition, the control flow starts when the ignition switch of the vehicle is turned on.

First in step S301, the control mode is set to one of the first mode and the second mode based on each of the signals from the light switch 36.

When the control mode is set to the first mode in step S301, the process in the control flow proceeds to step S302. In step S302, the light emission brightness of the backlight 20 is adjusted to the maximum luminance Lmax. Then, in step S303, the meter display gradation ratio of the first pixel area 214 is adjusted to the ratio in a range ΔR1 according to the first correlation information in the liquid crystal panel 210 that is regarded as an object of control. As a result of the control, the meter image 12 is displayed at the maximum allowable brightness B1max or the suppressed brightness that is smaller than the brightness B1max in a range ΔB11.

Then, signal detection, that is, whether the temperature rise abnormality of the engine coolant or the empty abnormality of the fuel residual quantity has been detected is determined in step S304 based on a signal from the state value sensor 66.

When an affirmative determination has been accomplished in step S304, determining as the abnormality, and the process proceeds to step S305. In step S305, the warning display gradation ratio of the second pixel area 218 is adjusted to the ratio in a range ΔR2 according to the second correlation information in the liquid crystal panel 210 that is regarded as an object of control. Also in the liquid crystal panel 210, the gradation ratio and the hue of the pixel of the second background image 217 is adjusted so that the image 217 is assimilated into the first background image 13 in the second pixel area 218. As a result of the control, the warning image 216 is displayed at the maximum allowable brightness B2max or the suppressed brightness that is smaller than the brightness B2max in a range ΔB21.

On the other hand, when a negative determination has been accomplished in step S304, the process proceeds to step S306 by determining that the operation is normal. Then, in the liquid crystal panel 210 that is regarded as an object of the control, the gradation ratio and the hue of the whole the second pixel area 218 is adjusted so that the warning image 216 and the second background image 217 are assimilated into the first background image 13 in step S306, thereby putting the warning image 216 in a non-display condition.

When the control mode is set to the first mode in step S301, the process is controlled in the above-described manner. When the second mode has been set in step S301, the process proceeds to step S307. In step S307, the light emission brightness is adjusted to the intermediate brightness Lmid in the backlight 20 that is regarded as an object of the control. Then, in step S308, the meter display gradation ratio of the first pixel area 214 is adjusted in the same manner as step S303. As a result of the control, the meter image 12 is displayed at the suppressed brightness that is equal to or smaller than the intermediate brightness B1mid in a range ΔB12.

Then, whether the temperature rise abnormality of the engine coolant or the empty abnormality of the fuel residual quantity has been detected is determined in step S309 in the same manner as step S304.

When an affirmative determination has been accomplished in step S309, the process proceeds to step S310 as determining that the operation is abnormal. In step S310, the warning display gradation ratio of the second pixel area 218 is adjusted in the same manner as step S305. Also in step S310, the gradation ratio and the hue of the pixel in the second background image 217 are adjusted in the same manner as step S305 in the second pixel area 218. As a result of the control, the warning image 216 is displayed at the suppressed brightness that is equal to or smaller than the intermediate brightness B2mid in a range ΔB22.

On the other hand, when a negative determination has been accomplished in step S309, the process proceeds to step S311 determining that the operation is normal. Then, in this step S311, the gradation ratio and the hue of the whole the second pixel area 218 in the liquid crystal panel 210 are adjusted in the same manner as step S306, and the warning image 216 is put in a non-display condition.

In addition, after execution of step S305, S306, S310, or S311, the process proceeds to step S312, and whether an ignition switch is turned off is determined. When a negative determination has been accomplished, the control flow is finished. When an affirmative determination has been accomplished, the process returns to step S301, and the control flow is continued.

In the fifth embodiment, the brightness of the warning image 216 is suppressed according to the input adjustment value in the abnormal time of each mode where the warning image 216 is displayed together with the meter image 12, with the suppression of the brightness of the meter image 12. However, by the effect of the advantageous control of the gradation ratio in each of the pixel areas 214, 218, the relative brightness of the warning image 216 is increased against the meter image 12, thereby preventing the deterioration of the purpose of the display of the warning image 216 for calling occupant's attention. In addition, the visibility of the meter image 12 is increased by displaying the image 12 at the sufficiently suppressed brightness of occupant's preference. Therefore, each of the images 216, 12 that have respectively different display purposes is displayed appropriately in the fifth embodiment.

In the fifth embodiment, the input unit 230 is equivalent to "an input unit," the imaging unit 40, the image drawing unit 250 and the main control unit 260 are equivalent to "a control unit," and the drawing unit 250 and the main control unit 260 are equivalent to "a gradation ratio adjustment unit." Further, the correlation information memory 264 is equivalent to "a correlation information storage unit," the first and the second correlation information in the correlation memory 264 are equivalent to "correlation information in the correlation information storage unit," the state value sensor 66 and the main control unit 260 are equivalent to "an abnormality detecting unit," and the image memory 254 is equivalent to "image memory unit."

Sixth Embodiment

The fifth the sixth embodiment of the present invention is the modification of the fifth embodiment. In addition, the focus of the description is mainly put on the difference of the sixth embodiment from the fifth embodiment.

Figure 26:
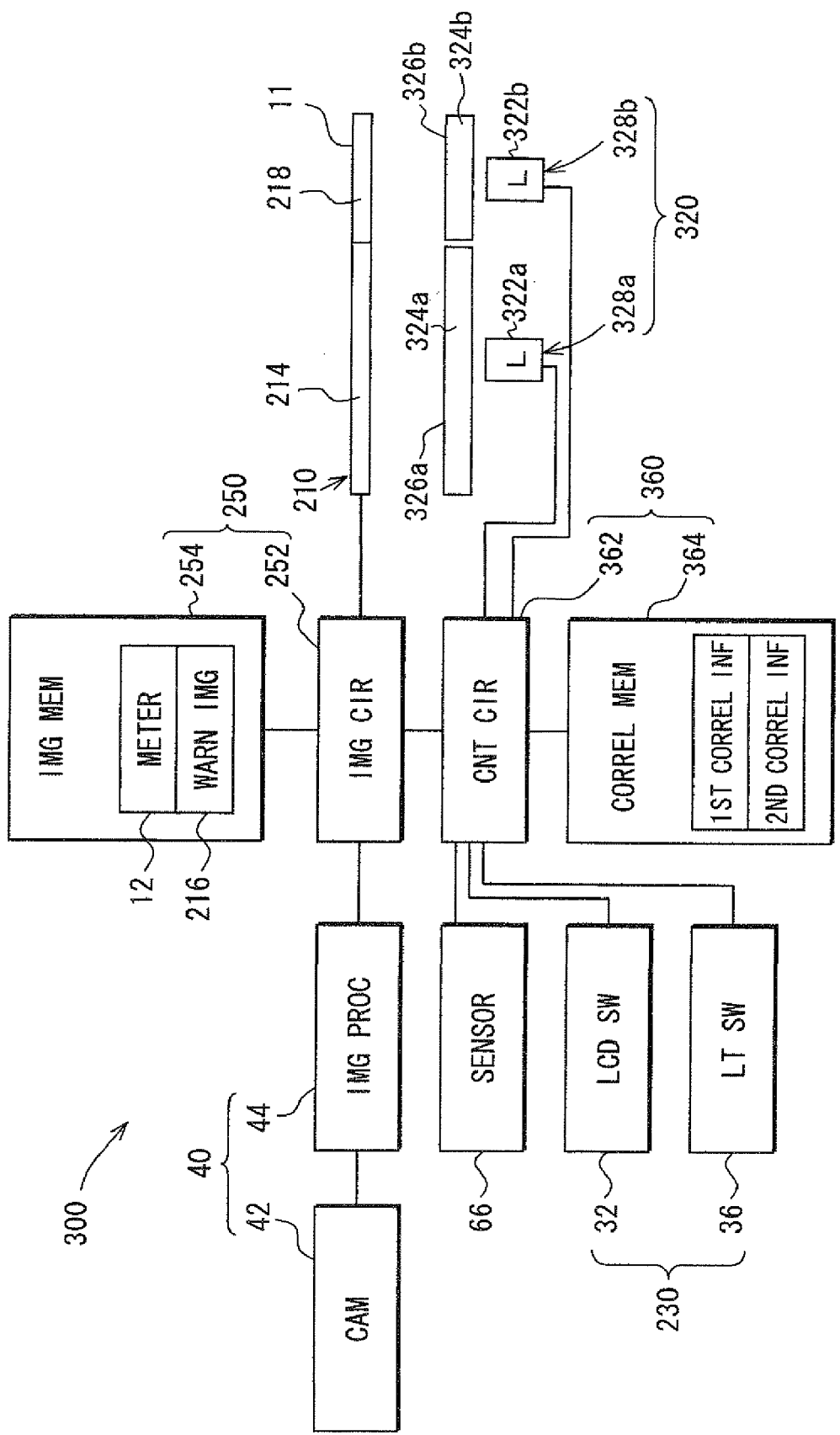
FIG. 26 shows a block diagram of the electric circuit constitution of the vehicle display unit in a sixth embodiment of the present invention.

A backlight 320 has a set of a first light emitting diode 322a which transparently lights the first pixel area 214 of the liquid crystal panel 210 and a first diffusion board 324 as a first light source 328a in a display unit 300 in the sixth embodiment as shown in FIG. 26. In addition, the backlight 320 has a set of a second light emitting diode 322b which transparently lights the second pixel area 218 and a second diffusion board 324b of the liquid crystal panel 210 as a second light source 328b.

In each of the light sources 328a, 328b, the light emitting diodes 322a, 322b emit light according to the light emission driving signal given from the main control unit 360 through the electrical connection to the control circuit 362 of the main control unit 360. In addition, the light that is incident from the light emitting diodes 322a, 322b on the diffusion boards 324a, 324b in each of the light sources 328a, 328b is respectively scattered by the diffusion boards 324a, 324b to be emitted from light-emitting surfaces 326a, 326b on a side facing the liquid crystal panel 210. Therefore, each of the pixel areas 214, 218 of the liquid crystal panel 210 will be transparently lit up by the light sources 328a, 328b that emit light substantially evenly from the light-emitting surfaces 326a, 326b.

In addition, the first and the second correlation information that are different from the fifth embodiment are memorized beforehand in a correlation information memory 364 of the main control unit 360 in the sixth embodiment. More practically, the first correlation information represents a correlation between the light emission brightness in the light-emitting surface 326a of the first light source 328a (the brightness is designated as a "light emission brightness of the first light source 328a" hereinafter) and the input adjustment on a predetermined condition. That is, the light emission brightness of the display of the meter image 12 in the first pixel area 214 and the input adjustment value is represented by the first correlation information on the predetermined condition. Further, the second correlation information represents a correlation between the light emission brightness in the light-emitting surface 326b of the second light source 328b (the brightness is designated as a "light emission brightness of the second light source 328b" hereinafter) and the input adjustment on a predetermined condition. That is, the light emission brightness of the display of the warning image 216 in the second pixel area 218 and the input adjustment value is represented by the second correlation information on the predetermined condition.

Figure 27:
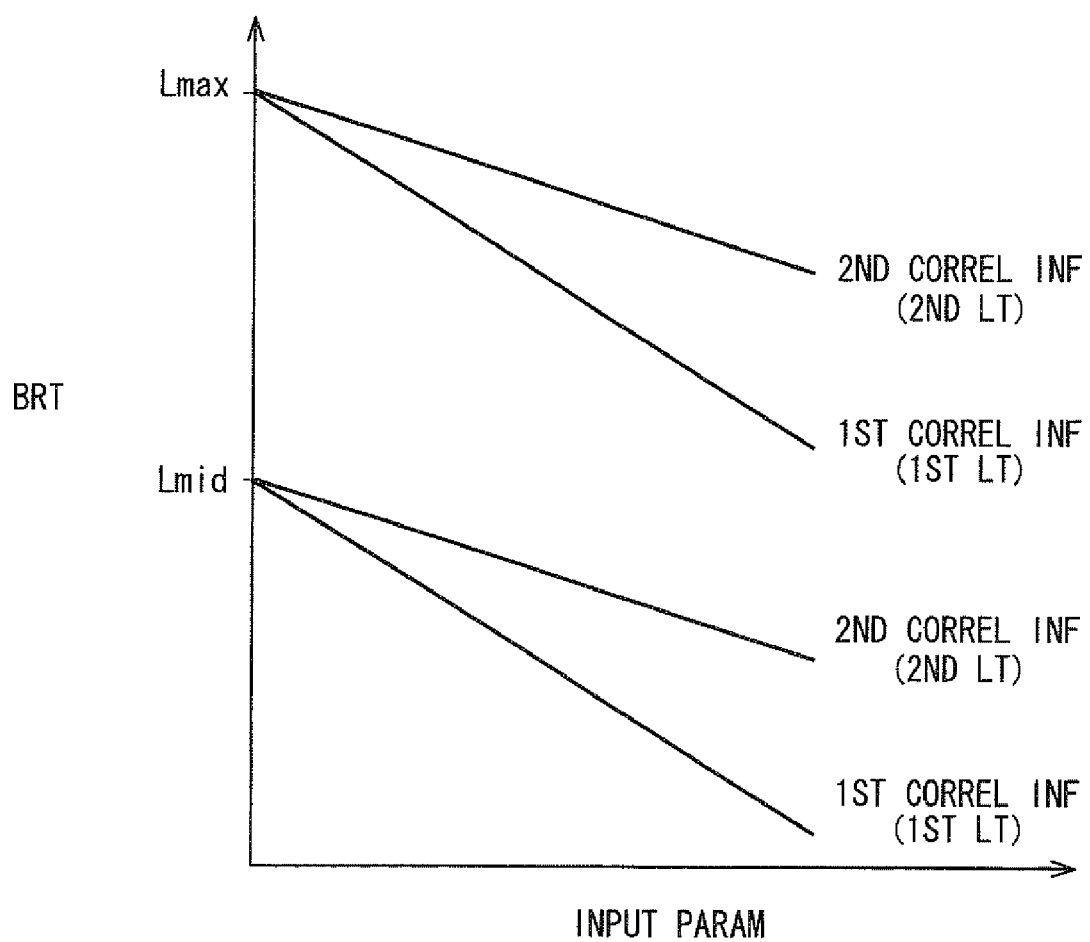
FIG. 27 shows a diagram of the first and second correlation information in the sixth embodiment of the present invention.

In the present embodiment in particular, the first correlation information and the second correlation information are respectively defined in the following manner. That is, in proportion to the increasing change of the input adjustment value, the light emission brightness of the first light source 328a and the second light source 328b linearly decreases from the maximum brightness Lmax in an upper half of FIG. 27 or from the intermediate brightness Lmid in a lower half of FIG. 27. The rate of the linear decrease of the light emission brightness is smaller in the second correlation information than in the first correlation information. That is, when the input adjustment value is increased for the same amount, the decreasing trend of the correlation from the brightness Lmax, Lmid results in that the increase of the light emission brightness of the second light source 328b becomes greater than the increase of the light emission brightness of the first light source 328a at the same point of the input adjustment value.

In the sixth embodiment, a control circuit 362 of the main control unit 360 as shown in FIG. 26 generates the display instruction signal based on signals from the switches 32, 36 and the state value sensor 66 as well as based on the first and the second correlation information being read from the correlation information memory 364. The display instruction signal controls the drive of each pixel of the liquid crystal panel 210 by being given to the drawing circuit 252 of the drawing unit 250 in the same manner as described in the fifth embodiment. In the following description, "giving the drawing circuit 252 a display instruction signal" is described as "controlling the liquid crystal panel 210."

In addition, the control circuit 362 generates, based on signals from the switches 32, 36 and the state value sensor 66 as well as based on the first and the second correlation information, the light emission driving signal. The light emission driving signal controls the drive of each of the light emitting diodes 322a, 322b in the light sources 328a, 328b. Therefore, "controlling the light sources 328a, 328b" is described as "giving the light emitting diodes 322a, 322b the light emission driving signal" in the following description.

Figure 28:
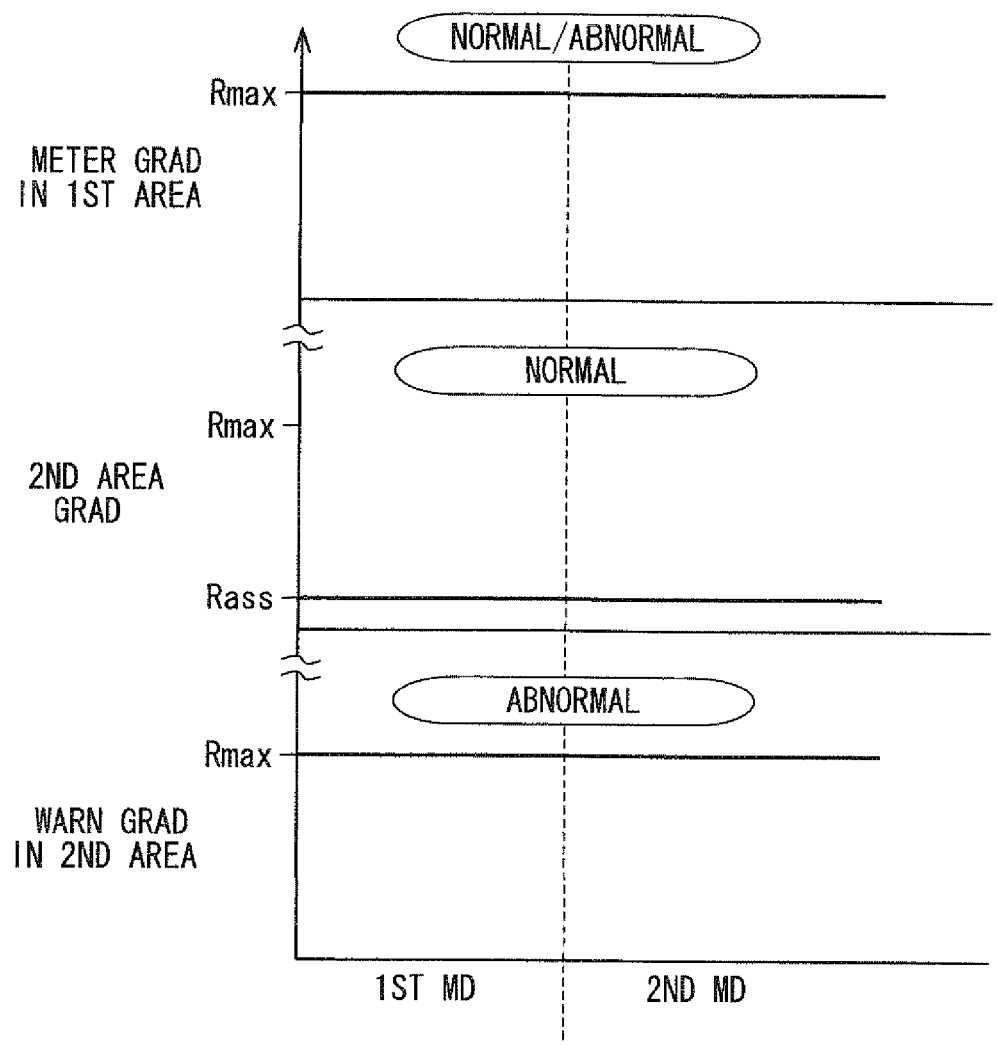
FIG. 28 shows a diagram of the gradation ratio of the first and second pixel area in the sixth embodiment of the present invention.
Figure 29:
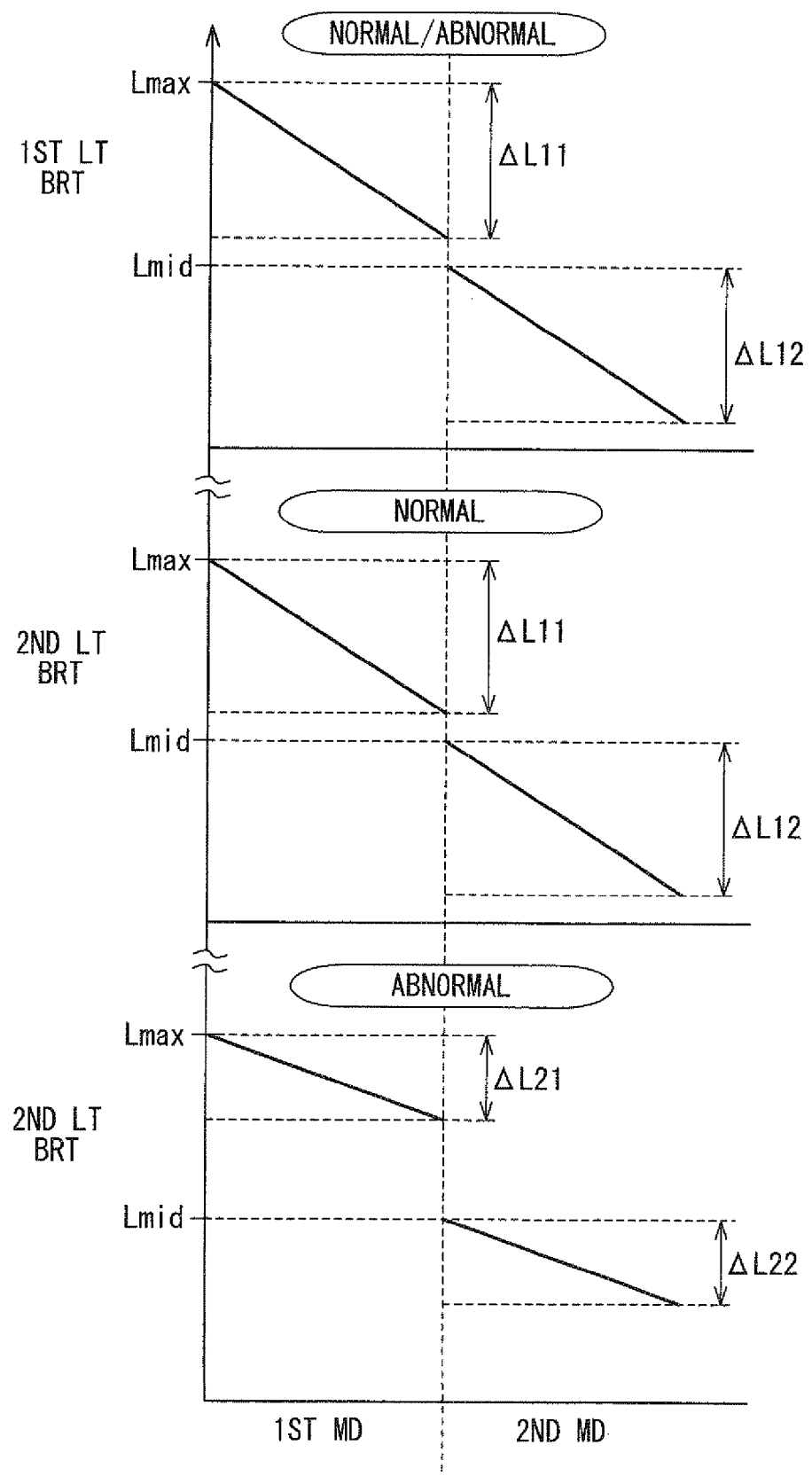
FIG. 29 shows a diagram of the light emission brightness of the first and second light source in the sixth embodiment of the present invention.
Figure 30:
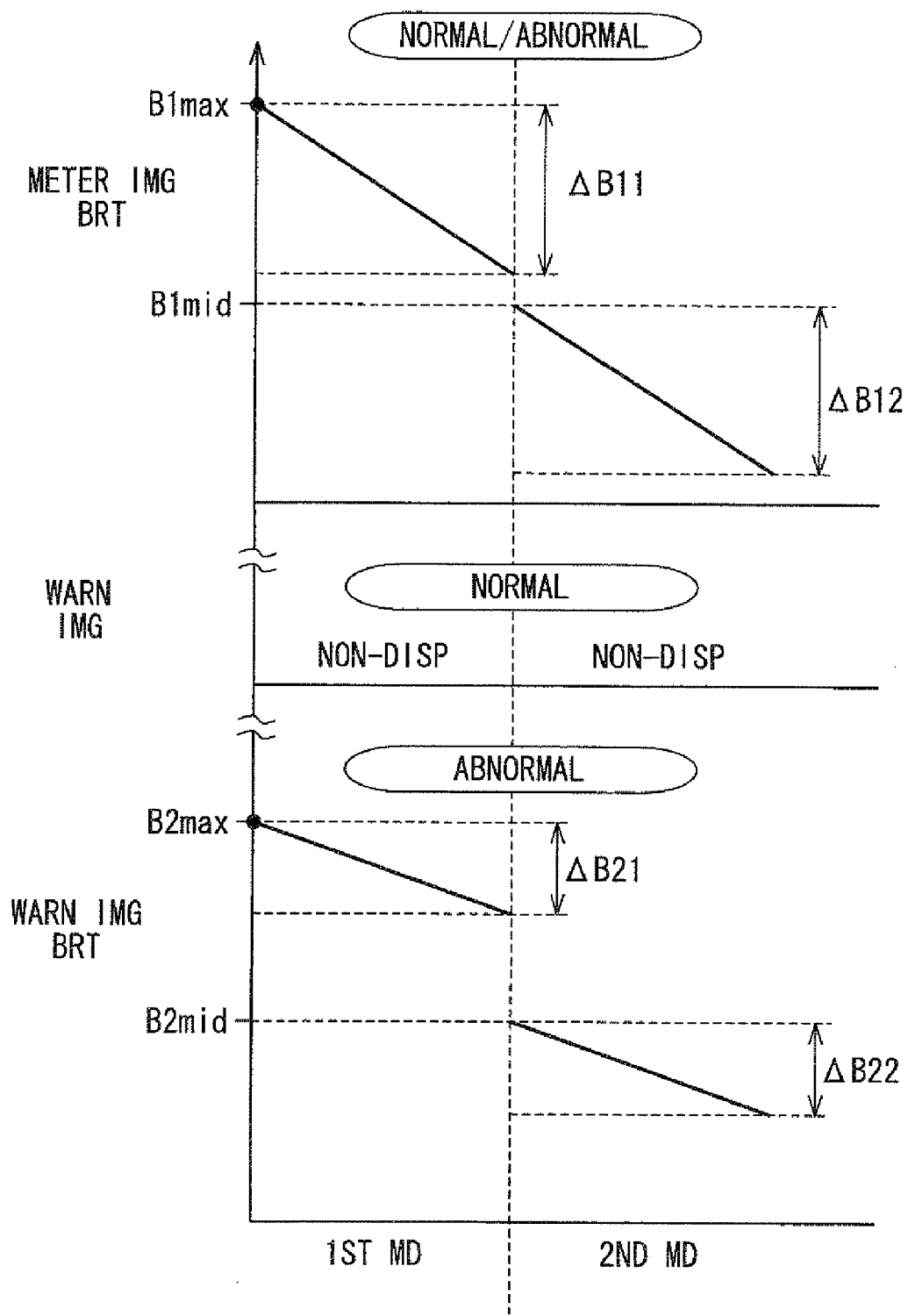
FIG. 30 shows a diagram of the meter image brightness and the warning image brightness in the sixth embodiment of the present invention.

The display operation of the display unit 300 in the sixth embodiment is explained next while referring to FIGS. 28 to 30. FIG. 28 shows a diagram of the gradation ratio in each of the pixel areas 214, 218. FIG. 29 shows the light emission brightness of each of the light sources 328a, 328b. FIG. 30 shows the brightness of each of the images 12, 216 and the like. In addition, the gradation ratio and the hue of the pixel to display the first background image 13 in the first pixel area 214 is fixed to let the display of the meter image 12 stand out from the background in the display operation and the control flow (described later) of the sixth embodiment.

(1) First Mode

The control circuit 362 maintains the meter display gradation ratio of the first pixel area 214 at a constant maximum ratio Rmax (FIG. 28) for an input adjustment value change in the normal time and the abnormal time of the first mode by controlling the liquid crystal panel 210.

In addition, the control circuit 362 changes the light emission brightness to corresponding brightness of the input adjustment value in the normal time and the abnormal time of the first mode by controlling the first light source 328a according to the first correlation information in the correlation information memory 364 which has the maximum luminance Lmax as the initial value. That is, the light emission brightness of the first light source 328a is adjusted to the brightness that corresponds to the input adjustment value that is equal to or smaller than the maximum luminance Lmax in a range ΔL11 (FIG. 29). Therefore, in whichever of the normal time and abnormal time of the first mode, the meter image 12 will be displayed at the maximum allowable brightness B1max (FIG. 30), or at suppressed brightness of occupant's preference in a range ΔL11 (FIG. 29).

Furthermore, the control circuit 362 adjusts the gradation ratio and the hue of the whole the second pixel area 218 to the level exclusively in the normal time of the first mode so that the warning image 216 and the second background image 217 are assimilated into the first background image 13. In addition, the control circuit 362 adjusts the light emission brightness to the same level the light emission brightness of the first light source 328 (the brightness in a range ΔL11 of FIG. 29) by controlling the second light source 328b. By the above control, the warning image 216 is not displayed in appearance in the normal time of the first mode (FIG. 30).

In contrast, the control circuit 362 maintains the warning display gradation ratio of the second pixel area 218 at a constant maximum ratio Rmax (FIG. 28) for an input adjustment value change exclusively in the abnormal time of the first mode by controlling the liquid crystal panel 210. In addition, the control circuit 362 changes the light emission brightness to the corresponding brightness of the input adjustment value, by controlling the second light source 328b, according to the second correlation information in the correlation information memory 364 which has the maximum luminance Lmax as the initial value. That is, the light emission brightness of the second light source 328b is adjusted to the brightness that is equal to or smaller than the maximum luminance Lmax in a range ΔL21 (FIG. 29) according to the input adjustment value. By the above control, the warning image 216 will be displayed at the maximum allowable brightness B2max (FIG. 30), or at suppressed brightness of occupant's preference in a range ΔB21 (FIG. 30) in the abnormal time of the first mode.

In addition, the gradation ratio and the hue of the second background image 217 are adjusted to the ratio (Rass) and a hue so that the image 217 is assimilated into the first background image 13 in the second pixel area 218 in the abnormal time of the first mode. In this manner, the display of the warning image 216 is provided in an outstanding manner against the surrounding second background image 217.

(2) Second Mode

The control circuit 362 maintains the meter display gradation ratio of the first pixel area 214 to the same level as the first mode (FIG. 28) in the normal time and the abnormal time of the second mode by controlling the liquid crystal panel 210.

In addition, the control circuit 362 changes the light emission brightness to the corresponding brightness of the input adjustment value in the normal time and the abnormal time of the second mode by controlling the first light source 328a according to the first correlation information in the correlation information memory 364 which has the intermediate brightness Lmid as the initial value. That is, the light emission brightness of the first light source 328a is adjusted to the corresponding brightness that is equal to or smaller than the intermediate brightness Lmid in a range ΔL12 (FIG. 29) according to the input adjustment value. Therefore, the meter image 12 will be displayed at the brightness that is equal to or smaller than the intermediate brightness B1mid of occupant's preference in a range ΔB12 (FIG. 30) in whichever of the abnormal time and the normal time of the first mode.

Furthermore, the control circuit 362 realizes the same gradation ratio (Rass of FIG. 28) and the hue as the first mode in pixel area 218 by controlling the liquid crystal panel 210 exclusively in the normal time of the second mode. In addition, the control circuit 362 adjusts the light emission brightness of the second light source 328b to the same brightness (the brightness in a range ΔL12 of FIG. 29) of the first light source 328 by controlling the second light source 328b. By the above control, the warning image 216 is not displayed in appearance in the normal time of the second mode (FIG. 30).

In contrast, the control circuit 362 maintains the warning display gradation ratio of the second pixel area 218 to the same level as the first mode (FIG. 28) in the abnormal time of the second mode by controlling the liquid crystal panel 210. In addition, the control circuit 362 changes the light emission brightness of the second light source 328 to the corresponding brightness of the input adjustment value by controlling the second light source 328b based on the second correlation information in the correlation information memory 364 which has the intermediate brightness Lmid as the initial value. That is, the light emission brightness of the second light source 328b is adjusted to the brightness that is equal to or smaller than the intermediate brightness in a range ΔL22 (FIG. 29) according to the input adjustment value. By the above control, the warning image 216 is displayed at brightness that is equal to or smaller than the intermediate brightness B2mid of the occupant hope in a range ΔB22 (FIG. 30) in the abnormal time of the second mode.

In addition, it will be adjusted so that it is it with similar gradation ratio and a hue in the case of the first mode about the gradation ratio of the pixel to display the second background image 217 and the hue in the second pixel area 218 in the abnormal time of the second mode. The display of the warning image 216 is provided in an outstanding manner against the surrounding second background image 217 by the above control.

Figure 31:
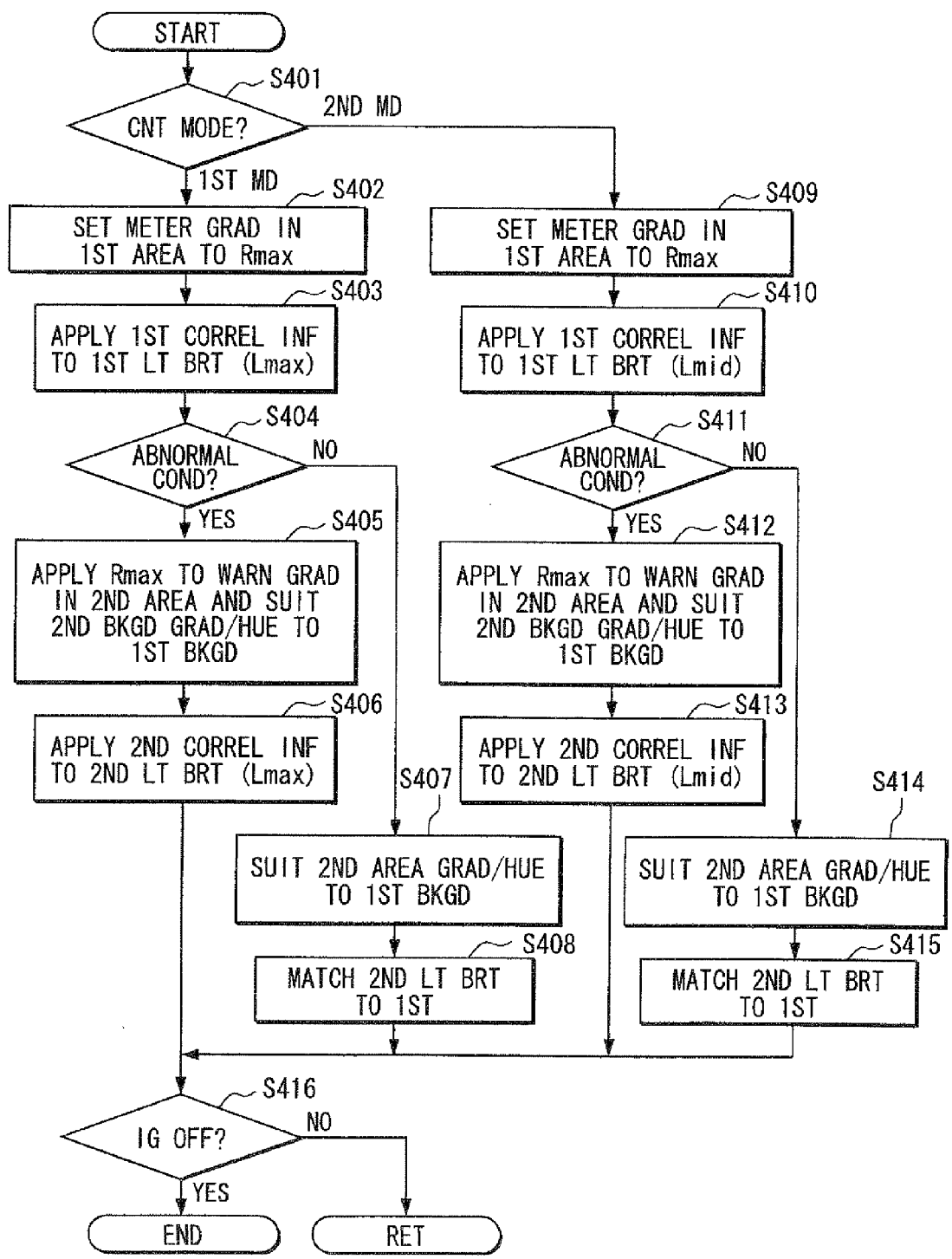
FIG. 31 shows a flowchart of the control flow in the sixth embodiment of the present invention.

The control flow in the control circuit 362 of the sixth embodiment is explained next while referring to FIG. 31. In addition, because steps S401, S404, S411 in FIG. 31 are substantially same as steps S301, S304, S309 in the fifth embodiment, the explanation of those steps are omitted. Steps S402, S403, S405-S410, S412-S416 in the sixth embodiment which are different from the fifth embodiment are explained in the following.

In step S402 which follows S401 when the first mode has been set in step S401, the meter display gradation ratio of the first pixel area 214 is adjusted to the maximum allowable ratio Rmax in the liquid crystal panel 210 that is considered as a control object. Then, in step S403, the light emission brightness of the first light source is adjusted to the brightness in a range ΔL11 according to the first correlation information that has the maximum luminance Lmax as the initial value. Thus, the meter image 12 with brightness B1max of the greatest permission or the brightness that was held down than B1max concerned in range ΔB11 by these controls.

Then, in step S405 which follows S404 when an affirmative determination has been accomplished in step S404, the warning display gradation ratio of the second pixel area 218 is adjusted to the maximum ratio Rmax in the liquid crystal panel 210 that is considered as a control object. At the same time, the gradation ratio and the hue of the second background image 217 in the second pixel area 218 is adjusted to be assimilated with the first background image 13 by controlling the liquid crystal panel 210. Further, in continuing step S406, the light emission brightness of the second light source 328b is adjusted to the brightness in a range ΔL21 according to the second correlation information that has the maximum brightness Lmax as the initial value by controlling the second light source 328b. By the above control, the display of the warning image 216 is adjusted to the maximum brightness B2max, or suppressed brightness that is smaller than the brightness B2max in a range ΔB21.

On the other hand, in step S407 which follows S404 when a negative determination has been accomplished in step S404, the gradation ratio and the hue of the whole second pixel area 218 in the liquid crystal panel 210 is adjusted so that the warning image 216 and the second background image 217 assimilate into the first background image 13 by controlling the panel 210. In step S408, the light emission brightness of the second light source 328b is adjusted to agree with the light emission brightness of the first light source 328a that has been adjusted in a previous step S403 by controlling the second light source 328b. By these controls, a non-display condition of the warning image 216 is realized.

The meter display gradation ratio of the first pixel area 214 is adjusted in the same manner as step S402 when the control flow proceeds to in step S409 after setting the control mode to the second mode in step S401. Then, in step S410, the light emission brightness of the first light source 328a is adjusted in a range ΔL12 according to the thing of according to the first correlation information that has the intermediate brightness Lmid as the initial value by controlling the first light source 328a successively. By the above control, the meter image 12 is displayed at suppressed brightness that is equal to or smaller than the intermediate brightness B1mid in a range ΔB12.

In step S412 which follows S411 when an affirmative determination has been accomplished in step S411, the warning display gradation ratio of the second pixel area 218 is adjusted in the same manner as step S405. At the same time, in step S412, the gradation ratio and the hue of the display pixel of the second background image 217 are adjusted in the same manner as step S405 in the second pixel area 218. Further, in continuing step S413, the light emission brightness of the second light source 328b is adjusted adjusts in a range ΔL22 according to the thing of according to the second correlation information that has the intermediate brightness Lmid as the initial value by controlling the second light source 328b. By the above control, the warning image 216 is displayed at suppressed brightness that is equal to or smaller than the intermediate brightness B2mid in a range ΔB22.

On the other hand, in step S414 which follows S411 when a negative determination has been accomplished in step S411, the gradation ratio and the hue of the whole second pixel area 218 are adjusted in the same manner as step S407. Then, in step S415, the light emission brightness of the second light source 328b is adjusted to agree with the light emission brightness of the first light source 328a that has been adjusted immediately previously in step S410. By these controls, a non-display condition of the warning image 216 is realized.

In addition, after the execution of step S406, S408, S413, or S415, the control flow proceeds to step S416, and whether an ignition switch determines is turned off is determined. When a negative determination has been accomplished, the control flow is finished. When an affirmative determination has been accomplished, the flow returns to step S401, and the control flow is continued.

In the sixth embodiment described above, because characteristic control of the light sources 328a, 328b regarding the light emission brightness is provided in the abnormal time of each of the modes where the warning image 216 is displayed together with the meter image 12, the same advantageous effect of as the fifth embodiment is achieved.

In the sixth embodiment, the backlight 320 is equivalent to an "illumination unit," the first light source 328a is equivalent to a "meter display light source," and the second light source 328b is equivalent to a "warning display light source." Further, the imaging unit 40, the drawing unit 250 and the main control unit 360 are equivalent to a "control unit," and the main control unit 360 is equivalent to a "light source brightness control unit" in the sixth embodiment. Furthermore, the correlation information memory 364 is equivalent to a "correlation information storage unit," the first and the second correlation information in the correlation information memory 364 are equivalent to "correlation information in the correlation information storage unit," and the state value sensor 66 and the main control unit 360 are equivalent to an "abnormality detection unit."

Seventh Embodiment

The seventh embodiment of the present invention is the modification of the second embodiment. In addition, the focus of the description in the following is mainly put on the difference of the seventh embodiment from the second embodiment.

Figures 32, 33:
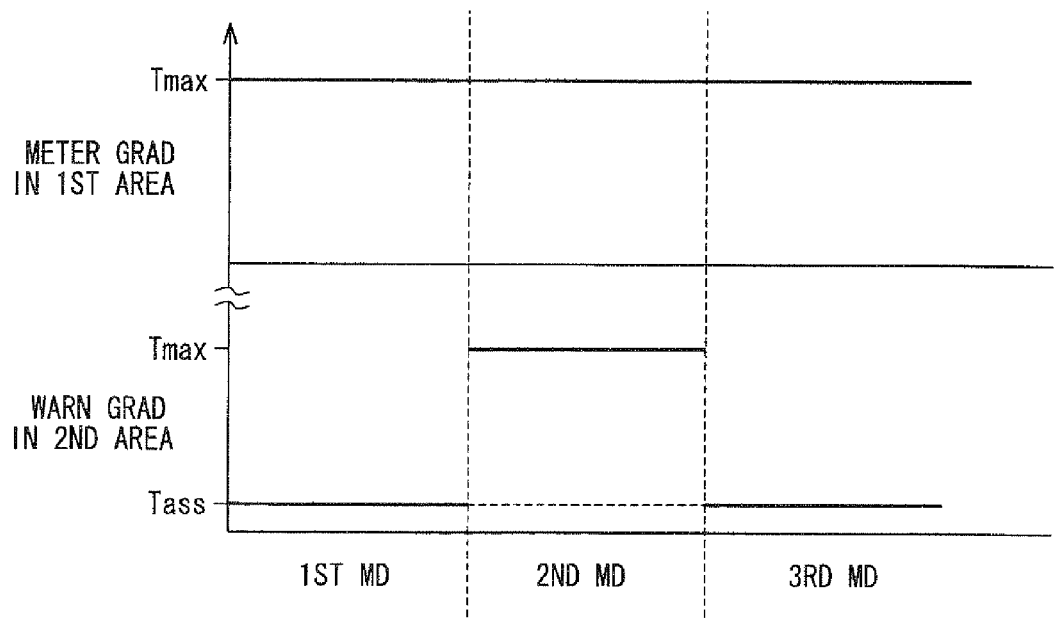
FIG. 32 shows a diagram of a pixel gradation value in a seventh and eighth embodiment of the present invention.
FIG. 33 shows a diagram of the gradation value of the first and second pixel area in the seventh embodiment of the present invention.

In the seventh embodiment, it is more practically described in FIG. 32 in detail that a gradation value of the subpixel is determined in a range between 0 and the maximum value (the range includes both of the zero and the maximum value) when the subpixel contributing to a certain hue expression in one pixel is further required to express thickness for the hue expression.

In the seventh embodiment, the display instruction signal is provided for the drawing circuit 52 of the drawing unit 50. The instruction signal indicates that the gradation values of the subpixels that are necessary for the hue expression are chosen in the above-described manner, and the gradation values of the rest of the subpixels are set to zero. Therefore, for the brevity of the description, the gradation values of the subpixels that are required for the hue expression are designated as "pixel gradation value" in the following description.

In addition, when plural subpixels are required for the hue expression, each of the gradation values of the subpixels is considered as the "pixel gradation value." Therefore, as for the maximum value of the pixel gradation value, the combination of the values varies in the following manner. That is, as shown in FIG. 32, the value of 63 is used as the pixel gradation value when the hue of red is expressed by only one subpixel R. When two subpixels R, G are used for expressing the hue of yellow, the pixel gradation values are respectively 63, 31. When three subpixels R, G, B are used to express the hue of white, the gradation values are respectively 63, 63, 63.

Figure 34:
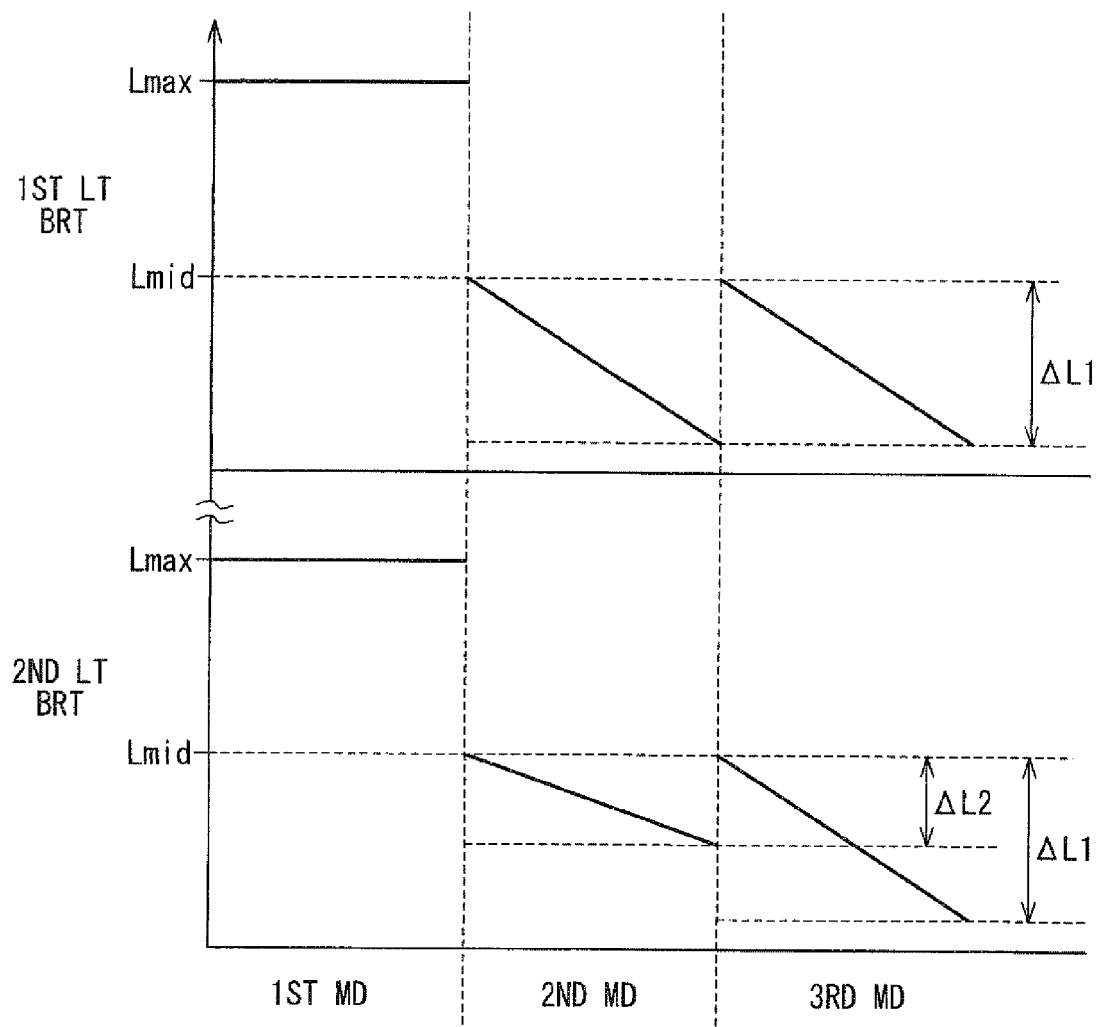
FIG. 34 shows a diagram of the light emission brightness of the first and second light source in the seventh embodiment of the present invention.
Figure 35:
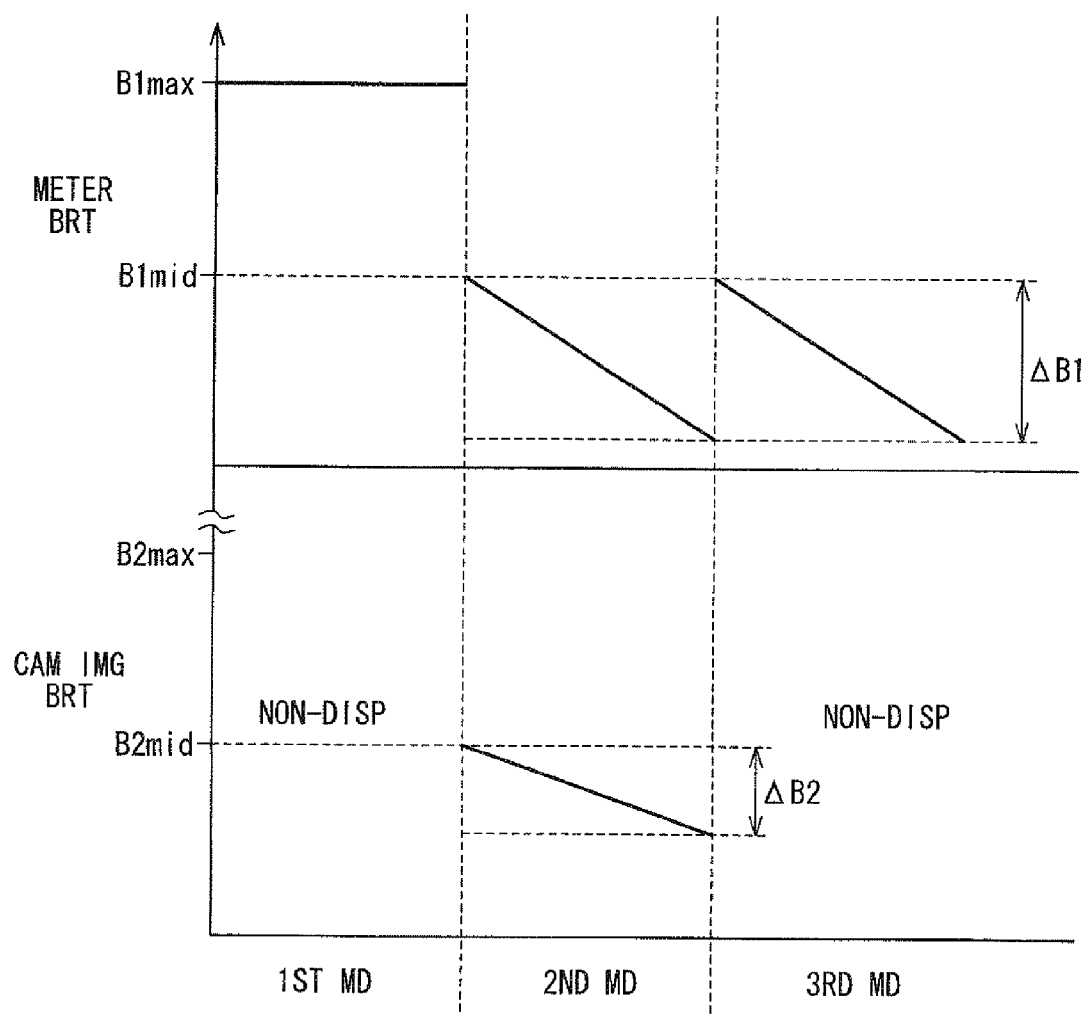
FIG. 35 shows a diagram of the meter image brightness and the outside image brightness in the seventh embodiment of the present invention.

The display operation of the seventh embodiment is explained in the following while referring to FIGS. 33 to 35. FIG. 33 shows the gradation value of each of the pixel areas 14, 18. FIG. 34 shows the light emission brightness of the light sources 128a, 128b. FIG. 35 shows the brightness of each of the images 12, 16. In addition, in the control flow (described later) and the display operation of the seventh embodiment, the gradation value and the hue of the pixel that displays the background image 13 in the first pixel area 14 is fixed to let the display of the meter image 12 stand out from the background image 13.

(1) First Mode

The control circuit 162 maintains the pixel gradation value to display the meter image 12 in the first pixel area 14 (i.e., a "meter display gradation value" hereinafter) at a constant maximum value $T_{max}$ (FIG. 33) for an input adjustment value change in the first mode by controlling the liquid crystal panel 10.

In addition, the control circuit 162 maintains the light emission brightness at a constant maximum luminance Lmax (FIG. 34) for an input adjustment value change in the first mode by controlling the first light source 128a.

The meter image 12 will be displayed at a maximum allowable brightness B1max (FIG. 35) in the first mode by the above control.

In addition, the gradation value and the hue of the whole second pixel area 18 in this first mode is adjusted so that the outside image 16 is assimilated into the background image 13 at the adjusted gradation value (Tass of FIG. 33) and the hue. In addition, the second light source 128b in the first mode is adjusted to agree with the light emission brightness of the first light source 128a (Lmax of FIG. 34). Therefore, the outside image 16 is not displayed in appearance (FIG. 35).

(2) Second Mode

In the second mode, the control circuit 162 maintains the meter display gradation value of the first pixel area 14 and the gradation value of the whole second pixel area 18 to the same level as the meter display gradation value (FIG. 33) in the first mode by controlling the liquid crystal panel 10.

In addition, the control circuit 162 changes the light emission brightness of the first light source 128a to the corresponding brightness of the input adjustment value according to the first correlation information in the correlation information memory 164 in the second mode by controlling the first light source 128a. That is, the light emission brightness of the first light source 128a is adjusted to the value that is equal to or smaller than the intermediate brightness Lmid in a range ΔL1 (FIG. 34) according to the input adjustment value.

Furthermore, the control circuit 162 changes the light emission brightness of the second light source 128b to the corresponding value of the input adjustment value according to the second correlation information in the correlation information memory 164 in the second mode by controlling the second light source 128b. That is, the light emission brightness of the second light source 128b is adjusted to the value that is equal to or smaller than the intermediate brightness Lmid in a range ΔL2 (FIG. 34) and is greater than the light emission brightness of the first light source 128a in the second mode according to the input adjustment value.

Therefore, for example, the controlled images 12, 16 will be respectively displayed at suppressed brightness of occupant's preference that is equal to or smaller than the intermediate brightness B1mid in a range ΔB1 and B2mid in a range ΔB2 (FIG. 35) in the second mode by the above control so that the outside image 16 becomes brighter than the meter image 12.

(3) Third Mode

The control circuit 162 maintains the meter display gradation value of the first pixel area 14 at the same level as the first mode (FIG. 33) in the third mode by controlling the liquid crystal panel 10.

In addition, the control circuit 162 changes the light emission brightness to the same level as the second mode (FIG. 34) in the third mode by controlling the first light source 128a.

Therefore, the gradation value and the hue of the whole second pixel area 18 in the third mode are adjusted so that the outside image 16 is assimilated into the background image 13 at the adjusted gradation value (Tass of FIG. 33) and the hue. In addition, the light emission brightness of the second light source 128b in the third mode is controlled so that the light emission brightness accords with the light emission brightness of the first light source 128a (the brightness in a range ΔL1 of FIG. 34).

Therefore, in the third mode, while the meter image 12 is displayed at suppressed brightness of occupant's preference in a range ΔB1 (FIG. 35) by the above control, the outside image 16 is not displayed in appearance.

Figure 36:
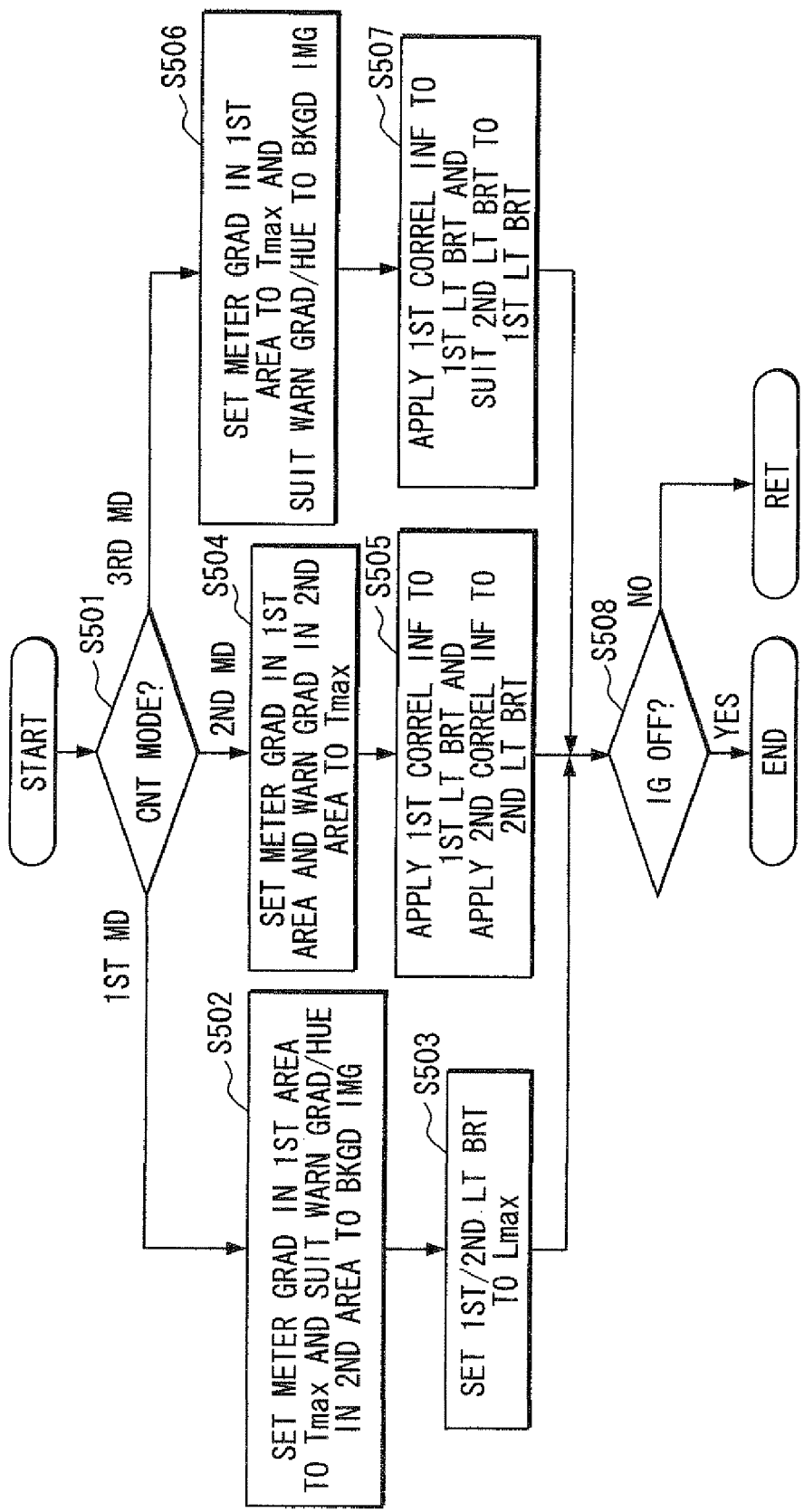
FIG. 36 shows a flowchart of the control flow in the seventh embodiment of the present invention.

The control flow of the seventh embodiment is explained successively while referring to FIG. 36. In this case, because steps S501, S508 are substantially same as steps S201, S208 of the second embodiment, the explanation of those steps is omitted, and steps S502-S507 which are different from the second embodiment are explained in the following description.

In step S502 which follows S501 when the first mode is set in step S501, the meter display gradation value of the first pixel area 14 is adjusted to the maximum value $T_{max}$ by controlling the liquid crystal panel 10. Also in step S502, the gradation value and the hue of the whole second pixel area 18 is adjusted so that the outside image 16 is assimilated into the background image 13 by controlling the panel 10. After the above-mentioned control, in step S503, the meter image 12 is displayed at the maximum allowable brightness B1max and the outside image 16 is put in a non-display condition by adjusting the light emission brightness to the maximum luminance Lmax for both of the first and the second light sources 128a, 128b.

On the other hand, in step S504 which follows S501 when the second mode is set in step S501, the meter display gradation value of the first pixel area 14 and the gradation value of the whole second pixel area 18 are adjusted to the maximum value $T_{max}$ by controlling the liquid crystal panel 10. In step S505, the meter image 12 is displayed at suppressed brightness in a range ΔB1 by adjusting the light emission brightness to brightness in a range ΔL1 according to the first correlation information by controlling the first fight source 128a successively. Also in step S505, the light emission brightness is adjusted to the brightness in a range ΔL2 according to the second correlation information by controlling the second light source 128b so that the outside image 16 is displayed at suppressed brightness in a range ΔB2.

On the other hand, in step S506 which follows S501 when the third mode is set in step S501, the meter display gradation value in the first pixel area 14 and the gradation value and the hue of the whole second pixel area 18 are adjusted in the same manner as step S502. In step S507, the light emission brightness of the first light source 128a is adjusted in the same manner as step S505 so that the meter image 12 is displayed at brightness in a range ΔB1. Also in step S507, the light emission brightness of the second light source 128b is adjusted to agree with the light emission brightness of the first light source 128 practically in a manner that is different from step S505 to put the outside image 16 in a non-display condition.

According to the operation scheme in the seventh embodiment as described above, characteristic light emission brightness is provided for each of the light sources 128a, 128b in the second mode where the outside image 16 is displayed together with the meter image 12, thereby producing the same advantageous effect as observed in the second embodiment.

Eighth Embodiment

The eighth embodiment of the present invention is the modification of the sixth embodiment. In addition, the focus of the description is mainly put on the difference from the sixth embodiment.

The display instruction signal which defines the gradation value substantially in the same manner as the seventh embodiment will be given to the drawing circuit 252 of the drawing unit 250 as shown in FIG. 32 in the eighth embodiment. Therefore, in the present embodiment, the gradation value of the subpixel that is required for the hue expression is explained as the "pixel gradation value" among subpixels that constitute a pixel.

Figure 37:
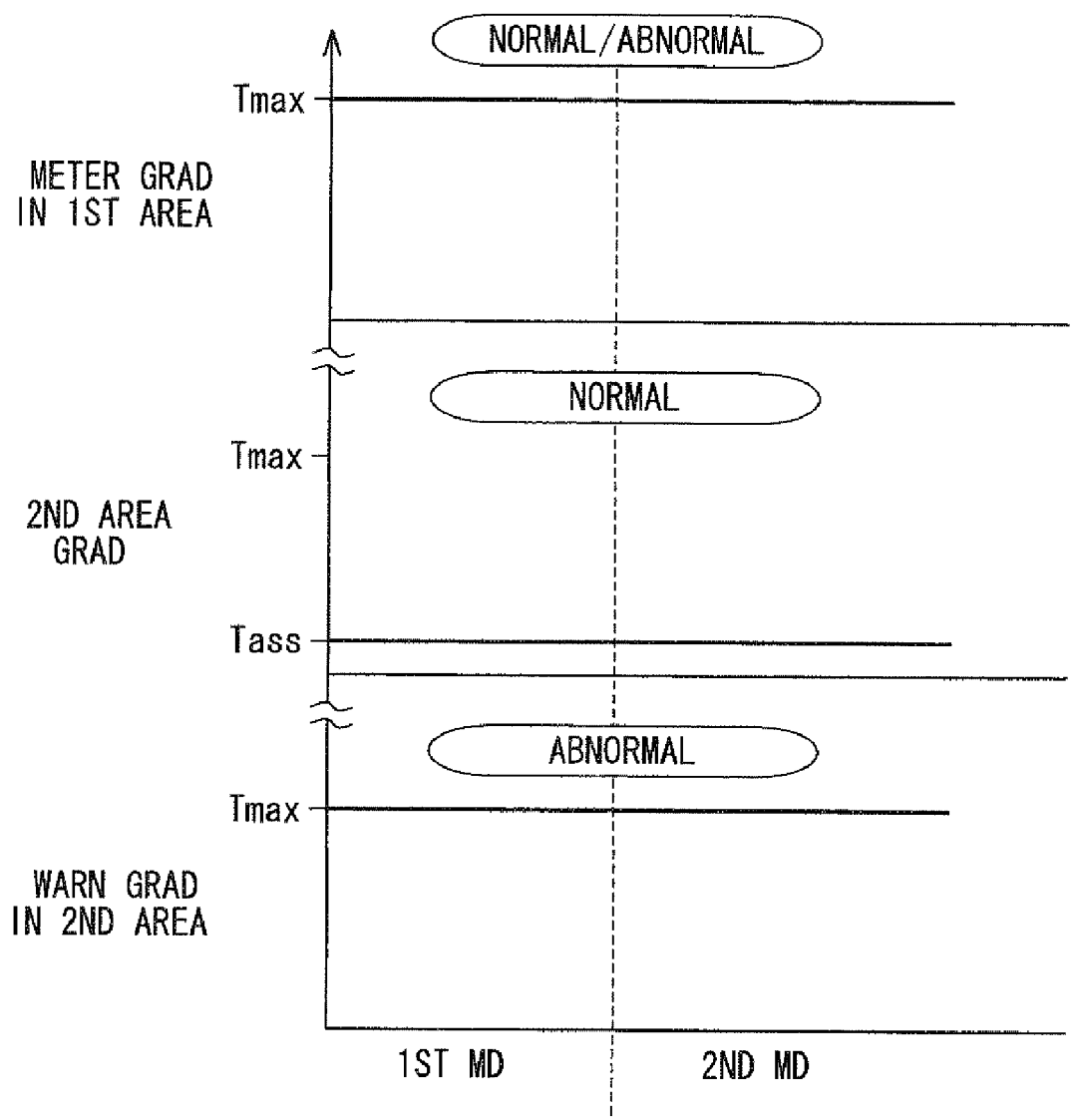
FIG. 37 shows a diagram of the gradation value of the first and second pixel area in an eighth embodiment of the present invention.
Figure 38:
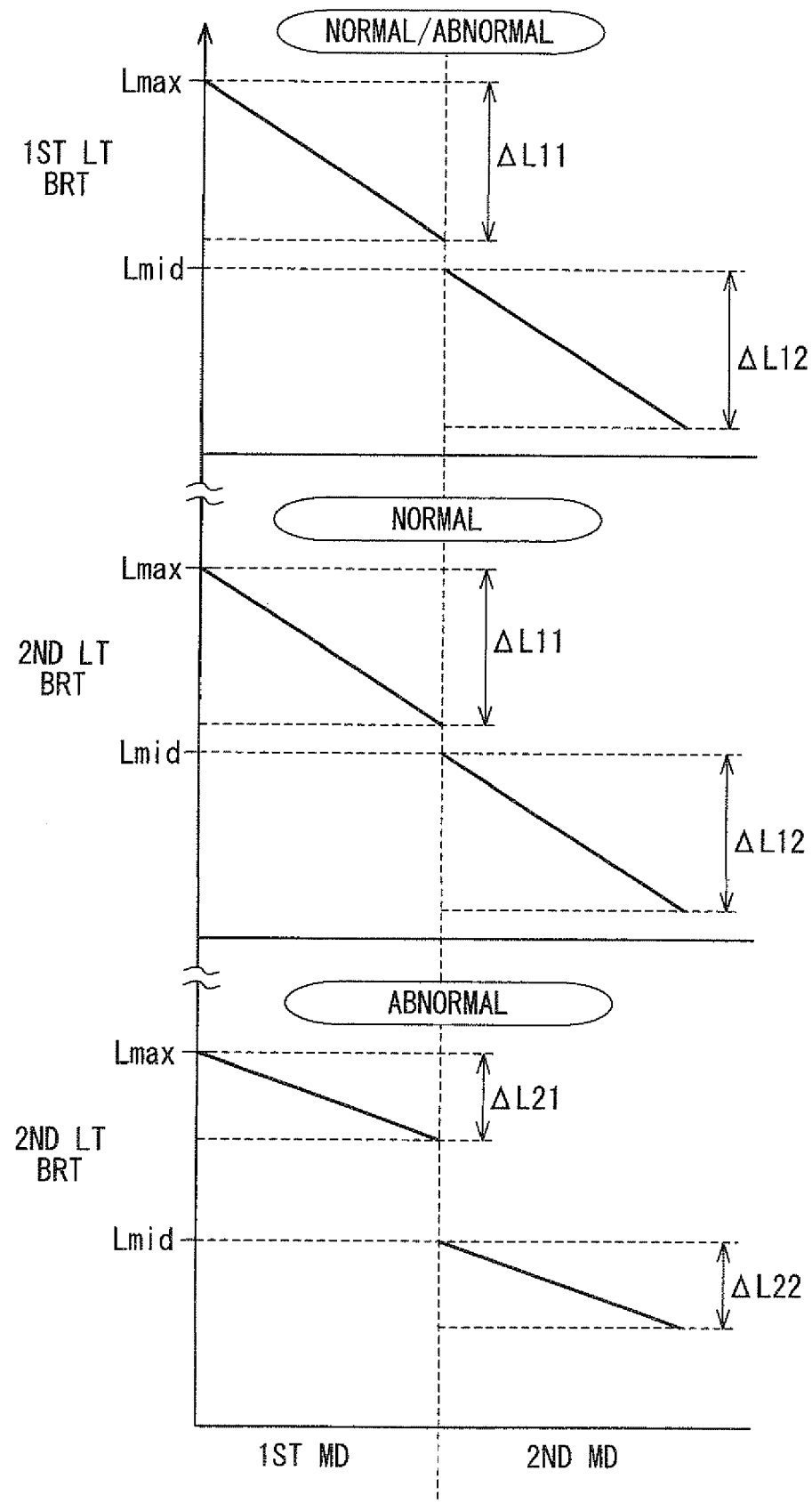
FIG. 38 shows a diagram of the light emission brightness of the first and second light source in the eighth embodiment of the present invention.
Figure 39:
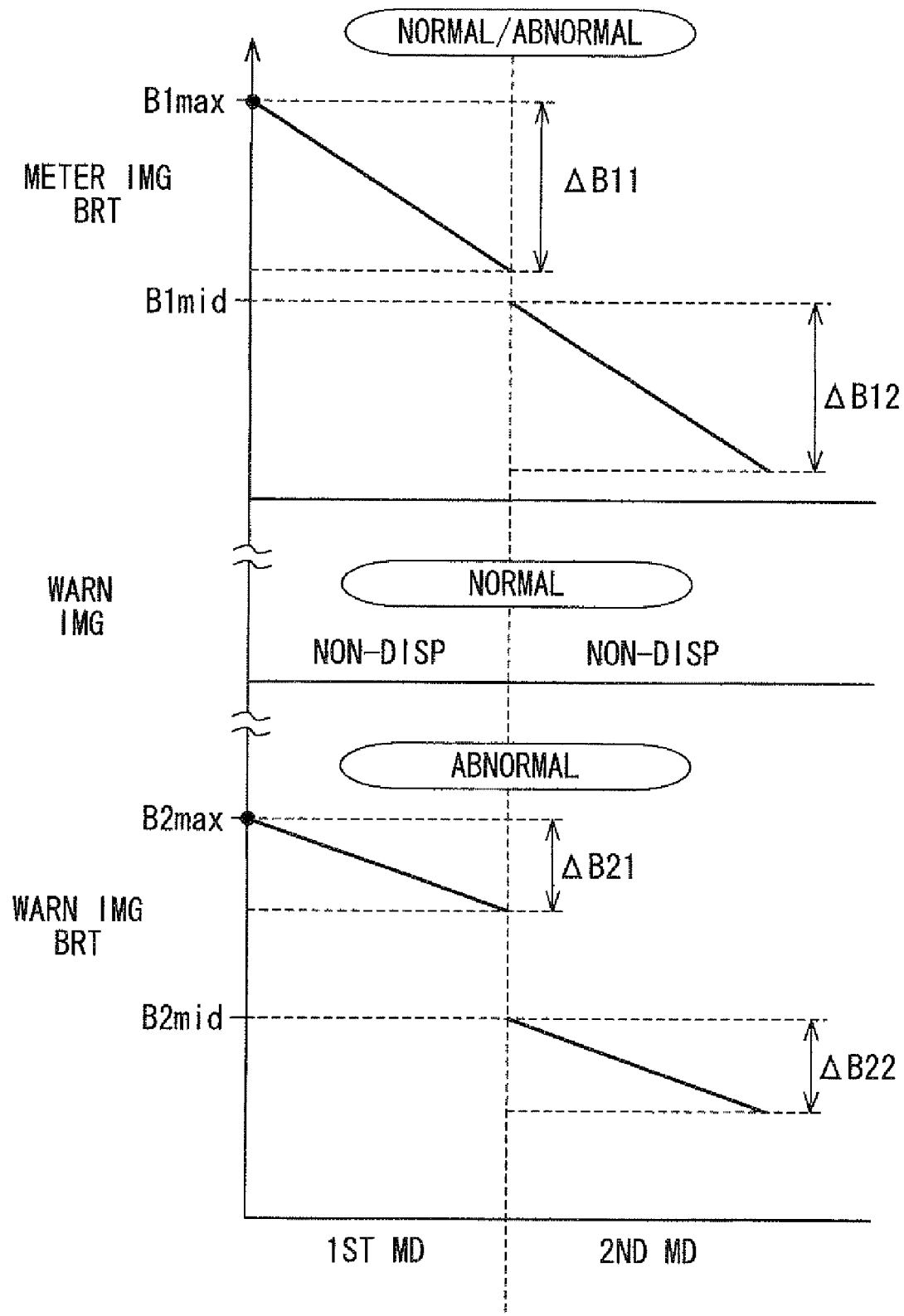
FIG. 39 shows a diagram of the meter image brightness and the warning image brightness in the eighth embodiment of the present invention.

The display operation of the eighth embodiment is explained in the following while referring to FIGS. 37 to 39. FIG. 37 shows a diagram of the gradation value in each of the pixel areas 214, 218. FIG. 38 shows a diagram of the light emission brightness of each of the light sources 328a, 328b. FIG. 39 shows the brightness of each of the images 12, 216 and the like. In addition, the gradation value and the hue of the pixel to display the background image 13 in the first pixel area 214 are fixed to let the meter image 12 stand out from the background in the display operation and the control flow that is described later.

(1) First Mode

The control circuit 362 maintains meter display gradation value of the first pixel area 214 at a constant maximum value $T_{max}$ (FIG. 37) against an input adjustment value change in the normal time and the abnormal time of the first mode by controlling the liquid crystal panel 210.

In addition, the control circuit 362 changes the light emission brightness to the corresponding brightness of the input adjustment value in the normal time and the abnormal time of the first mode by controlling the first light source 328a according to the first correlation information in the correlation information memory 364 that has the maximum luminance Lmax as the initial value. That is, the light emission brightness of the first light source 328a is adjusted to the brightness that is equal to or smaller than the maximum luminance Lmax in a range ΔL11 (FIG. 38) according to the input adjustment value. Therefore, in whichever of the normal time and the abnormal time of the first mode, the meter image 12 will be displayed at the maximum allowable brightness B1max (FIG. 39), or suppressed brightness of occupants preference in a range ΔB11 (FIG. 39).

Further, the control circuit 362 adjusts the gradation value and the hue of the whole second pixel area 218 to a level so that the warning image 216 and the second background image 217 are assimilated into the first background image 13 at the adjusted gradation value (Tass of FIG. 37) and hue. In addition, the control circuit 362 controls the light emission brightness of the second light source 328b to agree with the light emission brightness (the brightness in a range ΔL11 of FIG. 38) of the first light source 328a. By the above control, the warning image 216 is not displayed in appearance in the normal time of the first mode (FIG. 39).

In contrast, the control circuit 362 maintains the pixel gradation value to display the warning image 216 as the "warning sign-like image" in the second pixel area 218 by controlling the liquid crystal panel 210 (the gradation value is designated as a "warning display gradation value" hereinafter) at a constant maximum value $T_{max}$ (FIG. 37) against an input adjustment value change in the abnormal time of the first mode. In addition, the control circuit 362 changes, by controlling the second light source 328b, the light emission brightness to the corresponding brightness of the input adjustment value according to the second correlation information in the correlation information memory 364 that has the maximum luminance Lmax as the initial value. That is, the light emission brightness of the second light source 328b is adjusted to the brightness that is equal to or smaller than the maximum luminance Lmax in a range ΔL21 (FIG. 38) according to the input adjustment value. The warning image 216 will be displayed at the maximum allowable brightness B2max (FIG. 39), or at suppressed brightness of the occupant's preference in a range ΔB21 (FIG. 39) in the abnormal time of the first mode by the above control.

In addition, in the second pixel area 218 in the abnormal time of the first mode, the gradation value and the hue of the pixel to display the second background image 217 is adjusted to the value (Tass) and hue so that the image 217 is assimilated into the first background image 13. Therefore, the display of the warning image 216 is provided in an outstanding manner from the second background image 217 that surrounds the image 216.

(2) Second Mode

The control circuit 362 maintains the meter display gradation value of the first pixel area 214 at the same level as the first mode (FIG. 37) in the normal time and the abnormal time of the second mode by controlling the liquid crystal panel 210.

In addition, the control circuit 362 changes, by controlling the first light source 328a, the light emission brightness to the corresponding brightness of the input adjustment value in the normal time and the abnormal time of the second mode according to the first correlation information in the correlation information memory 364 that has the intermediate brightness Lmid as the initial value among. That is, the light emission brightness of the first light source 328a is adjusted to the brightness that is equal to or smaller than the intermediate brightness Lmid in a range ΔL12 (FIG. 38) according to the input adjustment value. Therefore, in whichever of the abnormal time and the normal time of the first mode, the meter image 12 will be displayed at suppressed brightness of the occupants preference that is equal to or smaller than the intermediate brightness B1mid in a range ΔB12.

Further, the control circuit 362 realizes similar gradation value (Tass of FIG. 37) and hue in the first mode in pixel area 218 exclusively in the normal time of the second mode by controlling the liquid crystal panel 210. In addition, the control circuit 362 matches the light emission brightness of the second light source 328b with light emission brightness of the first light source 328a (the brightness in a range ΔL12 of FIG. 38) by controlling the second light source 328b. By the above control, the warning image 216 is not displayed in appearance in the normal time of the second mode (FIG. 39).

In contrast, the control circuit 362 maintains the warning display gradation value of the second pixel area 218 at the same level as the first mode (FIG. 37) in the abnormal time of the second mode by controlling the liquid crystal panel 210. In addition, the control circuit 362 changes, by controlling the second light source 328b, the light emission brightness to the corresponding brightness of the input adjustment value according to the second correlation information in the correlation information memory 364 that has the intermediate brightness Lmid as the initial value. That is, the light emission brightness of the second light source 328b is adjusted to the brightness that is equal to or smaller than the intermediate brightness Lmid in a range ΔL22 (FIG. 38) according to the input adjustment value, The warning image 216 is displayed in the abnormal time of the second mode at suppressed brightness of the occupant's preference that is equal to or smaller than intermediate brightness B2mid in a range ΔB22 (FIG. 39) by the above control.

In addition, the gradation value and hue of the pixel to display the second background image 217 in the second pixel area 218 in the abnormal time of the second mode is adjusted to the same gradation and hue as the first mode. The display of the warning image 216 is provided in an outstanding manner from the second background image 217 that surrounds the image 216 by the above control.

Figure 40:
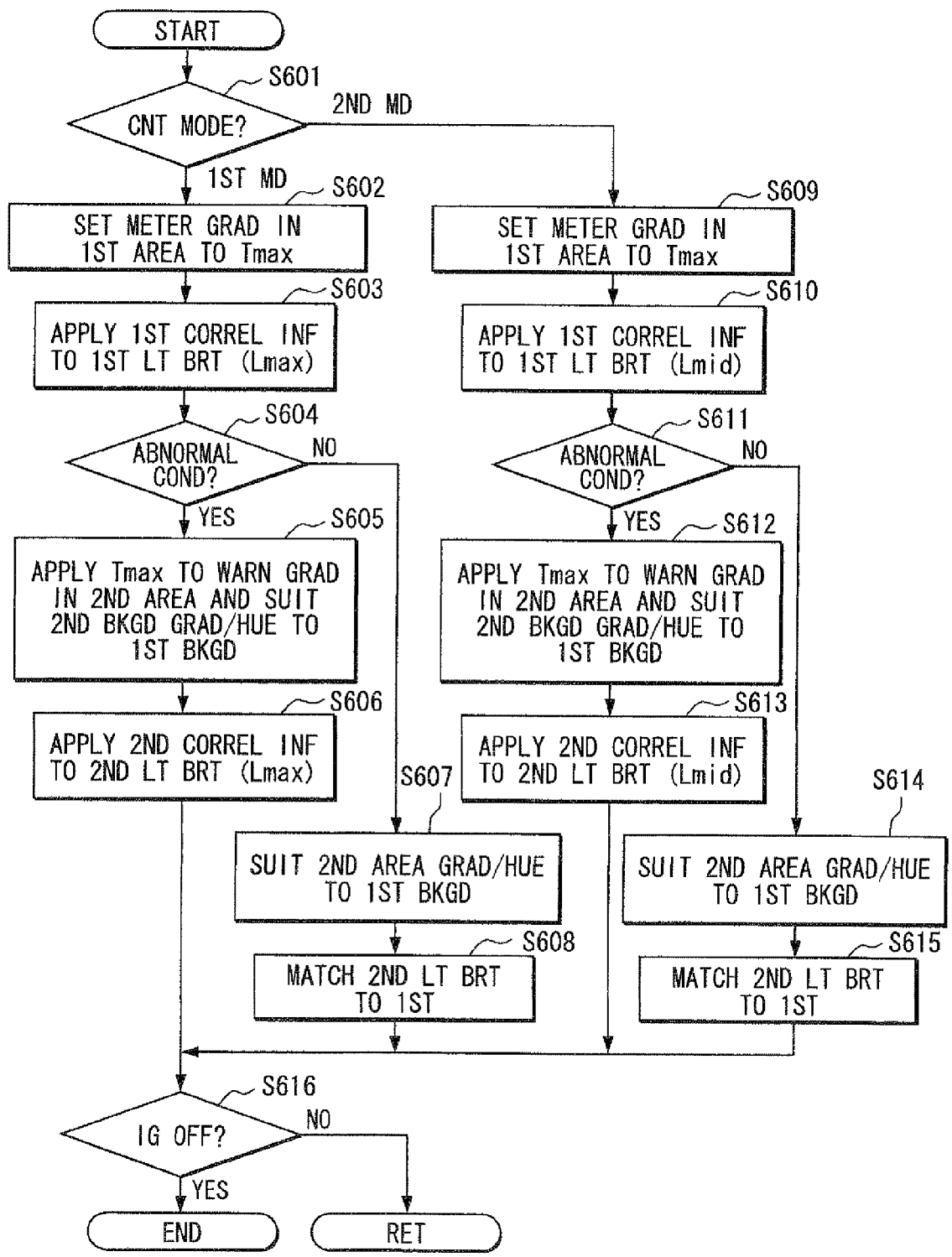
FIG. 40 shows a flowchart of the control flow in the eighth embodiment of the present invention.

Successively, the control flow of the eighth embodiment is explained while referring to FIG. 40. In addition, because steps S601, S604, S611, S616 in FIG. 40 are same as steps S501, S404, S411, S416 substantially, only steps S602, S603, S605-S610, S612-S615 which are different from the first embodiment are explained in the following description.

In step S602 which follows S602 when the first mode is set in step S601, the meter display gradation value of the first pixel area 214 is adjusted to the maximum value Tmax by controlling the liquid crystal panel 210. Then, in step S603, the light emission brightness of the first light source 328a is adjusted to in a range ΔL11 according to the first correlation information that has the maximum luminance Lmax as the initial value. The meter image 12 is displayed the maximum allowable brightness B1max, or suppressed brightness that is smaller than B1max in a range ΔB11 by these controls.

Then, in step S605 which follows S604 when an affirmative determination has been accomplished in step S604, the warning display gradation value of the second pixel area 218 is adjusted to the maximum value $T_{max}$ by controlling the liquid crystal panel 210. At the same time, the gradation value and hue of the pixel to display the second background image 217 in the second pixel area 218 is adjusted in step S605 so as to assimilate the image 217 into the first background image 13 by controlling the liquid crystal panel 210. Further, in continuing step S606, the light emission brightness of the second light source 328b is adjusted in a range ΔL21 according to the second correlation information that has the maximum luminance Lmax as the initial value. The warning image 216 is displayed at the maximum allowable brightness B2max, or suppressed brightness that is smaller than B2max in a range ΔB21 by these controls.

On the other hand, in step S607 which follows S604 when a negative determination has been accomplished in step S604, the gradation value and hue of the whole second pixel area 218 are adjusted so that the liquid crystal panel 210 is adjusted so that the warning image 216 and the second background image 217 assimilate into the first background image 13 by controlling the liquid crystal panel 210. Then, in step S608, the light emission brightness of the second light source 328b is adjusted to match the light emission brightness of the first light source 328a that is adjusted immediately previously in step S603. By these controls, a non-display condition of the warning image 216 is realized.

In step S609 which follows S601 when the second mode is set in step S601, the meter display gradation value of the first pixel area 214 is adjusted in the same manner as step S602. Then, in step S610, the light emission brightness of the first light source 328a is adjusted in a range ΔL12 according to the first correlation information that has the intermediate brightness Lmid as the initial value by controlling the first light source 328a. The meter image 12 is displayed at suppressed brightness that is equal to or smaller than the intermediate brightness B1mid in a range ΔB12 by these controls.

In step S612 which follows S611 when an affirmative determination has been accomplished in step S611, the warning display gradation value and hue of the second pixel area 218 is adjusted in the same manner as step S605. At the same time, in step S612, the gradation value and the hue of the display pixel of the second background image 217 in the second pixel area 218 are adjusted in the same manner as step S605. Further, in continuing step S613, the light emission brightness of the second light source 328b is adjusted in a range ΔL22 according to the second correlation information that has the intermediate brightness Lmid as the initial value. The warning image 216 is, by these controls, displayed at the brightness that is equal to or smaller than the intermediate brightness B2mid in a range ΔB22.

On the other hand, in step S614 which follows when a negative determination has been accomplished in step S611, the gradation value and the hue of the whole second pixel area 218 are adjusted in the same manner as step S607. Then, in step S615, the light emission brightness of the second light source 328b is adjusted to agree with the light emission brightness of the first light source 328a adjusted immediately previously in step S610. By these controls, a non-display condition of the warning image 216 is realized.

In the eighth embodiment described above, because characteristic control of each of the light sources 328a, 328b regarding the light emission brightness is provided in the abnormal time of each of the modes where the warning image 216 is displayed together with the meter image 12, the same advantageous effect as the sixth embodiment is achieved.

Ninth Embodiment

The ninth embodiment of the present invention is the modification of the first embodiment and the fifth embodiment. In addition, the focus of the description in the following is mainly put on the difference of the ninth embodiment from the preceding embodiments.

In the ninth embodiment, the liquid crystal panel 10 of the display unit 1 has the second pixel area 218 displaying the warning image 216 and the background image 217 in the lower part of the first pixel area 14 as shown in FIG. 41. The warning image 216 includes the waning light image 216a for the engine coolant temperature warning and the warning light image 216b for the fuel emptiness warning in the present embodiment.

In the present embodiment, the "night-view image," that is, the outside image 16 may be displayed together with the warning light images 216a, 216b. When the engine coolant temperature warning and/or the fuel emptiness warning is required while the outside image 16 is displayed, the gradation ratio of the warning images 216a, 216b (i.e., the warning display gradation ratio) of the second pixel area 218 is controlled to be greater than the meter display gradation ratio of the first pixel area 14. Further, the warning display gradation ratio of the images 216a, 216b may be made equal to the gradation ratio of the outside image 16, or may be controlled to be greater than the gradation ratio of the outside image 16 when the warning is provided.

By the above control, the same advantageous effect of the fifth embodiment for letting the warning stand out from the meter image 12 is achieved without compromising the merit of the displaying the outside image 16 in combination with the meter image 12.

Other Embodiments

Although the present invention has been fully described in connection with the preferred embodiment thereof with reference to the accompanying drawings, it is to be noted that various changes and modifications will become apparent to those skilled in the art.

For example, as a combination of the first and third embodiments or a combination of the second and fourth embodiments, the brightness of the images 12, 16 may be adjusted by changing both of the gradation ratio of the pixel areas 14, 18 and the light emission brightness of the light sources 128a, 128b. Further, the fifth embodiment and the sixth embodiment may be combined so that the brightness of images 12, 216 may be adjusted in the same manner as the original embodiments by changing both of the gradation ratio of pixel areas 214, 218 and the light emission brightness of the light sources 328a, 328b. Furthermore, at least one of the first through fourth and seventh embodiments and at least one of the fifth, sixth and eighth embodiments may be combined for displaying both of the outside image 16 and the warning image 216 in the display scheme of the present embodiment.

The transparent liquid crystal panels 10, 210 in the first to eighth embodiment may be replaced with the reflection liquid crystal panel as well. In this case, for the lighting of the panel, the reflective lighting unit that lights the panels 10, 210 from a front of the panels may be used.

The backlight 20 in the first, third and fifth embodiments that emits light as a combination of the light emitting diode 22 and the diffusion board 24 may be replaced with other light sources as long as the light emission brightness of the light source is adjustable. Similarly, various sources of light that can adjust the light emission brightness may be used to replace the light sources of the backlights 120, 320 in the second, fourth and sixth to eighth embodiments, that is, the light sources 128a, 128b, 328a, 328b that are provided as the combination of the light emitting diodes 122a, 122b, 322a, 322b with the diffusion boards 124a, 124b, 324a, 324b.

In the first to ninth embodiments, not only the EEPROM that readily stores information prior to the shipping from the factory but also the other kind of ROM may be used to implement the image memories 54, 254 and the correlation information memories 64, 164, 264, 364. In addition, the gradation ratio or the light emission brightness may be changed multi-dimensionally, or may be changed stepwise instead of changing linearly when the input adjustment value is changed in those embodiments. That is, the correlation information memorized in the correlation information memories 64, 164, 264, 364 may represent a multi-dimensional function, a stepwise function, or other function for the input adjustment value change. Furthermore, the input adjustment value may be defined as stepwise change, or may be defined as continuous change. That is, the continuous change of the input adjustment value may correspond to an arbitrary positioning of operation positions of the liquid crystal adjustment switch 32 within a predetermined limit.

In the first to ninth embodiments, the meter image 12 may represent vehicle conditions of travel distance or the like from the sensor 66, besides the condition values of vehicle speed, engine rotation, engine coolant temperature, fuel residual quantity or the like. Further, the outside image 16 may display the image captured by a visible light capture device to, for example, capture the reflection of the visible light in a front, side and rear field of the vehicle in the first to fourth and seventh embodiments. Furthermore, in the fifth, sixth and eighth embodiments, the abnormality except for the temperature rise abnormality of the engine coolant and the empty abnormality of the fuel residual quantity may be displayed as the warning image 216. That is, for example, wheel locking by ABS system may be detected and displayed by the image 216.

When the visible light image is utilized as the outside image 16 as described above in the first and third embodiments, the warning display gradation ratio of the second pixel area 18 in the first mode and the meter display gradation ratio of the first pixel area 14 in the first mode may be adjusted so that the former is greater than the latter in the same manner as the second mode. In addition, in the fifth embodiment, the first and second correlation information of the third embodiment may be adopted. Likewise, the first and second correlation information of the fourth embodiment may be adopted in the sixth embodiment. Furthermore, in the third, fifth, sixth and eighth embodiments, the brightness of the images 12, 216 in the first mode may be maintained at a constant value.

When the gradation is controlled in the first to ninth embodiments so that the images assimilate with each other in the panel 10, the thin-film transistors corresponding to the electrode of each of the subpixels of the display pixel in the liquid crystal panel 10 are usually provided with electricity to turn the liquid crystal of the pertinent part to an ON state. In contrast, the images can be assimilated with each other by cutting the electricity off from the thin-film transistor corresponding to the electrode of each of the subpixels of the display pixel to turn the liquid crystal of the pertinent part to an OFF state.

The present invention may be applied to, for example, a head up display unit that lets a combiner virtually display the display image of the liquid crystal panel besides being applied to a vehicle display unit functioning as the combination meter.

Such changes and modifications are to be understood as being within the scope of the present invention as defined by the appended claims.

What is claimed is:

1. A display apparatus for use in a vehicle comprising:
a liquid crystal panel capable of displaying an image in a vehicle, wherein the liquid crystal panel includes a meter display pixel that displays a meter image to represent a vehicle condition value and a warning display pixel that displays a warning image;
an illumination unit capable of lighting the liquid crystal panel by emitting light;
an input unit capable of accepting an input from an occupant of the vehicle, wherein the input unit receives the input of an adjustment value for controlling brightness of the image including the meter image and the warning image; and
a control unit capable of controlling the liquid crystal panel and the illumination unit, wherein the control unit changes both of a meter display gradation ratio and a warning display gradation ratio according to the adjustment value so that the warning display gradation value is greater than the meter display gradation value when the meter display gradation ratio is defined as a ratio of the gradation value of the meter display pixel to a predetermined gradation value and the warning display gradation ratio is defined as a ratio of the gradation value of the warning display pixel to a predetermined gradation value, and
wherein, when the meter image and the warning image are displayed simultaneously, the meter display gradation ratio and the warning display gradation ratio are changed to satisfy a relationship that the warning display gradation value is greater than the meter display gradation value according to the adjustment value and are changed from a single maximum ratio or are changed from two different ratios so that the warning display gradation ratio is changed from a ratio greater than the meter display gradation ratio.

2. The display apparatus of claim 1, wherein
the control unit includes a correlation information storage capable of storing correlation information that represents correlation between the adjustment value and both of the meter display gradation ratio and the warning display gradation ratio and a gradation ratio control unit capable of controlling the meter display gradation ratio and the warning display gradation ratio according to the correlation information stored in the correlation information storage.

3. The display apparatus of claim 2, wherein
the correlation information represents a decreasing correlation trend between the adjustment value and both of the meter display gradation ratio and the warning display gradation ratio,
the meter display gradation ratio and the warning display gradation ratio start decreasing from a same ratio, and
the warning display gradation ratio is greater than the meter display gradation ratio in the decreasing correlation trend.

4. The display apparatus of claim 2, wherein
the correlation information represents a decreasing correlation trend between the adjustment value and both of the both of the meter display gradation ratio and the warning display gradation ratio,
the meter display gradation ratio and the warning display gradation ratio start decreasing from respective standard ratios, and
the standard ratio of the warning display gradation ratio is greater than the standard ratio of the meter display gradation ratio.

5. The display apparatus of claim 1, wherein
the input unit receives whether to display the warning image or not as the input,
the control unit includes a capture unit capable of capturing and acquiring an outside image that images an outside field of the vehicle and a gradation ratio control unit capable of controlling the warning display gradation ratio when the warning image is displayed according to the input from the input unit after being captured by the capture unit as the outside image.

6. The display apparatus of claim 1, wherein
the control unit includes an abnormality detection unit capable of detecting abnormality of the vehicle, an image storage capable of storing a caution image that provides caution of the abnormality, and a gradation ratio control unit capable of controlling the warning display gradation ratio when the abnormality is detected by the abnormality detection unit and the caution image stored in the image storage serves as the warning image.

7. The display apparatus of claim 1, wherein
the illumination unit has a light source capable of lighting a whole body of the liquid crystal panel, and
the control unit maintains lighting brightness of the light source at constant brightness irrespective of change of the adjustment value.

8. A display apparatus for use in a vehicle comprising:
a liquid crystal panel capable of displaying an image in a vehicle, wherein the liquid crystal panel includes a meter display pixel that displays a meter image to represent a vehicle condition value and a warning display pixel that displays a warning image;
an illumination unit capable of lighting the liquid crystal panel by emitting light;
an input unit capable of accepting an input from an occupant of the vehicle, wherein the input unit receives the input of an adjustment value for controlling brightness of the image including the meter image and the warning image; and
a control unit capable of controlling the liquid crystal panel and the illumination unit, wherein the control unit changes both of a meter display gradation ratio and a warning display gradation ratio according to the adjustment value so that the warning display gradation value is greater than the meter display gradation value when the meter display gradation ratio is defined as a ratio of the gradation value of the meter display pixel to a predetermined gradation value and the warning display gradation ratio is defined as a ratio of the gradation value of the warning display pixel to a predetermined gradation value; wherein
the control unit includes a correlation information storage capable of storing correlation information that represents correlation between the adjustment value and both of the meter display gradation ratio and the warning display gradation ratio and a gradation ratio control unit capable of controlling the meter display gradation ratio and the warning display gradation ratio according to the correlation information stored in the correlation information storage;
the correlation information represents a decreasing correlation trend between the adjustment value and both of the meter display gradation ratio and the warning display gradation ratio;
the meter display gradation ratio and the warning display gradation ratio start decreasing from a same ratio;
the warning display gradation ratio is greater than the meter display gradation ratio in the decreasing correlation trend;
the decreasing correlation trend is a linear decrease from the same ratio for both of the meter display gradation ratio and the warning display gradation ratio; and
a ratio of the linear decrease is smaller in the warning display gradation ratio than in the meter display gradation ratio.

9. A display apparatus for use in a vehicle comprising:
a liquid crystal panel capable of displaying an image in a vehicle, wherein the liquid crystal panel includes a meter display pixel that displays a meter image to represent a vehicle condition value and a warning display pixel that displays a warning image;
an illumination unit capable of lighting the liquid crystal panel by emitting light;
an input unit capable of accepting an input from an occupant of the vehicle, wherein the input unit receives the input of an adjustment value for controlling brightness of the image including the meter image and the warning image; and
a control unit capable of controlling the liquid crystal panel and the illumination unit, wherein the control unit changes both of a meter display gradation ratio and a warning display gradation ratio according to the adjustment value so that the warning display gradation value is greater than the meter display gradation value when the meter display gradation ratio is defined as a ratio of the gradation value of the meter display pixel to a predetermined gradation value and the warning display gradation ratio is defined as a ratio of the gradation value of the warning display pixel to a predetermined gradation value; wherein
the control unit includes a correlation information storage capable of storing correlation information that represents correlation between the adjustment value and both of the meter display gradation ratio and the warning display gradation ratio and a gradation ratio control unit capable of controlling the meter display gradation ratio and the warning display gradation ratio according to the correlation information stored in the correlation information storage;
the correlation information represents a decreasing correlation trend between the adjustment value and both of the both of the meter display gradation ratio and the warning display gradation ratio;

the meter display gradation ratio and the warning display gradation ratio start decreasing from respective standard ratios;

the standard ratio of the warning display gradation ratio is greater than the standard ratio of the meter display gradation ratio;

the decreasing correlation trend is a linear decrease from the respective standard ratio for the meter display gradation ratio and the warning display gradation ratios; and a ratio of the linear decrease is smaller in the warning display gradation ratio than in the meter display gradation ratio.

10. A display apparatus for use in a vehicle comprising:

a liquid crystal panel capable of displaying an image in a vehicle, wherein the liquid crystal panel includes a meter display pixel that displays a meter image to represent a vehicle condition value and a warning display pixel that displays a warning image;

an illumination unit capable of lighting the liquid crystal panel by emitting light, wherein the illumination unit includes a meter light that emits light for lighting the meter image and a warning light that emits light for lighting the warning image;

an input unit capable of accepting an input from an occupant of the vehicle, wherein the input unit receives the input of an adjustment value for controlling brightness of the image including the meter image and the warning image; and a control unit capable of controlling the liquid crystal panel and the illumination unit, wherein the control unit changes both of a meter light brightness and a warning light brightness according to the adjustment value so that the warning light brightness is greater than the meter light brightness when the meter light brightness is defined as brightness of the light from the meter light and the warning light brightness is defined as brightness of the light from the warning light, the control unit includes a correlation information storage unit for storing correlation information that represents correlation of the meter light brightness and the warning light brightness, wherein when the warning light brightness and the meter light brightness initially have same brightness or respectively different brightness, the correlation information defines the warning light brightness as being greater than the meter light brightness according to the adjustment value, and a light brightness adjustment unit for adjusting the meter light brightness and the warning light brightness according to the stored correlation information in the correlation information storage unit, and wherein when the meter image and the warning display are displayed at the same time, the correlation information defines a correlation of brightness decrease of both the meter light brightness and the warning light brightness, and the light brightness adjustment unit adjusts the meter light brightness and the warning light brightness according to the correlation information so that the warning light brightness is greater than the meter light brightness regardless of whether the warning light brightness and the meter light brightness initially have same brightness or respectively different brightness.

11. The display apparatus of claim 10, wherein the control unit includes a correlation information storage capable of storing correlation information that represents correlation between the adjustment value and both of the meter light brightness and the warning light brightness and a lighting brightness control unit capable of controlling the meter light brightness and the warning light brightness according to the correlation information stored in the correlation information storage.

12. The display apparatus of claim 11, wherein the correlation information represents a decreasing correlation trend between the adjustment value and both of the meter light brightness and the warning light brightness, the meter light brightness and the warning light brightness start decreasing from same brightness, and the warning light brightness is greater than the meter light brightness in the decreasing correlation trend.

13. The display apparatus of claim 11, wherein the correlation information represents a decreasing correlation trend between the adjustment value and both of the both of the meter light brightness and the warning light brightness, the meter light brightness and the warning light brightness start decreasing from respective standard brightness, and the standard brightness of the warning light brightness is greater than the standard brightness of the meter light brightness.

14. The display apparatus of claim 10, wherein the input unit receives whether to display the warning image or not as the input, the control unit includes a capture unit capable of capturing and acquiring an outside image that images an outside field of the vehicle and a lighting brightness control unit capable of controlling the warning light brightness when the warning image is displayed according to the input from the input unit after being captured by the capture unit as the outside image.

15. The display apparatus of claim 10, wherein the control unit includes an abnormality detection unit capable of detecting abnormality of the vehicle, an image storage capable of storing a caution image that provides caution of the abnormality, and a lighting brightness control unit capable of controlling the warning light brightness when the abnormality is detected by the abnormality detection unit and the caution image stored in the image storage serves as the warning image.

16. The display apparatus of claim 10, wherein the control unit maintains both of a meter display gradation ratio and a warning display gradation ratio respective at same ratios irrespective of change of the adjustment value when the meter display gradation ratio is defined as a ratio of the gradation value of the meter display pixel to a predetermined gradation value and the warning display gradation ratio is defined as a ratio of the gradation value of the warning display pixel to a predetermined gradation value.

17. The display apparatus of claim 10, wherein the control unit maintains the gradation value of the meter display pixel and the gradation value of the warning display pixel respectively at constant value irrespective of change of the adjustment value.

18. A display apparatus for use in a vehicle comprising:

a liquid crystal panel capable of displaying an image in a vehicle, wherein the liquid crystal panel includes a meter display pixel that displays a meter image to represent a vehicle condition value and a warning display pixel that displays a warning image;

an illumination unit capable of lighting the liquid crystal panel by emitting light, wherein the illumination unit includes a meter light that emits light for lighting the meter image and a warning light that emits light for lighting the warning mage;

an input unit capable of accepting an input from an occupant of the vehicle, wherein the input unit receives the input of an adjustment value for controlling brightness of the image including the meter image and the warning image; and a control unit capable of controlling the liquid crystal panel and the illumination unit, wherein:

the control unit changes both of a meter light brightness and a warning light brightness according to the adjustment value so that the warning light brightness is greater than the meter light brightness when the meter light brightness is defined as brightness of the light from the meter light and the warning light brightness is defined as brightness of the light from the warning light;

the control unit includes a correlation information storage capable of storing correlation information that represents correlation between the adjustment value and both of the meter light brightness and the warning light brightness and a lighting brightness control unit capable of controlling the meter light brightness and the warning light brightness according to the correlation information stored in the correlation information storage;

the correlation information represents a decreasing correlation trend between the adjustment value and both of the meter light brightness and the warning light brightness, the meter light brightness and the warning light brightness start decreasing from same brightness, and the warning light brightness is greater than the meter light brightness in the decreasing correlation trend; and the decreasing correlation trend is a linear decrease from the same brightness for both of the meter light brightness and the warning light brightness, and a ratio of the linear decrease is smaller in the warning light brightness than in the meter light brightness.

19. A display apparatus for use in a vehicle comprising:

a liquid crystal panel capable of displaying an image in a vehicle, wherein the liquid crystal panel includes a meter display pixel that displays a meter image to represent a vehicle condition value and a warning display pixel that displays a warning image;

an illumination unit capable of lighting the liquid crystal panel by emitting light, wherein the illumination unit includes a meter light that emits light for lighting the meter image and a warning light that emits light for lighting the warning image;

an input unit capable of accepting an input from an occupant of the vehicle, wherein the input unit receives the input of an adjustment value for controlling brightness of the image including the meter image and the warning image; and a control unit capable of controlling the liquid crystal panel and the illumination unit, wherein:

the control unit changes both of a meter light brightness and a warning light brightness according to the adjustment value so that the warning light brightness is greater than the meter light brightness when the meter light brightness is defined as brightness of the light from the meter light and the warning light brightness is defined as brightness of the light from the warning light;

the control unit includes a correlation information storage capable of storing correlation information that represents correlation between the adjustment value and both of the meter light brightness and the warning light brightness and a lighting brightness control unit capable of controlling the meter light brightness and the warning light brightness according to the correlation information stored in the correlation information storage;

the correlation information represents a decreasing correlation trend between the adjustment value and both of the both of the meter light brightness and the warning light brightness;

the meter light brightness and the warning light brightness start decreasing from respective standard brightness;

the standard brightness of the warning light brightness is greater than the standard brightness of the meter light brightness;

the decreasing correlation trend is a linear decrease from the respective standard brightness for the meter light brightness and the warning light brightness; and a ratio of the linear decrease is smaller in the warning light brightness than in the meter light brightness.

* * * * *